(12) United States Patent
Kumaki et al.

(10) Patent No.: US 6,473,411 B1
(45) Date of Patent: Oct. 29, 2002

(54) ROUTER DEVICE, DATAGRAM TRANSFER METHOD AND COMMUNICATION SYSTEM REALIZING HANDOFF CONTROL FOR MOBILE TERMINALS

(75) Inventors: Yoshinari Kumaki, Kanagawa (JP); Keiji Tsunoda, Kanagawa (JP); Shigeo Matsuzawa, Tokyo (JP); Noriyasu Kato, Kanagawa (JP); Osamu Moriya, Kanagawa (JP); Toshio Okamoto, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/076,065

(22) Filed: May 12, 1998

(30) Foreign Application Priority Data

| May 12, 1997 | (JP) | ................................................ 9-121169 |
| Jan. 13, 1998 | (JP) | ........................................... 10-005198 |
| Apr. 20, 1998 | (JP) | ........................................... 10-123868 |

(51) Int. Cl.[7] .............................................. H04Q 7/00
(52) U.S. Cl. ................... 370/331; 370/395.21; 455/436; 455/560
(58) Field of Search ........................... 370/310.1, 310.2, 370/328, 331, 352, 389, 392, 399, 395.21; 455/436, 432, 560

(56) References Cited

U.S. PATENT DOCUMENTS

| 5,325,362 A | * | 6/1994 | Aziz ........................... 370/331 |
| 5,384,826 A | | 1/1995 | Amitay |
| 5,530,693 A | | 6/1996 | Averbuch et al. |
| 5,623,495 A | * | 4/1997 | Eng et al. .................... 370/338 |
| 5,787,080 A | * | 7/1998 | Hulyalkar et al. ........... 370/348 |
| 5,825,759 A | * | 10/1998 | Liu .............................. 370/331 |
| 5,875,185 A | * | 2/1999 | Wang et al. ................. 370/331 |
| 5,974,036 A | * | 10/1999 | Acharya et al. ............. 370/331 |

OTHER PUBLICATIONS

Hoymany et al, Switch–Borne Router for High Performance Packet Forwarding of Connectionless Traffic in ATM Network, ICCCN'96, pp. 1–6, 1996.*
Lin, An Architecture for a Campus–Sized Wireless Mobile Network, Thesis, Purdue University, pp. 1–119, Dec. 1996.*
Rajagopalan, Mobility Management in Integrated Wireless–ATM Networks, ACM, pp. 127–141, 1995.*
Newman et al, IP Switching and Gigabit Routers, IEEE, pp. 64–69, 1997.*
Acharya et al, Mobility Management in Wireless ATM Networks, IEEE, pp. 100–109, 1997.*
A. V. Bakre, et al., "Implementation and Performance Evaluation of Indirect TCP", IEEE Transactions on Computers, vol. 46, No. 3, Mar. 1997, pp. 260–278.

* cited by examiner

*Primary Examiner*—Wellington Chin
*Assistant Examiner*—Frank Duong
(74) *Attorney, Agent, or Firm*—Oblon, Spivak, McClelland, Maier & Neustadt, P.C.

(57) ABSTRACT

A mobile supporting router device for realizing the handoff control associated with the moving in high speed is forms by at least one first interface connected with radio base stations, each capable of accommodating at least one mobile terminal; at least one second interface connected with a wire network; an information exchanging unit for exchanging a routing protocol on a network layer, through the second interface; a memory unit for storing information regarding a routing on the network layer based on the routing protocol exchanged by the information exchanging unit; a transfer unit for transferring datagram through the first interface according to the information regarding the routing on the network layer stored in the memory unit; a moving detection unit for detecting a moving of the mobile terminal among the radio base stations; and an information updating unit for updating the information regarding the routing on the network layer stored in the memory unit when the moving of the mobile terminal is detected by the moving detection unit.

4 Claims, 60 Drawing Sheets

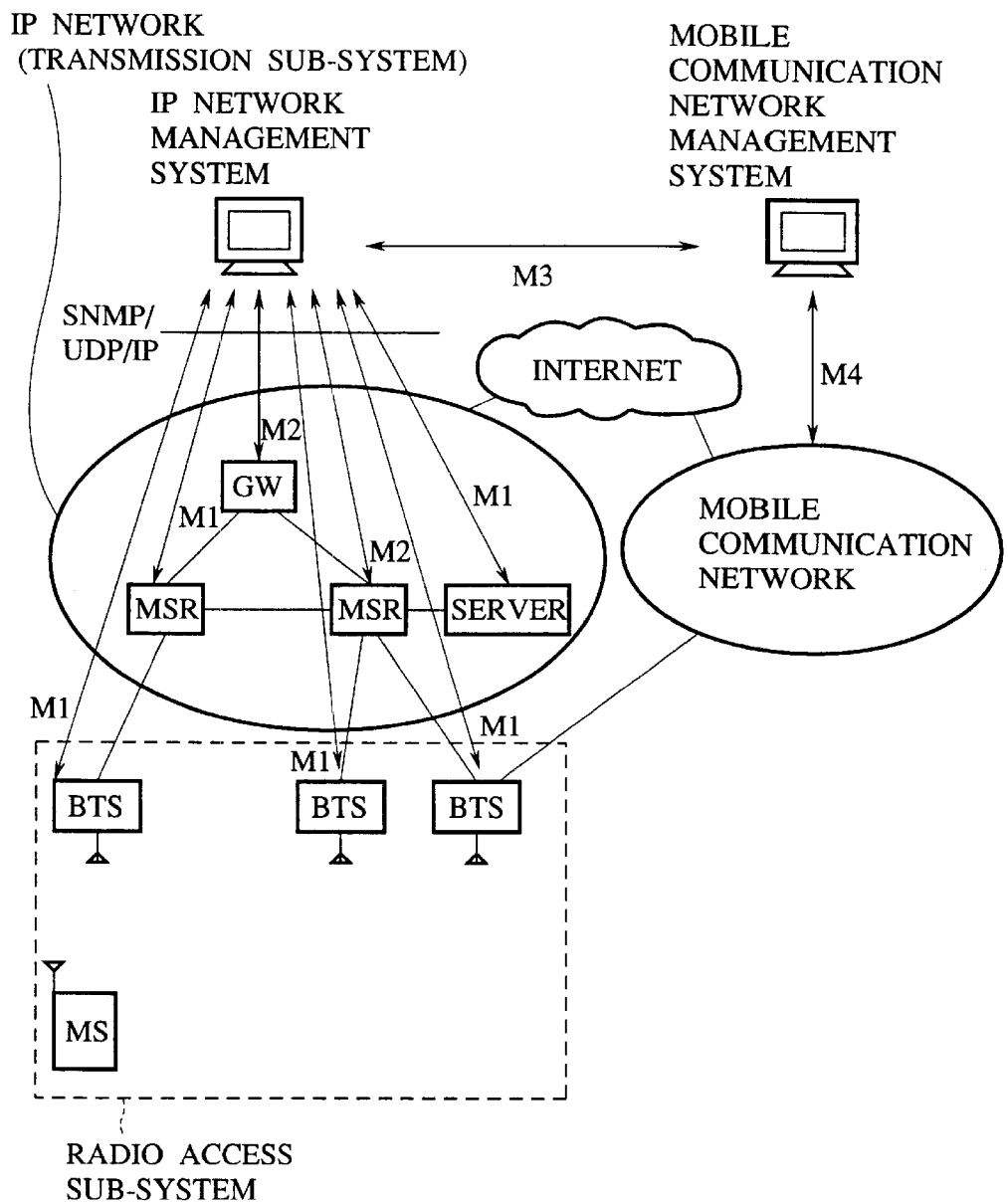

FIG.16

| | BASE STATION ID | | TERMINAL ID |
|---|---|---|---|
| (1) | 《VPI/VCI》<br>VPI/VCI<br>VPI<br>VCI | 《LOGICAL NUMBER》 | 《VPI/VCI》<br>VPI/VCI<br>VPI<br>VCI |
| (2) | 《IP ADDRESS》<br>FIXED IP | | 《IP ADDRESS》<br>FIXED IP<br>DYNAMIC IP |
| (3) | 《CONNECTION SET<br>UP ADDRESS》<br>ATM ADDRESS<br>MOBILITY NUMBER<br>(TEL) | | 《CONNECTION SET<br>UP ADDRESS》<br>ATM ADDRESS<br>MOBILITY NUMBER<br>(TEL) |
| (4) | 《PHYSICAL NUMBER》<br>MAC ADDRESS<br>IF NUMBER | | 《PHYSICAL NUMBER》<br>MAC ADDRESS<br>IF NUMBER |

FIG.30

| DESTINATION IP | INPUT/OUTPUT IF NO. | NEXT IP | TYPE | RPROT | MASK |
|---|---|---|---|---|---|
| X | 1→2 | Y | Direct | 1 | M |
| | 1 | Z | Indirect | 1 | M |

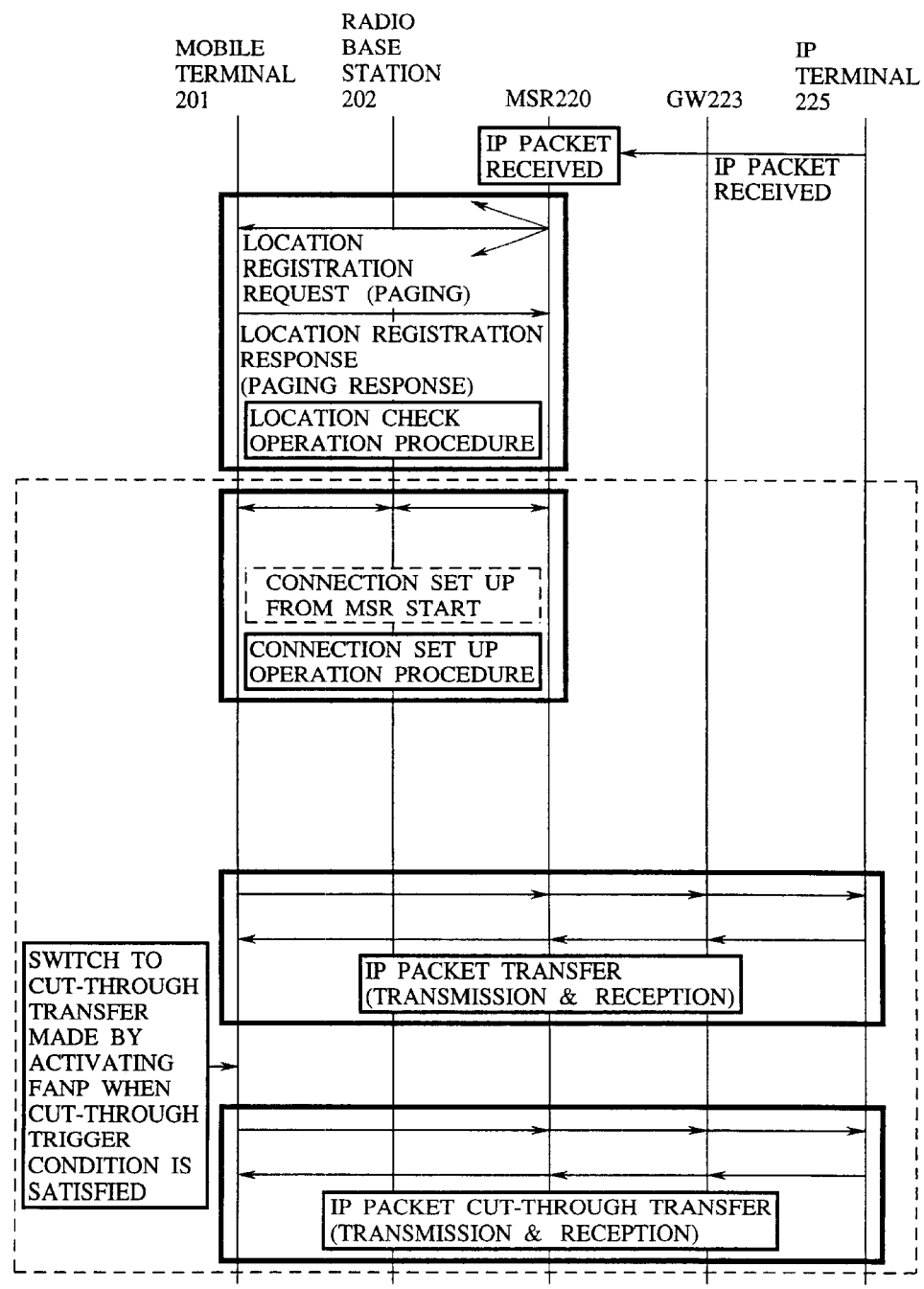

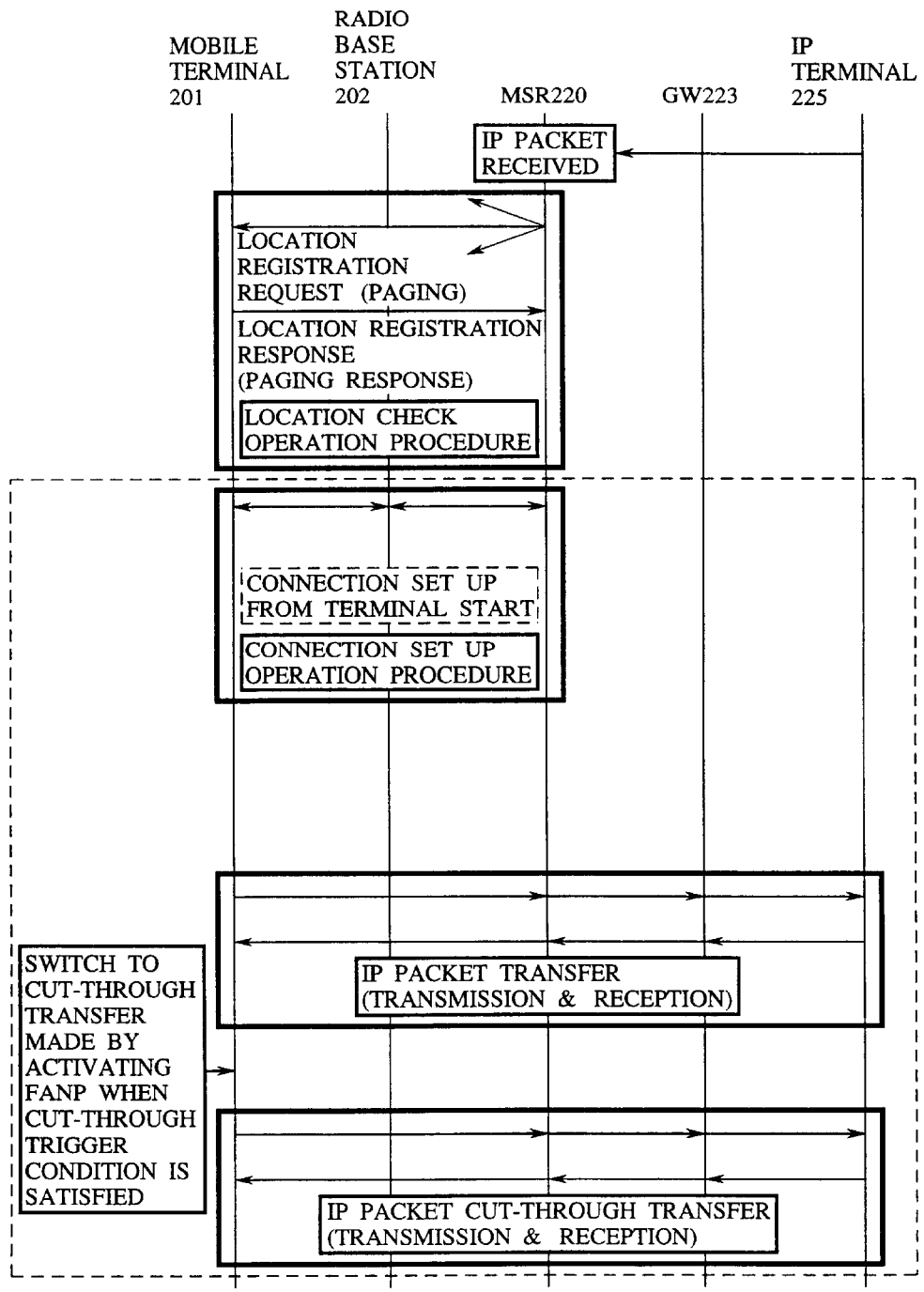

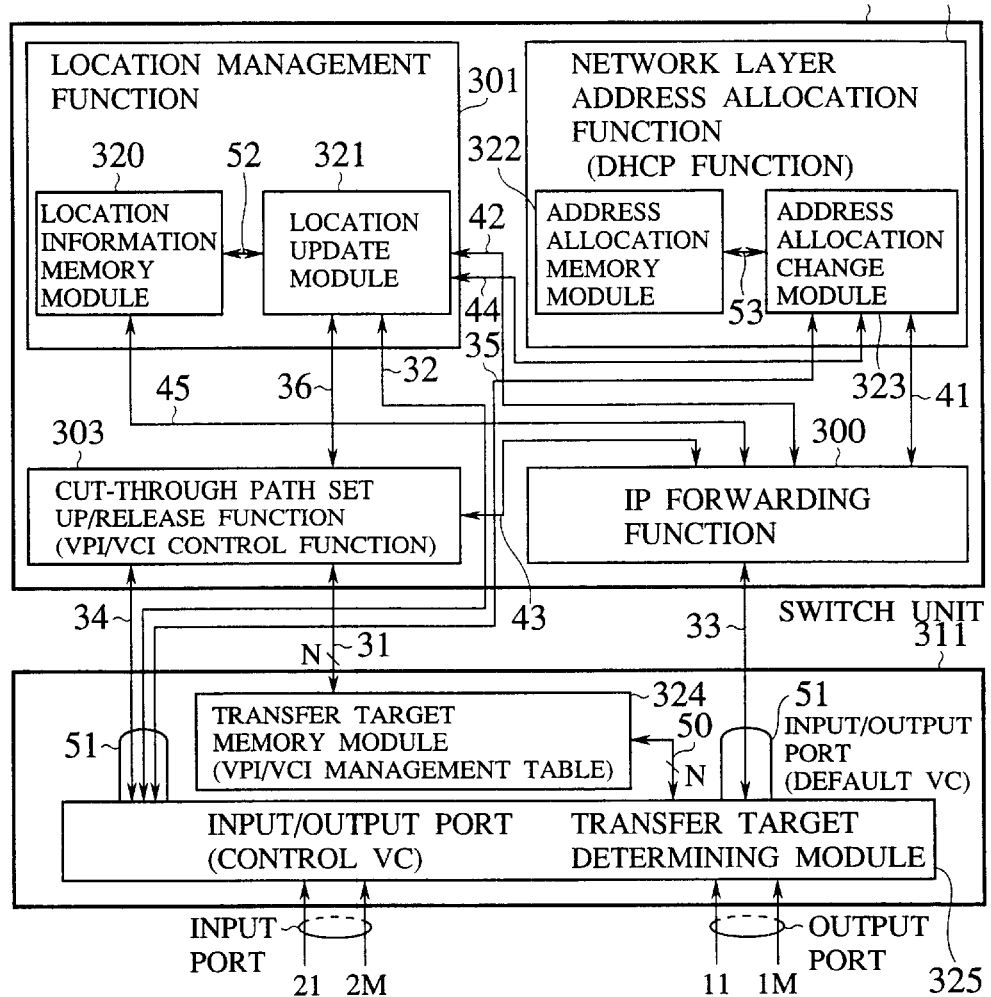

ROUTER DEVICE, DATAGRAM TRANSFER METHOD AND COMMUNICATION SYSTEM REALIZING HANDOFF CONTROL FOR MOBILE TERMINALS

BACKGROUND OF THE INVENTION

1. Field of the Invention

The present invention relates to a router device to be connected to Internet accommodating mobile terminals, and a datagram transfer method and a communication system using such a router device.

2. Description of the Background Art

The router device is used in connecting LANs (Local Area Networks) and plays a role of transferring datagram from one LAN to another LAN. Datagram contains communication information data to be transferred as well as a description of its source and destination network layer address (such as IP addresses in the case of IP), and the router device determines an output interface (port number) and a next transfer target node (router device or host functioning as communication terminal) of the datagram according to such an address information contained in the datagram.

Now, the routing by the router device in a network will be described for an exemplary case of transmitting an IP packet from a terminal A to a terminal B. In this case, the IP packet transmitted from the terminal A is routed through Internet according to its IP address and transmitted up to a subnet to which the terminal B belongs. Here, the IP packet transmitted from the terminal A is applied with the IP forwarding processing in a form of: datalink layer→IP packet→processing of IP header information and the like and output target determination→datalink layer packet, whenever the IP packet passes through a router device within Internet. Once the IP packet reaches to a router device in a final subnet, the logical-physical address conversion is carried out by ARP (Address Resolution Protocol) (by which the MAC address is obtained from the IP address), and the IP packet is transmitted to the terminal B after being converted into a datalink layer packet by attaching a datalink layer header information such as this MAC address.

Note here that, at a time of transferring datagram, the conventional router device realizes the processing up to the datalink layer (layer 2) by hardware and the processing of the network layer (such as IP forwarding processing, for example) by software.

However, such a conventional router device has been associated with a problem that the throughput of the software processing on the network layer is low compared with the fast hardware processing up to the datalink layer and causes a bottleneck so that the advantage of the fast hardware processing cannot be taken fully.

In order to resolve this problem, currently there are intensive research and development activities on a "high speed router device" for realizing the fast IP packet transfer.

The high speed router device can shorten the "delay time" since the packet is entered until it is outputted by using the hardware processing rather than the software processing for the packet transfer, and thereby realize as much faster transfer processing. The usual delay time due to the packet transfer processing by software is several milli-seconds, whereas the delay time of the packet transfer processing by hardware is about 100 micro-seconds, so that approximately ten times faster packet transfer can be realized.

There are two propositions for such a high speed router device, including the cut-through scheme and the hop-by-hop scheme.

(1) High speed router device in Cut-through scheme:

The cut-through scheme is a scheme in which the transfer processing is handled by a layer 2 switch on a lower level layer. Prior to the cut-through, the layer 2 information such as MAC address is exchanged by a specific protocol between terminals or router devices. Then, the router device realizes the transfer by setting up a cut-through path for by-passing through the layer 2 switch without bringing the processing up to the network layer (layer 3).

(2) High speed router device in Hop-by-hop scheme:

The hop-by-hop scheme is a scheme in which no exchange by a specific protocol as in the cut-through is required and the same processing as applied in the general router is applied to every input packet within the high speed router device. It differs from the general router in that the processing is done by the special hardware chip. The packet transfer processing to be carried out by the router goes through the processes such as CRC check of a frame, reading of a destination IP address within an IP packet, filtering processing, searching through a routing table, and replacement of MAC address, and the same processing is to be carried out every time except for the processing such as filtering. By utilizing the hardware processing or cache processing in such a portion of the processing which is to be carried out every time, it is possible to realize the fast transfer processing.

There is also a scheme in which the processing delay is suppressed by omitting the routing processing itself rather than utilizing hardware for the routing processing. Namely, in this scheme, an external switch node is provided in addition to the conventional router device, and this switch node has an ARP table in which IP addresses and MAC addresses of terminals moving over plural subnets are set in correspondence. When a packet destined to another subnet is entered from one subnet, this packet is directly sent to the destination terminal by looking up the ARP table. In this scheme, however, only the communications between subnets which are directly connected to the switch node are possible and the transfer processing for a subnet which is not directly connected cannot be done because there is no routing processing, so that there is a need to use the switch node and the usual router simultaneously.

Thus, currently there are intensive research and development activities on a "high speed router device" for realizing the fast IP packet transfer by resolving the bottleneck of the network layer processing in the router device. On the other hand, there are also research and development activities for a technique to accommodate mobile terminals in Internet type network. Such a mobile access technique includes a scheme using DHCP (Dynamical Host Configuration Protocol) server and a scheme using Mobile IP.

The scheme using DHCP server is a scheme in which the mobile terminal makes an Internet access by temporarily obtaining an IP address from the DHCP server within the network. The problem associated with this scheme using DHCP server is that the strategy to utilize the IP address dynamically obtained from the network of the visited site works well in the case where the mobile terminal makes an access to a server in an internal network, that is, the case where the mobile terminal is a call originating side, but it does not work well in applications where the mobile terminal can be a call terminating side such as Internet telephone and electronic conference system. Namely, in such applications, it is difficult for the other machines to ascertain the IP address currently used by the mobile terminal so that it is practically impossible to make an access to the mobile terminal from the other machines.

The Mobile IP is a scheme developed in order to resolve such a problem. This is a technique to make the mobile terminal appear as if it is located at its normal location with respect to the other machines regardless of its actual location on the network. This scheme has been put in the stage of RFC (Request For Comments) by the IETF (Internet Engineering Task Force) in October, 1996.

The operation of the Mobile IP will now be described with reference to FIG. 1. First, a home agent (HA: 10.1) is provided in advance at a network to which the mobile terminal (MH: 10.2) is normally connected. Then, when the mobile terminal (MH: 10.2) moves and is connected to a visited site network (FA: 20.1), it notifies the IP address (FA: 20.1) of the current location to the home agent (HA: 10.1). Thereafter, the home agent transfers an IP packet in which the IP address (MH: 10.2) of the normal location of the mobile terminal is specified as a destination to the current location of the mobile terminal by encapsulating that IP packet.

In the case of returning a message from the current location to an access source, an IP packet is outputted directly to the access source without using the home agent. In this manner, it becomes possible for each node on the network to make an access to the mobile terminal by using the home address of the mobile terminal regardless of where the mobile terminal is currently connected to.

The Mobile IP has been designed with an aim of requiring as little change in the existing Internet as possible so that it has a high affinity with the existing Internet but it is also associated with the following problems.

The first problem is that HA must always relay packets to MH. Consequently, even when HA is located very far away, it is necessary to transfer packets via HA and therefore there is a redundancy in the transfer route and the delay time of communication will inevitably increases.

The second problem is that packets destined to MH cannot be relayed by the usual routing control because the IP address of HA is held as it is even at a visited site and therefore there is an IP address in violation of the subnet model.

The third problem is that it is impossible to carry out the processing of a relay router with respect to a header of an original IP packet because a packet is transferred in an encapsulated form.

The fourth problem is that all communications with MH become impossible when HA malfunctions, because all communications must go through HA.

Among these problems, the first problem in particular is problematic in realizing real time communications even in Internet type network. For instance, an exemplary case shown in FIG. 2 has not only a considerable route redundancy but also a further delay time increase due to the bottleneck of the software processing because of the use of routers with conventional software processing, compared with the ideal case shown in FIG. 4.

For this reason, when the cut-through transfer is carried out by using the above described high speed router device, the transfer route becomes as shown in FIG. 3, and it can be expected that the delay time is considerably shortened compared with the case of FIG. 2. however, even when the Mobile IP technique and the high speed router device are used together, the problem of transfer route redundancy remains unresolved, and the delay time is still considerably large compared with the ideal case of FIG. 4.

Moreover, the Mobile IP scheme is a technique for accesses to/from mobile terminals in Internet type network and its goal is to enable Internet access from any visited site. For this reason, the Mobile IP scheme does not sufficiently account for the case of communication during moving, and adopts a method for making a re-connection when the communication is disconnected suddenly at a visited site. As a result, it requires a considerable amount of time in the handoff control associated with the moving, and it is difficult to realize the real time communications while moving as realized in the telecommunication type mobile communication system by the currently available technique. Consequently, there is a problem that it is difficult to realize the real time communications like Internet telephone under the mobile Internet environment.

Furthermore, the conventional mobile access technique such as the Mobile IP scheme, the mobility is supported by the routing at the network layer level so that the IP forwarding processing must be executed at a router device, and there is a problem that the router can be a bottleneck in the case where many mobile terminals coexist within a subnet of some router.

SUMMARY OF THE INVENTION

It is therefore an object of the present invention to provide a router device to be connected to Internet accommodating mobile terminals, which is capable of realizing the handoff control associated with the moving in high speed.

It is another object of the present invention to provide a router device to be connected to Internet accommodating mobile terminals, which is capable of switching a transfer target at the datalink level and realizing a transfer through an optimum route at a visited site even in the case of transfer over plural radio base stations, by ascertaining the visited site according to a location information using a function for managing local location moving of mobile terminals.

It is another object of the present invention to provide a datagram transfer method and a communication system using such a router device.

According to one aspect of the present invention there is provided a router device, comprising: at least one first interface connected with a plurality of radio base stations, each radio base station being capable of accommodating at least one mobile terminal; at least one second interface connected with a network; an information exchanging unit for exchanging a routing protocol on a network layer, through the second interface; a memory unit for storing information regarding a routing on the network layer based on the routing protocol exchanged by the information exchanging unit; a transfer unit for transferring datagram through the first interface according to the information regarding the routing on the network layer stored in the memory unit; a moving detection unit for detecting a moving of the mobile terminal among the radio base stations; and an information updating unit for updating the information regarding the routing on the network layer stored in the memory unit when the moving of the mobile terminal is detected by the moving detection unit.

According to another aspect of the present invention there is provided a router device, comprising: at least one first interface connected with a plurality of radio base stations, each radio base station being capable of accommodating at least one mobile terminal; at least one second interface connected with a network; an information exchanging unit for exchanging a routing protocol on a network layer, through the second interface; a memory unit for storing information regarding a routing on the network layer based on the routing protocol exchanged by the information exchanging unit; a transfer unit for transferring datagram through the first interface according to another information regarding a switching on a lower layer of the network layer for enabling datagram transfer along the routing on the network layer; a moving detection unit for detecting a moving of the mobile terminal among the radio base stations; and an information updating unit for updating the information regarding the routing on the network layer stored in the memory unit when the moving of the mobile terminal is detected by the moving detection unit.

According to another aspect of the present invention there is provided a router device, comprising: a memory unit for storing information regarding a routing on a network layer; a transfer unit for transferring datagram to a mobile terminal accommodated in a radio base station to which the router device is connected, according to the information regarding the routing on the network layer; an address allocation unit for allocating a network layer address to the mobile terminal located within an area managed by the router device; a moving detection unit for detecting a moving of the mobile terminal out from the area managed by the router device; an updating unit for updating the information regarding the routing on the network layer when the moving is detected by the moving detection unit; and an address release unit for releasing the network layer address when the moving is detected by the moving detection unit.

According to another aspect of the present invention there is provided a datagram transfer method, comprising the steps of: storing a mobile terminal identifier uniquely assigned to a mobile terminal, a network layer address allocated to the mobile terminal, and a correspondence between the network layer address allocated to the mobile terminal and a virtual connection to which datagram destined to the network layer address should be transmitted; receiving a handoff request containing the mobile terminal identifier and a base station identifier of a radio base station of a visited site of the mobile terminal, indicating a moving of the mobile terminal between radio base stations; acquiring a virtual connection to the radio base station of the visited site of the mobile terminal indicated by the handoff request, and obtaining the network layer address corresponding to the mobile terminal indicated by the handoff request according to the first correspondence; updating the correspondence so as to set the obtained network layer address in correspondence to the acquired virtual connection; transmitting a radio channel allocation request containing the mobile terminal identifier of the mobile terminal and a virtual connection identifier of the acquired virtual connection, to the radio base station of the visited site of the mobile terminal; and transferring datagram according to the updated correspondence or information regarding a switching on a lower layer of a network layer for enabling datagram transfer according to the updated correspondence, upon receiving the datagram.

According to another aspect of the present invention there is provided a communication system, comprising: at least one mobile terminal; a plurality of radio base stations; and at least one router device having: a memory unit for storing a first correspondence between a mobile terminal identifier uniquely assigned to the mobile terminal and a network layer address allocated to the mobile terminal, and a second correspondence between the network layer address and a virtual connection to which datagram destined to the network layer address should be transmitted; a reception unit for receiving a handoff request containing the mobile terminal identifier and a base station identifier of a radio base station of a visited site of the mobile terminal, indicating a moving of the mobile terminal between radio base stations; an updating unit for acquiring a virtual connection to the radio base station of the visited site of the mobile terminal indicated by the handoff request, obtaining the network layer address corresponding to the mobile terminal indicated by the handoff request according to the first correspondence, and updating the second correspondence so as to set the obtained network layer address in correspondence to the acquired virtual connection; and a transmission unit for transmitting a radio channel allocation request containing the mobile terminal identifier of the mobile terminal and a virtual connection identifier of the acquired virtual connection, to the radio base station of the visited site of the mobile terminal; wherein the radio base station of the visited site of the mobile terminal has: a memory unit for storing a third correspondence between a virtual connection from the router device and a radio channel to which datagram received through the virtual connection from the router device should be transmitted; and a setting unit for receiving the radio channel allocation request from the router device and setting a correspondence between a radio channel for the mobile terminal indicated by the radio channel allocation request and the acquired virtual connection indicated by the radio channel allocation request as the third correspondence.

According to another aspect of the present invention there is provided a communication system, comprising: at least one mobile terminal; a plurality of radio base stations; at least one router device having: a memory unit for storing information regarding a routing on a network layer; a transfer unit for transferring datagram to a mobile terminal accommodated in a radio base station with which the router device is connected, according to the information regarding the routing on the network layer; an inter-router moving detection unit for detecting an inter-router moving of the mobile terminal between the router device and another router device; and an updating unit for updating the information regarding the routing on the network layer when the inter-router moving is detected by the inter-router moving detection unit; and an address allocation module having: an inter-network moving detection unit for detecting an inter-network moving of the mobile terminal between networks corresponding to prescribed network layer address allocation ranges; a release unit for releasing a network layer address allocated to the mobile terminal when the inter-network moving is detected by the inter-network moving detection unit and the address allocation module is located at an originally located site of the mobile terminal; and an allocation unit for allocating a new network layer address to the mobile terminal when the inter-network moving is detected by the inter-network moving detection unit and the address allocation module is located at a visited site of the mobile terminal.

According to another aspect of the present invention there is provided a communication system, comprising: at least one mobile terminal; a plurality of radio base stations; at least one router device having: a memory unit for storing information regarding a routing on a network layer; a datagram transfer unit for transferring datagram to a mobile terminal accommodated in a radio base station to which the router device is connected, according to the information regarding the routing on the network layer; an inter-base station moving detection unit for detecting an inter-base station moving of the mobile terminal among the radio base stations; and an updating unit for updating the information regarding the routing on the network layer when the inter-base station moving is detected by the inter-base station moving detection unit; and a terminal location management module having: an inter-router moving detection unit for detecting an inter-router moving of the mobile terminal between router devices; and an encapsulated datagram transfer unit for encapsulating datagram destined to the mobile terminal using an address of a network to which a router device or a radio base station of a visited site of the mobile terminal belongs, and transferring encapsulated datagram to the router device of the visited site of the mobile terminal.

Other features and advantages of the present invention will become apparent from the following description taken in conjunction with the accompanying drawings.

BRIEF DESCRIPTION OF THE DRAWINGS

FIG. 9 is a block diagram showing a management function configuration in the mobile communication system of FIG. 5.

FIG. 16 is a table showing exemplary base station identifier and terminal identifier that can be used in the mobile communication system of FIG. 5.

FIG. 30 is a table showing an exemplary configuration of an IP routing table used in the mobile communication system of FIG. 5.

FIG. 37 is a sequence chart showing one exemplary call termination connection operation in the mobile communication system of FIG. 5.

FIG. 38 is a sequence chart showing another exemplary call termination connection operation in the mobile communication system of FIG. 5.

FIG. 39 is a block diagram showing an exemplary detailed configuration of an MSR in the mobile communication system of FIG. 5.

FIG. 40 is a table showing an exemplary configuration of a transfer target memory unit (VPI/VCI management table) used in the MSR of FIG. 39.

DETAILED DESCRIPTION OF THE PREFERRED EMBODIMENTS

Now, with references to the drawings, the preferred embodiment of a router device, a datagram transfer method, and a communication system according to the present invention will be described in detail.

Figure 1:
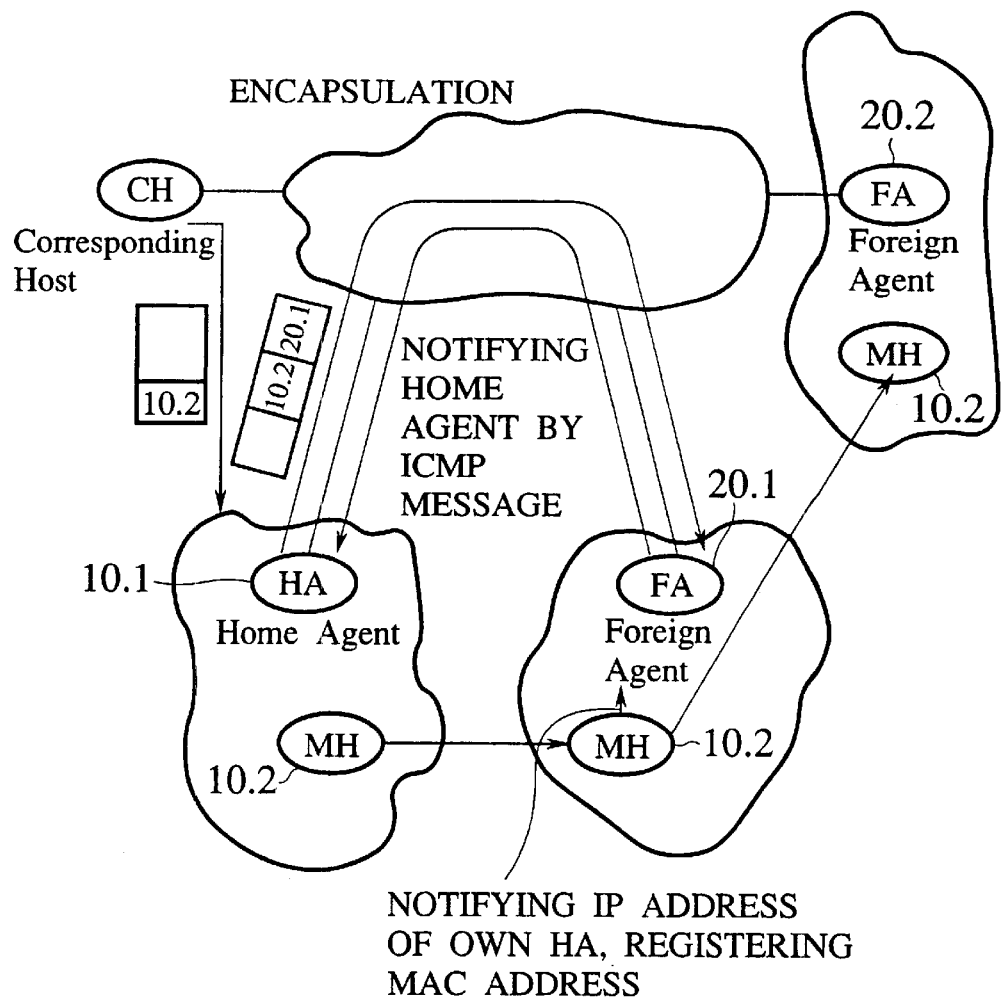
FIG. 1 is a diagram for explaining a conventional mobile access technique called Mobile IP.
Figure 2:
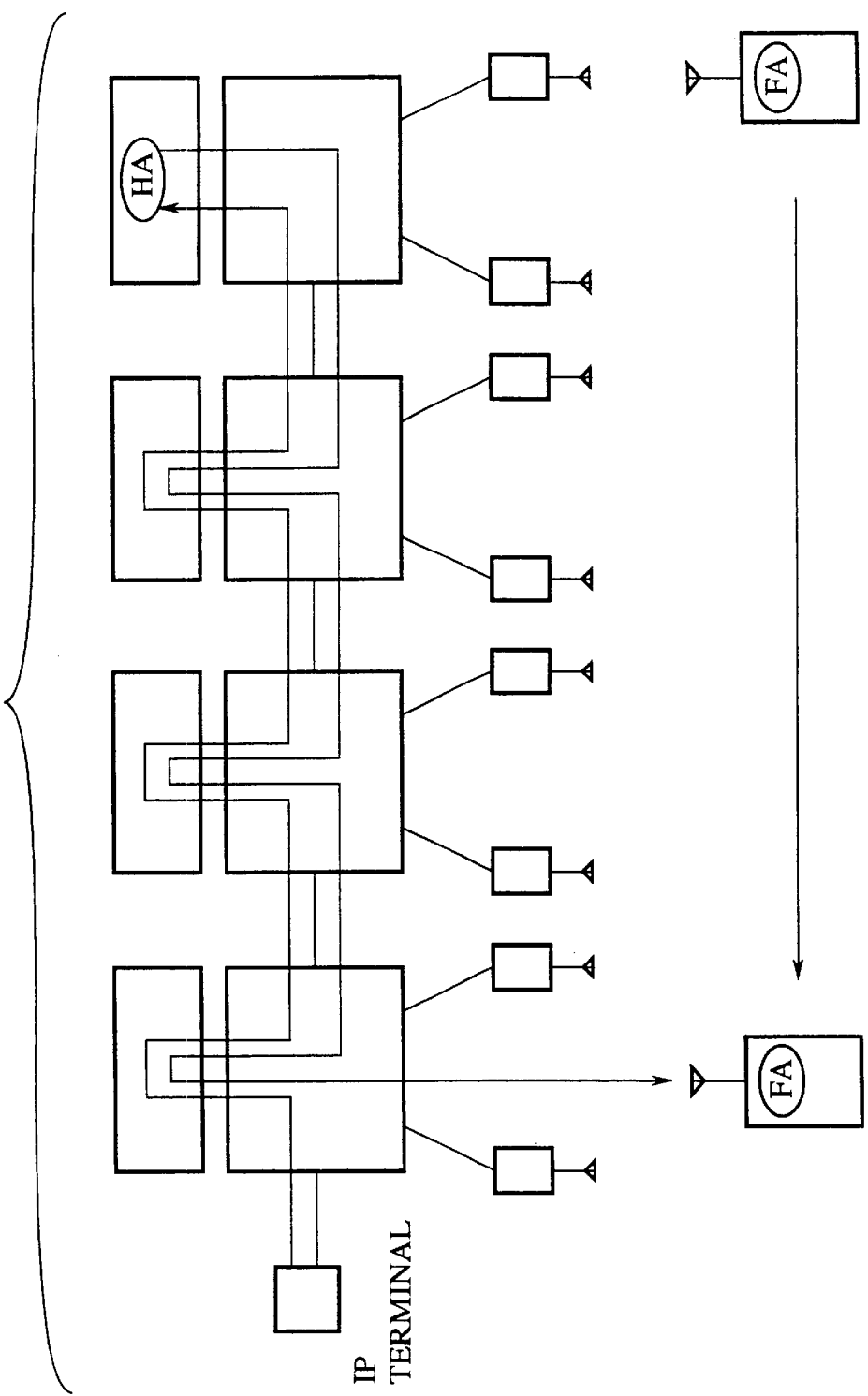
FIG. 2 is a diagram showing a transfer router in the case of using a conventional technique in a form of (Mobile IP+router device).
Figure 3:
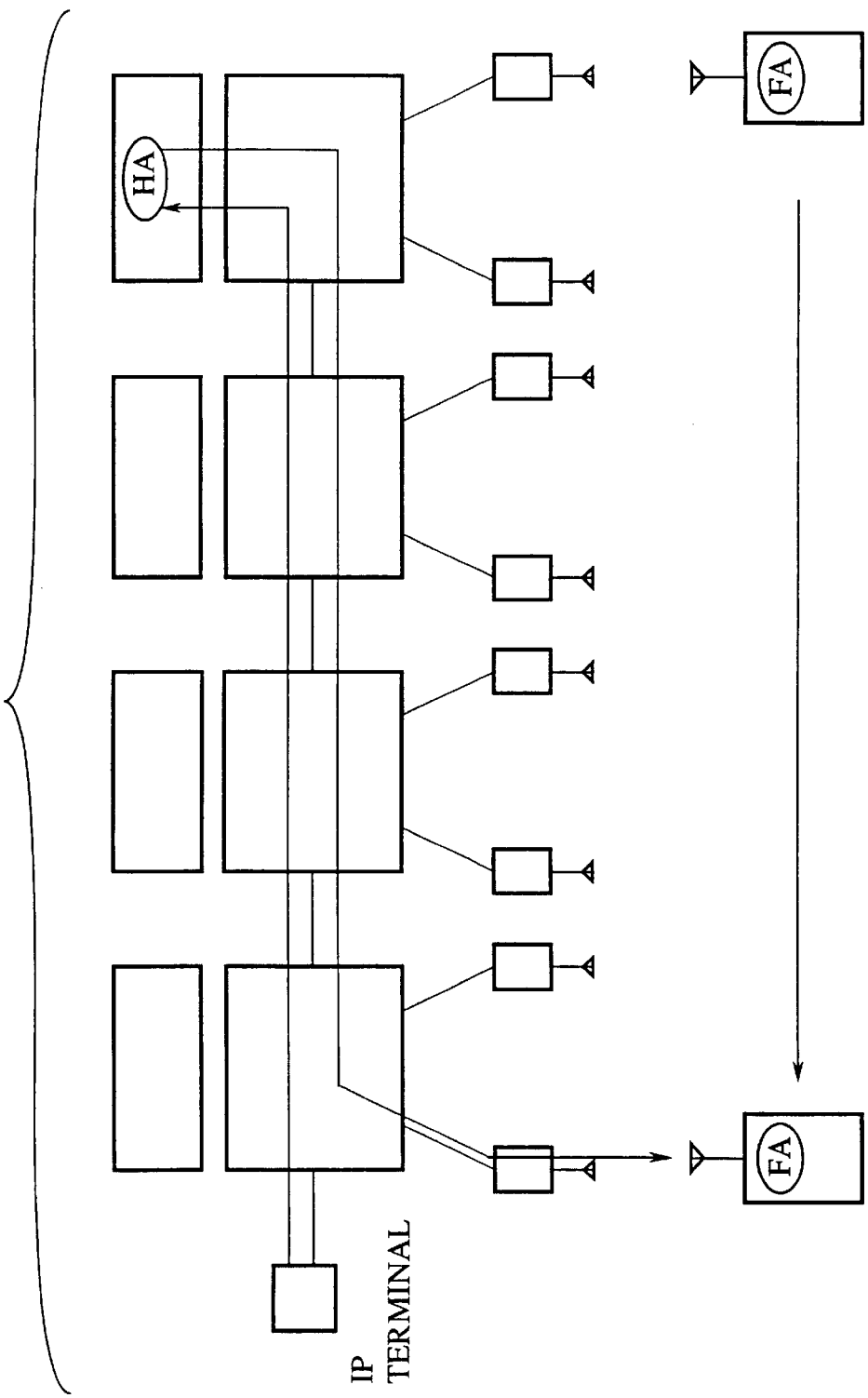
FIG. 3 is a diagram showing one exemplary transfer router in the case of using a conventional technique in a form of (Mobile IP+high speed router device).
Figure 4:
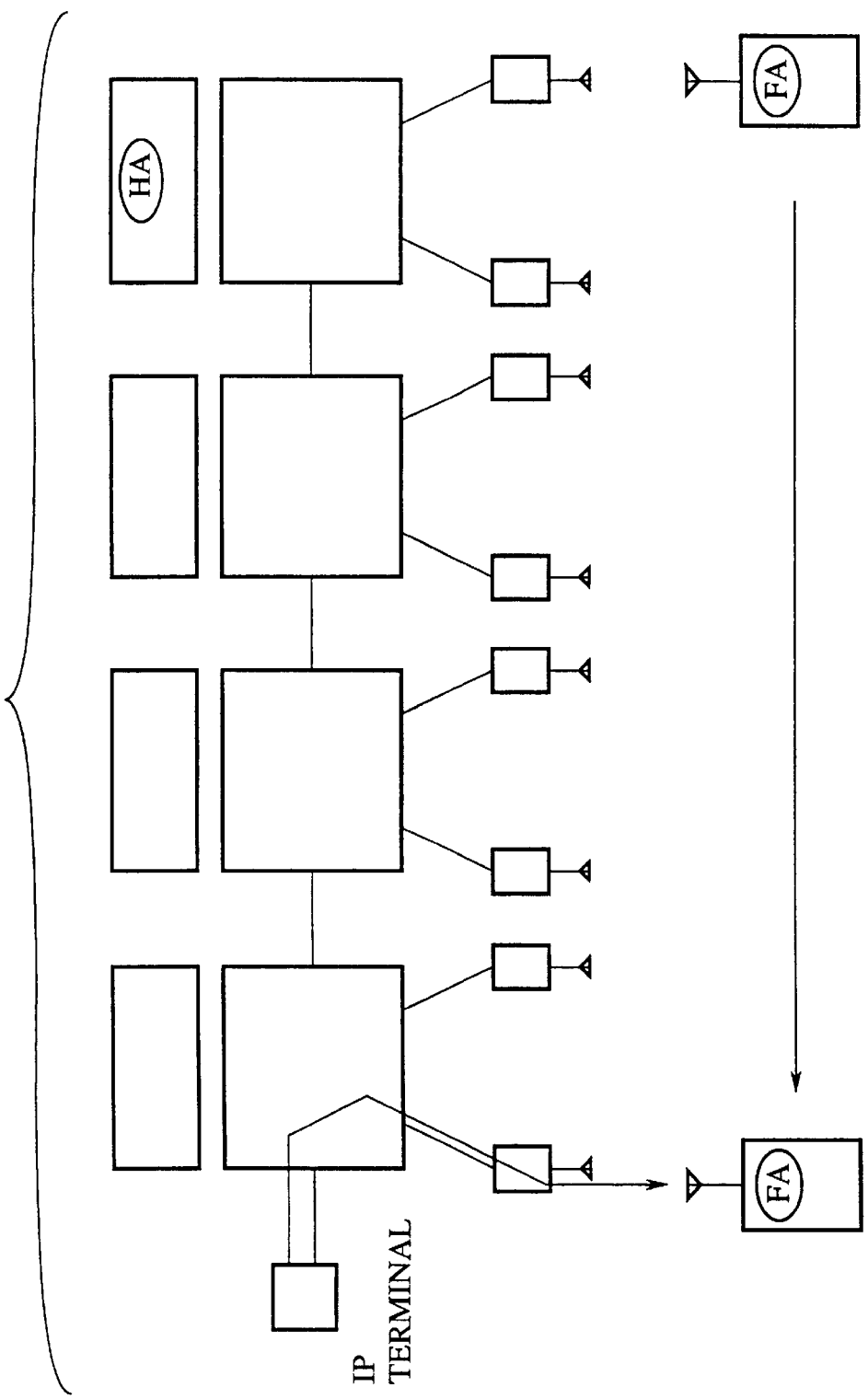
FIG. 4 is a diagram showing another exemplary transfer router in the case of using a conventional technique in a form of (Mobile IP+high speed router device).
Figure 5:
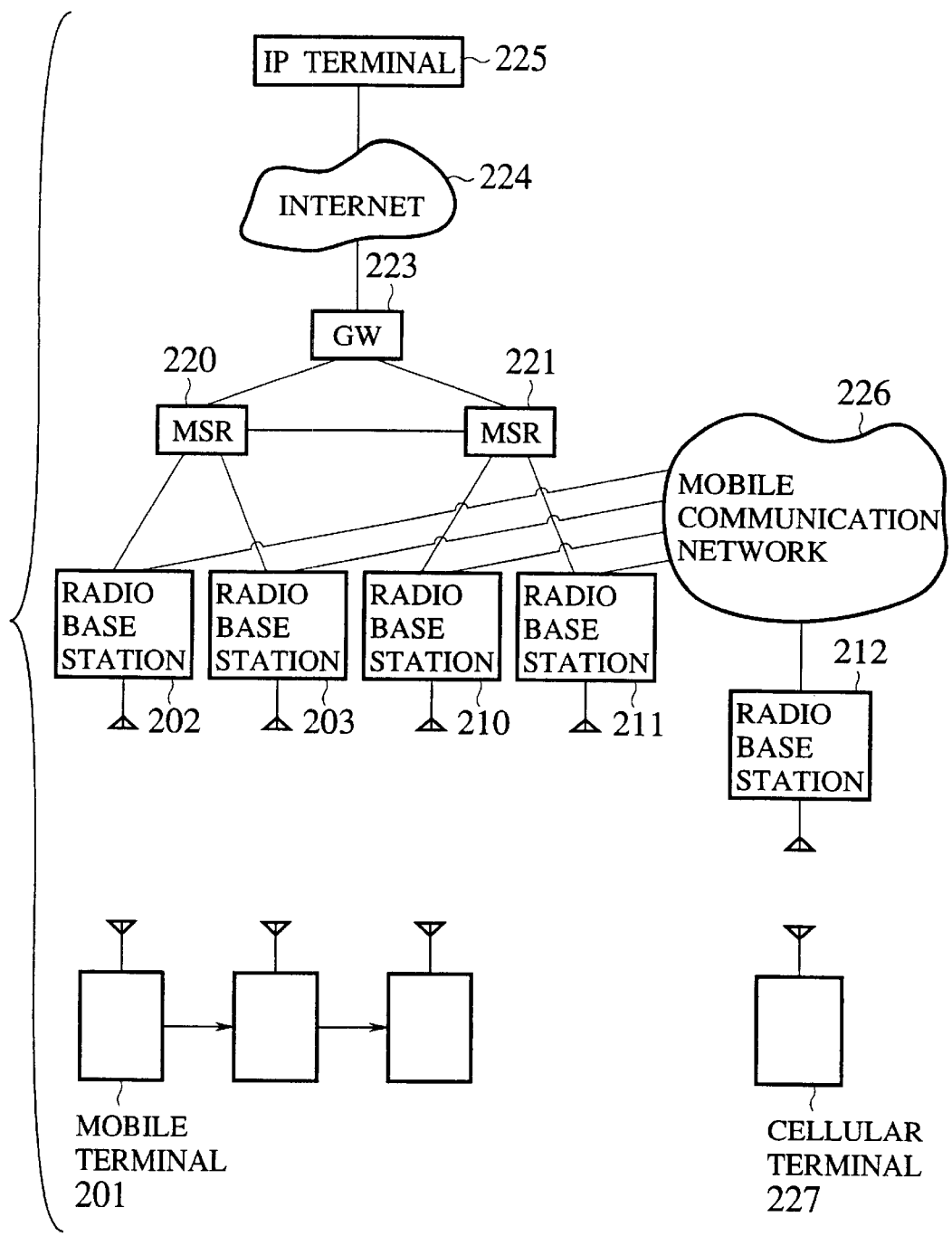
FIG. 5 is a block diagram showing an overall configuration of a mobile communication system according to one embodiment of the present invention.

FIG. 5 shows an exemplary basic configuration of a communication system according to this embodiment. The communication system of FIG. 5 has a configuration in which a mobile communication network and an IP network (Internet) are connected to radio base stations, where a cellular terminal 227 is operated by the conventional mobile communication mechanism for providing communication service. Details of communications by the cellular terminal 227 via the radio base stations and the mobile communication network will be described later. Here, the operation of a mobile terminal 201 for carrying out communications via radio base stations and mobile supporting routers (abbreviated hereafter as MSR) according to the present invention will be described first.

The Internet access type communication system of FIG. 5 comprises: a mobile terminal (MS) 201 which is at least capable of transmitting and receiving IP packets; radio base stations (BTS) 202, 203, 210 and 211 for transmitting and receiving data through radio channels with respect to the mobile terminal (MS) 201; mobile supporting routers (MSR) 220 and 221 which are router devices supporting the handoff function (mobility function) between the radio base stations where the MSR 220 accommodates the radio base stations 202 and 203 while the MSR 221 accommodates the radio base stations 210 and 211; a gateway (GW) 223 connected between Internet 224 and the MSRs 220 and 221; Internet 224 which functions as a backbone network and an IP terminal 225 connected to Internet 224.

Figure 6:
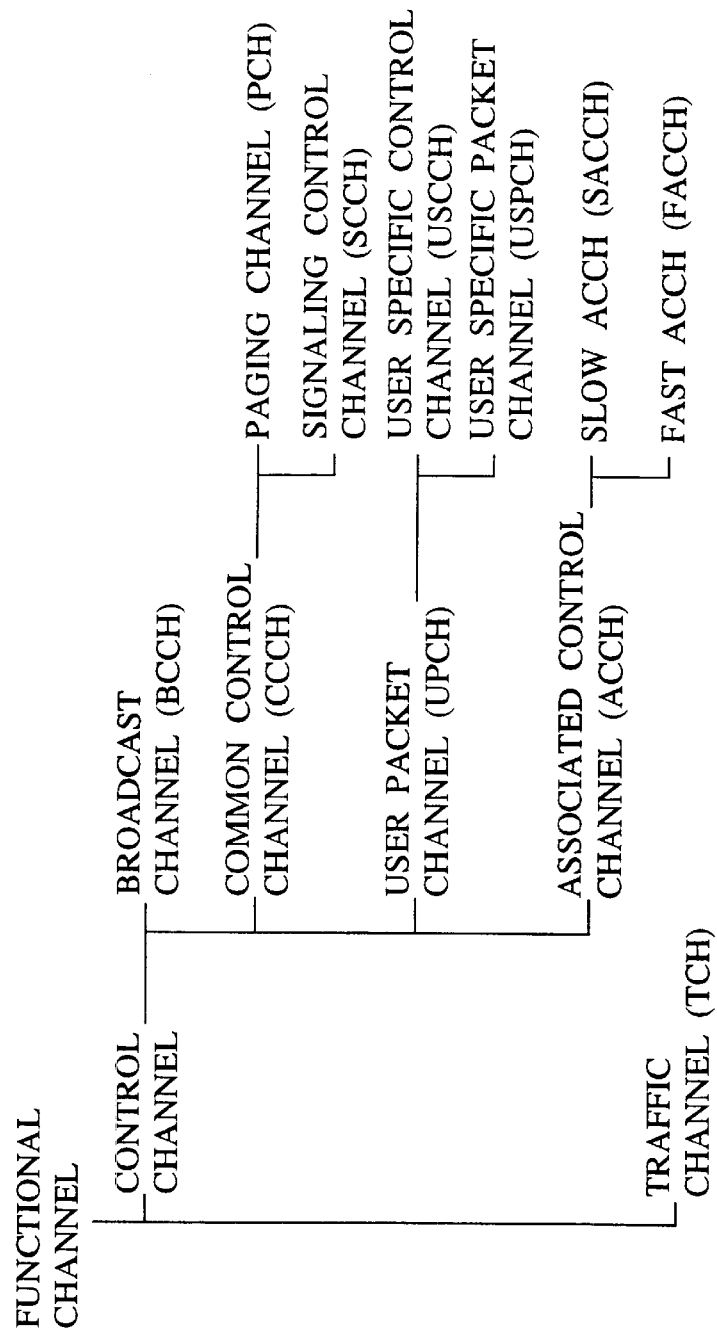
FIG. 6 is a diagram showing a functional channel configuration used in the mobile communication system of FIG. 5.

The cellular terminal 227, the mobile terminal 201, the radio base stations 202, 203, 210 and 211 constitute a radio access sub-system in the communication system of FIG. 5, in which radio communications are carried out by efficiently allocating radio resources using the multiple access scheme such as TDMA (Time Division Multiple Access) scheme or CDMA (Code Division Multiple Access). In the radio section, functional channels are defined as shown in FIG. 6. These functional channels have the well known functions as described in the RCR Standard STD-27, for example.

The mobile terminal 201 is a terminal which is capable of carrying out packet communications such as those of IP at least, by making random accesses or setting up radio channels with respect to the radio base stations 202, 203, 210, and 211.

The cellular terminal 227 is a terminal which is capable of carrying out channel switching type communications such as those of speech at least, by setting up radio channels with respect to the radio base stations 202, 203, 210 and 211 and utilizing the mobile communication network.

Each of the radio base stations 202, 203, 210 and 211 is capable of being connected through radio channels with both the mobile terminal 201 and the cellular terminal 227, and has a function (DMUX) for demultiplexing and distributing data from the mobile terminal 201 to the MSRs and data from the cellular terminal 227 to the mobile communication network, and a function (MUX) for multiplexing data transmitted from the MSRs and the mobile communication network.

Note that the mobile terminal 201 and the cellular terminal 227 notify respective system configuration information and system parameter information to these radio base stations 202, 203, 210 and 211, so as to enable communications with the mobile communication network and the IP routing network, respectively.

FIG. 6 shows an exemplary case of using radio interfaces between the mobile terminals and the radio base stations, but it is also possible to utilize various types of radio interfaces for the mobile communication system as currently proposed.

On the other hand, the MSRs 220 and 221, the gateway 223 and Internet 224 constitute a transmission sub-system in the communication system of FIG. 5.

Each of the MSRs 220 and 221 is a router device which is capable of switching the transfer target at IP level at least when the mobile terminal 201 moves over the radio base stations connected to this MSR, and has a cut-through path set up/release function and a datalink layer level switching function for realizing a switching at VPI/VCI (Virtual Path Identifier/Virtual Channel Identifier) level, in addition to the IP level transfer target switching.

Moreover, each of the MSRs 220 and 221 also has an ATM switch function for providing the PVC (Permanent Virtual Connection) service capable of bidirectional communications by executing the ATM cell exchange processing by the ATM protocol according to the ITU-T recommendation I.361, as well as the SVC (Switched Virtual Connection) service according to the ATM Forum and ITU-T recommendation, and is capable of realizing any of one-to-one, one-to-N, and broadcast connection forms according to PVC/SVC.

The gateway 223 is a gateway device that at least has a function for converting private IP addresses into global IP addresses (such as NAT: IP Network Address Translator, RFC 1631) and the Firewall function, in addition to the functions of the MSR described above, as it is connected to Internet 224 which is the global IP network.

Internet 224 is the global network that has been expanded to a commercial network connecting 173 countries around the world, 100 million users, and 9.47 million host computers by January 1996, in which three network groups of the commercial Internet group such as IIJ, the PC communication network group such as NIFTY-Serve, and the academic Internet group such as WIDE are inter-connected and data are routed according to global IP addresses. In Internet 224, various application services including information transfer type services such as E-mail and File Transfer, information search type service such as Net News, information providing type service such as WWW, and instantaneous dialogue type service such as Telnet are already realized.

Figure 7:
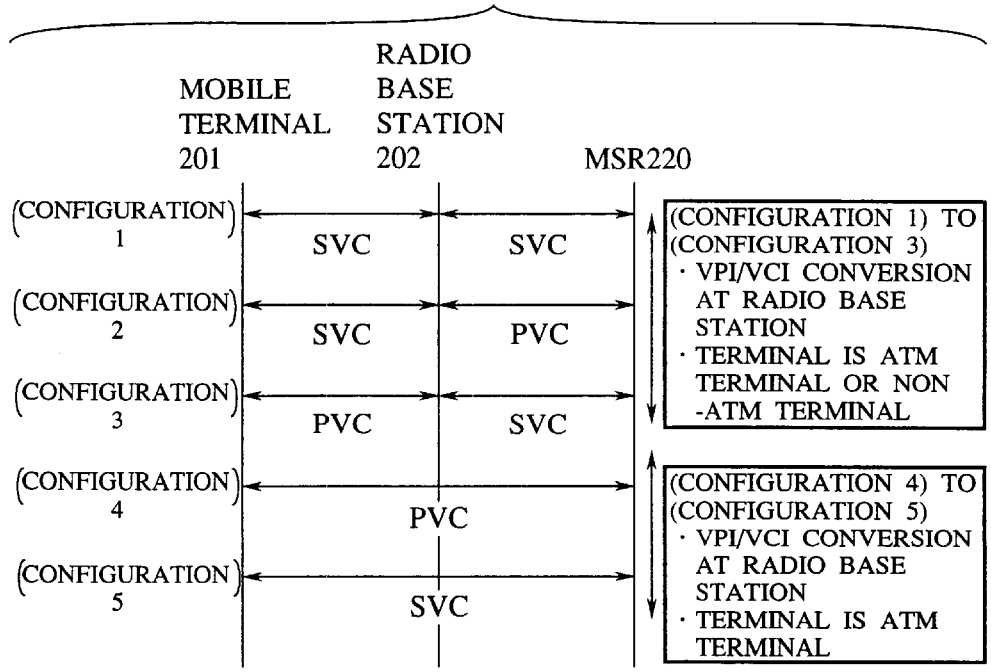
FIG. 7 is a diagram showing exemplary channel settings among a mobile terminal, a radio base station, and an MSR in the mobile communication system of FIG. 5.
Figure 8:
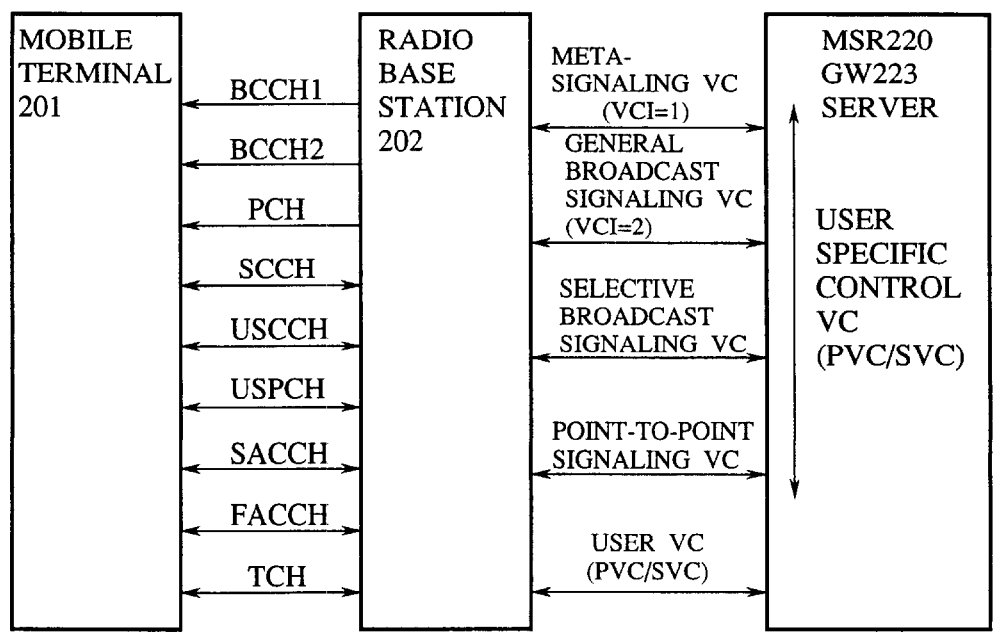
FIG. 8 is a diagram showing exemplary channels to be used among a mobile terminal, a radio base station, and an MSR in the mobile communication system of FIG. 5.

Note that, among the mobile terminal, the radio base stations and the MSRs described above, radio and wire logical channels as shown in FIG. 7 and FIG. 8 are defined, by which the transfer of user data (such as IP packets) can be carried out in any of the formats shown in FIG. 7 and FIG. 8 through prescribed logical channels or logical channels set up on-demand. In FIG. 7, the configuration 1 uses an SVC setting between the mobile terminal 201 and the radio base station 202 and an SVC setting between the radio base station 202 and the MSR 220, the configuration 2 uses an SVC setting between the mobile terminal 201 and the radio base station 202 and a PVC setting between the radio base station 202 and the MSR 220, the configuration 3 uses a PVC setting between the mobile terminal 201 and the radio base station 202 and an SVC setting between the radio base station 202 and the MSR 220, the configuration 4 uses a PVC setting between the mobile terminal 201 and the MSR 220, and the configuration 5 uses an SVC setting between the mobile terminal 201 and the MSR 220.

The control sub-system in the communication system of FIG. 5 has the following server and client functions (1) to (8).

(1) Location Moving Management Function (MM):

The location moving management function has a part or a whole of the following functions:

a function for managing and storing location information such as location registration;

a function for controlling start, response, response detection, execution, etc. of the paging;

a function for carrying out start judgement processing and execution of the handoff; and a function for carrying out system information notification, etc.

This location moving management function is a function for realizing the handoff at the datalink layer level, and includes an MM1 function provided at the IP network and the mobile terminal 201 in order to realize the channel switching (handoff control) during the communication of the mobile terminal 201, and an MM2 function provided at the mobile communication network and the cellular terminal 227 in order to realize the channel switching (handoff control) during the communication of the cellular terminal 227.

These MM1 function and MM2 function may be realized by the same protocol at different server locations, or by different protocols. Also, the MM1 function may be equipped with the paging response detection function, the handoff start judgement processing and execution function, and the system information notification function alone. Alternatively, the MM1 function may be utilizing the other mechanism such as Mobile IP as the function for managing and storing location information such as location registration, and equipped with all the other functions described above.

(2) Mobile IP Function (HA, FA):

In order to support Mobile IP, it is necessary to provide a HA (Home Agent) having a function for managing a current location information at a visited site of the mobile terminal 201 and an FA (Foreign Agent) having a function for registering a location information at a visited site of the mobile terminal 201 into HA.

In addition to the above noted function, HA also has a function for transmitting IP packets to be transferred to the mobile terminal 201 which is moving to a subnet outside the home network at which HA is located, that is, IP packets destined to the home address (original address at the home network before moving) of the mobile terminal 201, by encapsulating these IP packets in packets destined to the current location address of the mobile terminal 201.

Also, in addition to the above noted function, FA also has a function for decapsulating encapsulated IP packets transferred from HA to the visited site network to take out original IP packets, and transfer the original IP packets to the datalink.

The Mobile IP protocol is defined in RFC 2002 and includes a mode which uses a router called FA for delivering packets for the mobile terminal 201 to its visited site, and a mode in which the mobile terminal 201 itself plays a role of FA. Either mode can be used in this embodiment.

(3) Dynamic Address Allocation Function (DHCP):

The dynamic address allocation function is a function for allocating and releasing addresses such as IP addresses temporarily. As a protocol for realizing dynamic allocation of IP addresses, DHCP of RFC 1541 may be used, or a protocol for carrying out totally different dynamic IP address allocation/release may be used.

(4) Address Conversion Function (NAT):

The address conversion function is a function for converting private IP addresses into global IP addresses, and the function of NAT of RFC 1631 may be utilized, for example.

(5) Call Control Function (CC):

The call control function includes a function for setting up, maintaining, changing and releasing connection/call of ATM, etc., and a function for carrying out call admission control based on radio resources, allocation/reservation control for radio and network resources (rewriting of a radio channel-VPI/VCI correspondence management table), QOS control, etc.

(6) Radio Management Function (RT):

The radio management function includes functions of radio resource/radio connection control (selection, reservation, release, etc.), radio channel monitoring, and handover related processing associated with radio quality change.

(7) Switch Control Function (SWC):

The switch control function includes a function for connecting, maintaining, changing, disconnecting ATM connection (rewriting a VPI/VCI table), traffic control function such as CBR, rt/nrt VBR, ABR, UBR, and a scheduling function and a priority control function for buffer management such as WFQ (Weighted Fair Queueing).

(8) Cut-through Path Setting Function (FANP):

The cut-through path setting function is a function for making a layer 2 switch on a lower level layer handling the transfer processing of the router device. Prior to the cut-through, the layer 2 information such as MAC address is exchanged by a specific protocol between terminals or router devices. Then, the router device realizes the transfer by setting up a cut-through path for by-passing through the layer 2 switch without bringing the processing up to the network layer (layer 3). Here, the FANP function may be used as the cut-through path setting function.

Next, the radio control channel configuration and wire control channel configuration shown in FIG. 6 to FIG. 8 will be described.

As shown in FIG. 6, the radio control channels are largely divided into the common control channels and the individual control channels.

The common control channels are control channels to be utilized commonly by the radio terminals existing within the radio zones of the radio base stations 202, 203, 210 and 211, by which each radio terminal transfers control information to the radio base stations by random accesses. Downlink common control channels can be used as general broadcast channels or selective broadcast channels. The individual control channels are control channels allocated to the radio terminals in point-to-point fashion, which are allocated on-demand by requests from the radio terminals or requests from the radio base stations, by which each radio terminal transfers control information prior to communication start, and during communication.

On the other hand, control channels as shown in FIG. 8 are defined for the wire interfaces.

The meta-signaling VC is a control channel used in carrying out a procedure (meta-signaling procedure) for setting up/releasing signaling VC other than those set up in advance. The general broadcast signaling VC is a signaling VC for transferring control information in broadcast fashion toward all nodes, which is a unidirectional control channel from a network to terminals. The selective broadcast signaling VC is a unidirectional control channel from a network to terminal group for each service profile (which identify a group of similar terminals accommodated in the same interface according to extension numbers, transmission powers, service types, etc.). When this selective broadcast signaling VC is used, there is a merit in that it is unnecessary to process unrelated arriving signals at a terminal and it is possible to accommodate terminals using different signal protocols in the same interface. The point-to-point signaling VC is a signaling VC to be set up for each terminal which is capable of bidirectional communications.

Also, the exchange of control information between various types of control function modules/functions to be described below is carried out either by utilizing the above described radio control channels and wire control channels directly or by using the following control channels A to F, each of which is defined as a single logical control channel by mapping both.

Control channel A: a control channel set up in advance or allocated on-demand, between the mobile terminal and radio base station.

Control channel B: a control channel set up in advance or allocated on-demand, between the mobile terminal and the MSR.

Control channel C: a control channel set up in advance or allocated on-demand, between the mobile terminal and the gateway.

Control channel D: a control channel set up in advance or allocated on-demand, between the radio base station and the MSR.

Control channel E: a control channel set up in advance or allocated on-demand, between the MSRs.

Control channel F: a control channel set up in advance or allocated on-demand, between the MSR and the gateway.

In each of these control channels A to F, a part of a whole of the general broadcast channel, the selective broadcast channel, and the point-to-point channel are set up. These types of channels may be set up not only in the control channel but also in the communication channel by default.

The general broadcast channel as defined above is effective when it is desired to control a plurality of terminals or nodes simultaneously, but in the case of usage similar to LAN (the case in which control messages are frequently broadcast in the MAC layer or the IP layer) it is also possible to use the general broadcast channel as defined above by mapping it to the broadcast channel for broadcasting in the MAC layer or the IP layer that is used in the LAN.

Also, the selective broadcast channel can be mapped to PCH and BCCH, and it can also be used by mapping when it is desired to broadcast within subnet which is an IP routing unit. Besides that, it is possible to transmit information in a form of appropriately limited range while making communications with clients easy by defining these channels in correspondence to the logical broadcast areas of various servers. As described above, by mapping the subnet area to the selective broadcast channel, it becomes sufficient to transmit the agent advertisement message of FA to this selective broadcast channel, so that the very good matching can be realized. In other words, the agent advertisement message of FA is to be broadcast within the subnet, and when one selective broadcast channel is set as a channel for broadcasting within the subnet in advance, the agent advertisement message can be broadcast within this subnet by simply transmitting the agent advertisement message to this selective broadcast channel.

Note that the above described general broadcast channel and selective broadcast channel are basically downlink (network→terminal) unidirectional channels, and uplink (terminal→network) unidirectional channel as defined in Ethernet is not defined in the conventional communication system. However, in order to construct it within the communication system with good matching without changing the protocol of the computer system it is preferable to adopt a configuration in which the uplink general broadcast channel and selective broadcast channel are defined and used by mapping with multicast and broadcast of the computer network.

Also, it is possible to broadcast the VPI/VCI value defined as the selective broadcast channel from BCCH of the radio base station, and use that VPI/VCI value as a radio base station identifier, a server identifier for identifying a service area of a server, a location registration area identifier, or a subnet identifier. For these control channels, channels already defined by the conventional signaling should be used as much as possible, and when the conventionally unavailable uplink general broadcast channel and selective broadcast channel are newly defined, they should be standardized, in order to achieve the greater merit of connectability (which guarantees the proper operation in the case of connecting different systems or devices of different vectors when identification number and significance (usage) of a channel to be used as the general broadcast channel or the selective broadcast channel is specified by the standard specification and the like) and generality.

On the other hand, in the case of using a configuration in which the user defined control channels are provided, the connectability and generality are inferior but there is a merit in that it has a great flexibility as it is possible to freely define and utilize each channel.

Also, in order to realize the point-to-multipoint transfer and the like easily, Q.2931 provides messages called ADD PARTY and DROP PARTY so that the adding/dropping to/from multicast can be realized easily. By using them, it is also possible to realize a configuration in which channels corresponding to the above described general broadcast VC and selective broadcast VC are formed and utilized for the similar usage and purpose.

Also, the exchange of control information between a server and a client other than various functions to be described below (functions not shown in figures) can be carried out similarly by using logical channels defined in advance, or logical channels set up on-demand from logical channels defined in advance. In this control channel, a part or a whole of the general broadcast channel, the selective broadcast channel, and the point-to-point channel will be set up.

Here, the radio base station has a configuration having a function for transferring the control channel in the radio section to the uplink broadcast or multicast VC in the wire section. More specifically, the radio base station shown in FIG. 8 has a function for transferring a control channel such as SCCH or USCCH defined on some specific radio channel to the general broadcast VC or the selective broadcast VC in the wire section, so that a control message transmitted by the mobile terminal 201 to the radio base station by using the control channel such as SCCH or USCCH of the above noted specific radio channel is transferred to the general broadcast VC or the selective broadcast VC defined in the wire section, and multicasted to some specific area or broadcasted within some specific area. Here, it is possible to determine in advance that SCCH should be mapped to the multicast and the USCCH should be mapped to the broadcast. Alternatively, instead of determining which one to map for each logical channel in this manner, it is also possible to provide an identification information for identifying as to which one to map on the physical slot or physical frame.

The radio base station has a configuration equipped with a similar transfer function for the downlink direction of MSR→radio base station→mobile terminal as well.

There is also a configuration in which the transfer of the selective broadcast VC in the radio section and the wire section and the transfer of the general broadcast VC in the radio section and the wire section are carried out by setting up the general broadcast VC and the selective broadcast VC in VPI/VCI of the radio section similarly as in VPI/VCI of the wire section. In this case, a control message transmitted to the radio base station by using any radio channel and any logical channel will be multicasted or broadcasted to some specific area as the selective broadcast VC or the general broadcast VC as long as it is in some specific VPI/VCI.

FIG. 9 shown an exemplary management architecture. The management sub-system shown in FIG. 9 comprises an IP private network management system and a mobile communication network management system, where the IP private network management system is managed by using NMP/UDP/IP which are the standard management protocols of Internet, while the mobile communication network management system is managed by using CMIP (Common Management Information Protocol). This management sub-system can be in forms of: an M1 interface which is an interface for managing ATM routers, etc., each of which formed by installing an ATM interface adaptor card to an ATM terminal (server) or a general purpose router; an M2 interface which is an interface for managing the private ATM switch, the MSR, and the gateway; an M3 interface which is a management interface for the IP private network management system and the mobile communication network management system; and an M4 interface by which the the mobile communication network management system manages the mobile communication network.

The private IP network management system is the M3 interface by which the mobile communication network can manage a part of the private network virtually. A typical MIB (Management Information Base) of the above described M1/M2/M3 interface is defined by IETF as RFC 1695: "Definitions of Managed Objects for ATM Management Version 8.0 using SMIv2".

The above described management sub-system has a configuration in which the management of the radio access sub-system is added to a framework of the conventional wire network management, where the following management items (1) to (5) are added as the radio characteristic MIB in addition to the conventional M1 interface.

(1) Radio Traffic Management:

This periodically monitors a utilization state of each radio link, a bandwidth allocation state, a number of passing packets, and a number of packet errors, while carrying out the monitoring of traffic in the specified connection.

(2) Radio Communication Quality Management (Radio System Performance Management):

This carries out the monitoring of communication quality (FER: Frame Error Rate, BER: Bit Error Rate, SIR: Signal to Interference Ratio, etc.) of each radio link, as well as the monitoring of synchronization establishing state.

(3) Radio Trouble Management:

This carries out the monitoring of an occurrence state for troubles in each radio link or node such as electrical state and transmission error. For example, it can detect such a case where a building or the like is built after the base station is placed so that the regular shadowing occurs and causes some trouble for communications. It can eliminate the trouble by changing the radio system configuration such as switching the antenna direction remotely, using the radio system configuration management to be described below.

(4) Radio System Configuration Management:

This carries out various types of setting and changing of system parameters and the like for carrying our radio management/control such as a number of radio channels, a sector selection state, an antenna switching control, and a synthesizer switching control for each node (radio base station), and a display of each node state. In addition, this can also carry out setting of the transmission power control, etc. Moreover, this makes it possible to change the configuration of a radio base station to which accesses are concentrated so that there is a shortage of radio channels compared with the other radio base stations, in the radio traffic management of (1) described above.

(5) Radio System Charge Management:

This monitors the connection set up time (especially the radio channel occupation time in the radio section) or the IP address allocation time and the IP datagram transfer amount in order to carry out the time charging based on the monitored time and the amount charging based on the monitored amount. In addition, this also carries out the secret management, etc.

Here, the timing for carrying out the address allocation/registration/release, and the connection set up/release can be at a time of power ON, or at a time of standby and at a time location registration, or else at a time of call origination or call termination, and it is expected that whichever is cheapest at a time of carrying out data transmission and reception will be adopted depending on the charging schemes. For this reason, a concrete method for realizing the above described feature and at what timing should the address allocation/registration/release and the connection set up/release be carried out in that case will be described here in relation to services as well.

Figure 10A:
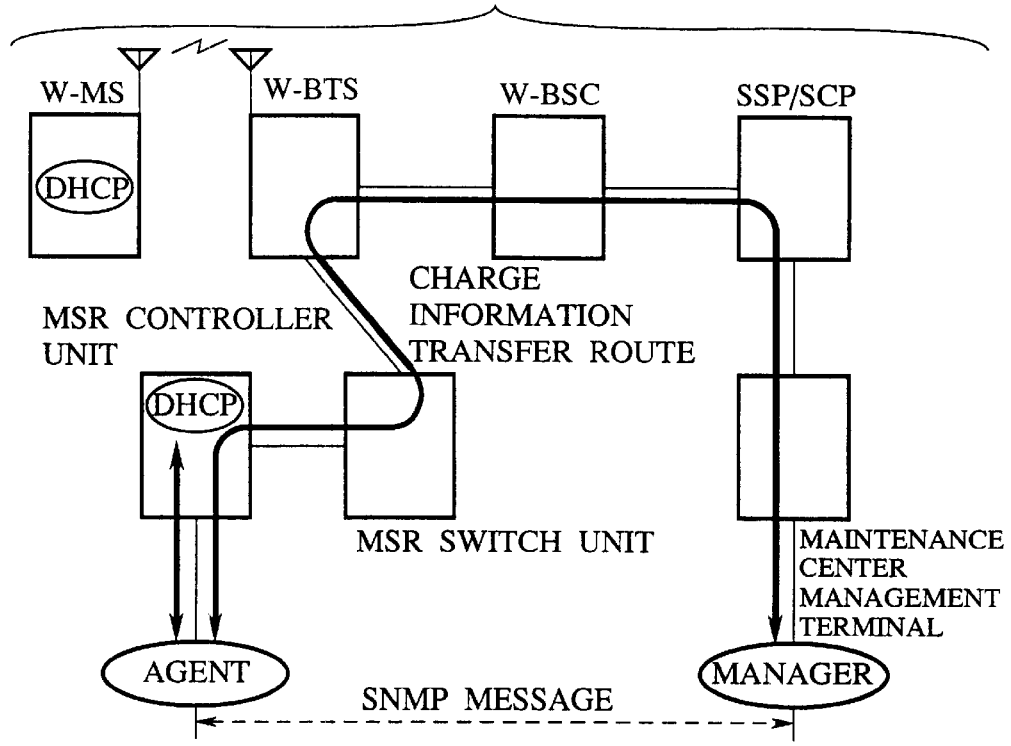
FIGS. 10A and 10B are diagrams showing exemplary charging methods that can be used in the mobile communication system of FIG. 5.
Figure 10B:
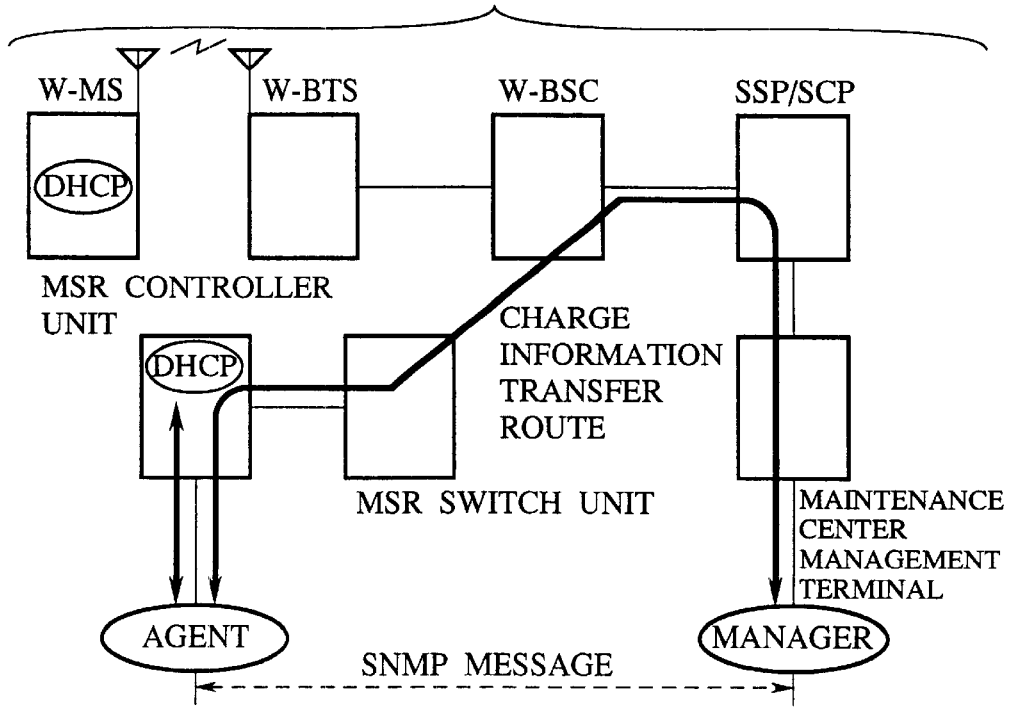

FIGS. 10A and 10B show a method of time charging based on the IP address allocation time at a timing of the IP packet communication by the mobile terminal (W-MS) from the radio base station (W-BTS) via the MSR. In the radio communication system shown in FIGS. 10A and 10B, the time for which each mobile terminal maintains the IP address is calculated by the IP address allocation/release function (DHCP server function, for example), and the charge related information is collected by exchanging charge related information messages by SNMP between the maintenance center management terminal and the MSR. The collection of the charge related information can be realized by a method of polling from the maintenance center management terminal to each MSR or a method of notification from the MSR to the maintenance center management terminal by trap, and either method or their combination may be used.

FIGS. 10A and 10B use a configuration in which the role of the IP network management system of FIG. 9 is also played by the maintenance center management terminal, where this management terminal has a CMIP function for carrying out the charge management within the mobile communication network in addition to SNMP.

Here, in the case where this maintenance center management terminal is connected to an SSP/SCP, the charge information is exchanged through a route shown in FIG. 10A or FIG. 10B. In such a case of the time charging based on the IP address allocation time, it is preferable to have the IP address allocated at a time of call origination or call termination, rather than at a time of power ON or at a time of standby and at a time of location registration, and release the IP address at a time of disconnection.

Figure 11:
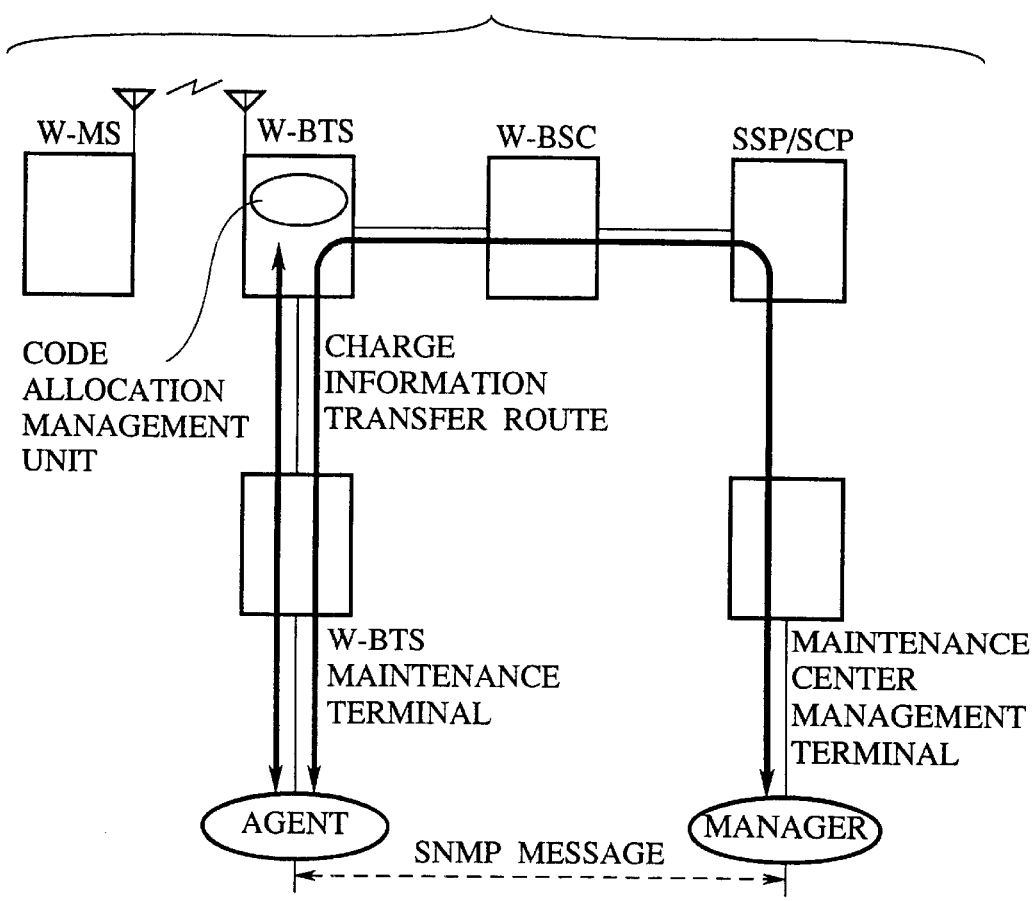
FIG. 11 is a diagrams showing another exemplary charging method that can be used in the mobile communication system of FIG. 5.

On the other hand, FIG. 11 shows a method in which the radio base station (W-BTS) calculates and manages the time and the number of radio channels allocated to each mobile terminal, and the charge information is exchanged between the maintenance terminal of the radio base station and the maintenance center management terminal. In this case, the IP address allocation time is unrelated to the charge, so that the IP address may be allocated at a time of power ON, at a time of standby and at a time of location registration, or at a time of call origination or call termination.

Now, the manner by which the IP address allocation/release function provided in the MSR as described above calculates the time for which the IP address is maintained will be described. The method for calculating the time for which the IP address is maintained can be, for example, a method in which the time at which the IP address is allocated to the mobile terminal and the time at which the IP address is released by the mobile terminal are stored, and a message containing timestamps for these allocation start and allocation end is notified to the MSR at a time of IP address release so that the MSR calculates the maintained time from the start time and the end time indicated in the received message.

The IP address allocation/release operation will be carried out as follows. First, an IP address allocation request message containing a terminal ID is transmitted from the mobile terminal to the MSR. Upon receiving this IP address allocation request message, the MSR determines an IP address to be allocated to that mobile terminal, and registers it to an IP address allocation management table for managing a correspondence between the terminal ID and the IP address, and then transmits an IP address allocation response message containing at least a set of the terminal ID and the IP address. Upon receiving this IP address allocation response message, the mobile terminal stores the IP address allocation start time.

Subsequently, the mobile terminal stores the end time at a time of ending communication, and an IP address release request message containing the terminal ID, the IP address, the allocation start time, and the end time is transmitted from the mobile terminal to the MSR. Upon receiving this IP address release request message, the MSR calculates the IP address allocation time from the start time and the end time and stores it, and transmits an IP address release response message to the mobile terminal. Upon receiving this IP address release response message, the mobile terminal clears the corresponding IP address allocation start time and end time stored therein. If the IP address release response message is not received, the IP address release request message is re-transmitted.

The method in which the mobile terminal transmits a message containing the allocation start time and end time to the MSR and the MSR calculates the IP address allocation time from the received message has been described above, but it is also possible to use a method in which the mobile terminal calculates the IP address allocation time from the allocation start time and end time and transmits a message containing the calculated IP address allocation time to the MSR.

These methods are directed to the case in which the mobile terminal stores the IP address allocation start time and end time or calculates the IP address allocation time and notifies the MSR, but the charging cannot be made by these methods in the case where the mobile terminal has moved out of zone. In order to resolve this problem, there is a need to make it possible to realize the charging based on the IP address allocation time at the MSR even when there is no notification from the mobile terminal as the mobile terminal has moved out of zone, in addition to the method in which the mobile terminal stores the IP address allocation start time and end time or calculates the IP address allocation time and notifies the MSR.

As a method for resolving this problem, it is possible to use a method in which the the IP address allocation/release function of the MSR defines a lease time for which the IP address is leased to the mobile terminal, and manages the IP address allocation using a lease timer such that the IP address allocation with respect to the mobile terminal is released when the extension/renewal of the lease time is not requested from the mobile terminal within this lease time.

More specifically, this method can be realized as a method in which the DHCP server function is provided in the MSR and the MSR (DHCP server) calculates the elapsed time of the lease time according to the lease time negotiated between the mobile terminal and the MSR (DHCP server) at a time of IP address allocation by the DHCP and its extension/renewal. In the following, the detailed operation in this case will be described.

The mobile terminal determines the lease time using the DHCP REQUEST message transmitted to the DHCP server function of the MSR and the DHCP ACK/NAK, and requests the extension of the lease time by the DHCP REQUEST message when the communication cannot be finished within a range of the lease time. Upon receiving this DHCP REQUEST message for requesting the extension, the MSR (DHCP server) clears the lease timer after the elapsed time indicated by the lease timer is added to the immediately previous total elapsed time. Also, upon receiving the DHCP RELEASE message, the MSR (DHCP server) calculates the IP address allocation time by adding the elapsed time indicated by the lease timer to the immediately previous total elapsed time.

When the DHCP REQUEST message or the DHCP RELEASE message from the mobile terminal is not received by the DHCP server before the timeout of the lease timer, the IP address allocation time is calculated by adding the lease time to the immediately previous total elapsed time. Here, the case where the IP address allocation/release function such as the DHCP server function is provided in the MSR has been described, but it is also possible to carry out the charging based on the IP address allocation time by the similar method even in the case where the IP address allocation/release function such as the DHCP server function is provided separately from the MSR.

In the above, the schematic configuration (configuration of the radio access sub-system and the transmission sub-system) of the physical part (hardware part) and the schematic configuration (configuration of the management sub-system and the control sub-system) of the logical part (software part) of the communication system according to this embodiment as shown in FIG. 5 have been described. Next, the handoff control operation of the MSR will be described.

The handoff control operation comprises a moving detection (handoff trigger detection) phase F1, a visited site Judgement/notification phase F2, and an address/connection changing phase F3, which are executed in an order of F1→F2→F3, and the data transfer (IP packet transfer) to the visited site connection is carried out after the execution of the address/connection changing phase F3 is completed. Here, the data transfer to the originally located site connection may be continued during the handoff operation, or stopped in the case of data communication for which the real time nature is not required, or else switched between these two options according to the communication quality request.

The moving detection phase F1 is a phase for detecting the moving between physical devices (moving between base stations, moving between MSRs) and the moving between functional modules (moving between subnets (FAs), the moving between DHCPs).

Here, the moving between base stations can be detected based on the radio link quality degradation between the base station and the mobile terminal, or the fact that the base station ID (BS ID) that is periodically notified from the radio base station becomes different. The former case can be realized as a terminal initiative type in which the detection is made by the terminal or a base station initiative type in which the detection is made by the base station, whereas the latter case is going to be the terminal initiative type.

Also, the moving between the functional modules can be detected based on the fact that various server IDs such as subnet ID (FA ID) and DHCP server ID that are periodically notified from the radio base station or from the MSR via the radio base station become different. This detection of the moving between functional modules is basically the terminal initiative type, similarly as in the case of detecting the moving between base stations based on the fact that the base station ID becomes different.

The visited site Judgement/notification phase F2 is a phase for notifying which identifier of which mobile terminal has changed how when the moving is detected, and judging the visited site of the mobile terminal. In the case of the terminal initiative type, the mobile terminal 201 is carrying out the detection of the moving and the judgement of the visited site so that when the moving is detected the mobile terminal carries out the operation to notify the own terminal ID and ID values at the visited site (as well as at the originally located site if necessary) of various IDs (base station ID, MSR ID, subnet ID, DHCP server ID) that are changed, to the MSR or a server, Agent, or gateway that needs to switch its operation, in a form of a handoff request message. Alternatively, it is also possible to adopt a configuration in which the handoff request message is transmitted to the MSR, and the MSR that received this handoff request message notifies this to the servers corresponding to the IDs that are changed on behalf of the mobile terminal 201.

The base station initiative type can basically detect only the moving between base stations, so that the moving is detected by the radio base station and the MSR judges the visited site. Namely, they operate as in the following (1) to (4).

(1) The radio base station detects the moving of the mobile terminal 201 according to the degradation of its radio link quality, and notifies this fact along with the terminal ID of the mobile terminal 201 and the base station ID of this radio base station which made the detection, to the MSR in a form of the handoff request message.

(2) Upon receiving this handoff request message, the MSR figures out neighboring radio base station area of the radio base station according to the value of the base station ID of the radio base station as described within that handoff request message, and transmits a radio link state measurement request message in a form containing the terminal ID as described within that handoff request message to each radio base station within the neighboring radio base station area.

(3) Upon receiving this radio link state measurement request message, each radio base station figures out the mobile terminal 201 according to the terminal ID contained within that message, measures the radio link quality between this base station and the mobile terminal 201, and notifies the measurement result along with the terminal ID, to the MSR in a form of a radio link state measurement response message.

(4) Then, the MSR judges a radio base station that covers an area to which the mobile terminal 201 has moved according to the radio link state measurement response messages transmitted from the radio base stations within the neighboring radio base station area.

The address/connection changing phase F3 is a phase for carrying out the rewriting of the address management/conversion table (DHCP table, NAT table) and the connection management table (ARP table, VPI/VCI table) that are being set up, the address allocation and release, and the connection set up and release, according to the change of various IDs (base station ID, MSR ID, subnet ID, address server ID).

In the address/connection changing phase F3, the address changing (allocation, release) and the connection changing (set up, release) are carried out first (address changing phase, connection changing phase), and then the updating of the address management/conversion table and the connection management table is carried out (management table updating phase).

Here, either one or both of the connection changing and the address changing will be carried out, and in the case where both of them to be are carried out, either one may be changed before the other one or both of them may be changed simultaneously if it is possible to change both of them simultaneously.

Here, the re-call origination type handoff will be realized in the case of carrying out the set up of the visited site connection after the release of the originally located site connection, or the operation to temporarily becoming the multicast state and then returning to the unicast transfer state will be realized in the case of carrying out the release of the originally located site connection after the set up of the visited site connection. The same is also true for the address changing as well.

Also, in the case of the moving over MSRs, besides the methods utilizing Mobile IP or VIP, the handoff can be realized by a method in which the handoff due to the moving of the terminal occurs by using the Link State type routing protocol such as PNNI routing protocol for example between the MSRs and the change of transfer route is notified to the corresponding MSR. In this case, it is necessary to update the routing table in addition to the connection management table and the address management table.

In the above, the operation procedure for the handoff control by the MSR has been described. Next, the concrete examples of a table configuration for the MSR and a method for setting up a connection between the MSR and the mobile terminal will be described.

Figure 12:
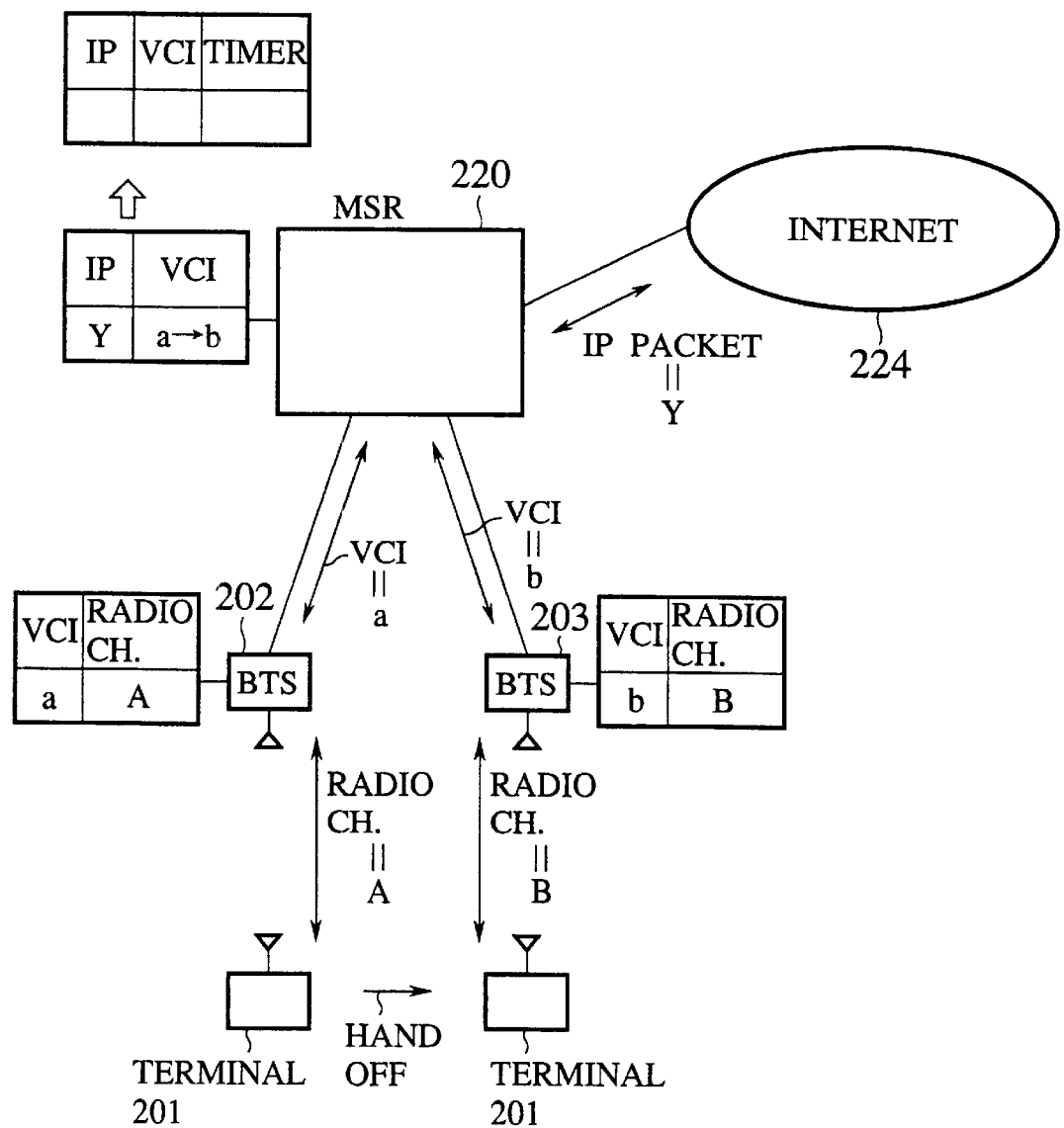
FIG. 12 is a diagram showing one exemplary table updating operation at a time of handoff control operation in the mobile communication system of FIG. 5.

First, with references to FIG. 12 to FIG. 14, the table updating operation at a time of the handoff control operation in the case of using the connection set up as in (configuration 4) of FIG. 7 (where a PVC is set up between the MSR and the mobile terminal) will be described. FIG. 12 shows a concrete example of the handoff control operation by the MSR. The radio communication system shown in FIG. 12 comprises the Internet 224, the MSR 220, the radio base stations 202 and 203, and the mobile terminal 201, where the MSR 220 has a connection management table (ARP table) for managing a correspondence between IP address and VPI/VCI, and each of the radio base station 202 and 203 has a VPI/VCI-radio channel management table.

Also, in the radio communication system shown in FIG. 12, the control channel B as defined above and the communication channel are set up in advance in the manner of (configuration 4) of FIG. 7, and it is assumed that at least the base station ID, a PVC of the control channel B {a set of (radio CH, VPI/VCI)} and a PVC of the communication channel {a set of (radio CH, VPI/VCI)} are notified from each radio base station.

In FIG. 12, in the case where the mobile terminal 201 carries out the IP packet communications with Internet 224, the IP packet communications are carried out by using PVCs {PVC1 (radio CH=A, VPI/VCI=a), PVC2 (radio CH=B, VPI/VCI=b)} that are set up between the MSR 220 and the mobile terminal 201.

Now, for the case in which the mobile terminal 201 moves from the radio base station 202 to the radio base station 203, the procedure for switching from a state in which the IP packet communication with Internet 224 is carried out by using PVC1 to a state in which the IP packet communication with Internet 224 is to be carried out by using PVC2 will be described. Here, it is assumed that the MSR 220 is constituting a single subnet AA.

First, the mobile terminal 201 detects the moving from the radio base station 202 to the radio base station 203 by the fact that the base station ID that is periodically notified from the radio base station has changed. Then, the mobile terminal 201 notifies a handoff request message containing IP address=Y of the mobile terminal 201 and VPI/VCI=b of PVC2 to the MSR 220, using the control channel B of the radio base station 203 which is the radio base station used after the moving. Upon receiving this handoff request message, the MSR 220 updates the connection management table (ARP table) shown in FIG. 12 according to IP address=Y and VPI/VCI=b contained within this handoff request message.

This completes the handoff control operation, so that the IP packet communication between Internet 224 and the mobile terminal 201 is switched from a communication using PVC1 to a communication using PVC2. In addition, in the case where the MSR 220 explicitly notifies the handoff completion to the mobile terminal 201 and the mobile terminal 201 carries out the switching to the restart of the IP packet transmission from the mobile terminal 201 to Internet 224 by using this handoff completion message as a trigger, the MSR 220 may transmit a handoff completion message (which contains information contained in the handoff request message such as IP address=Y and VPI/VCI=b) to the mobile terminal 201, using the control channel B.

The example of FIG. 12 is directed to the case of using a configuration that contains IP address and VPI/VCI for the handoff request message to be transmitted from the mobile terminal 201 to the MSR 220, where IP address is used as an identifier (terminal ID) capable of identifying the terminal while VPI/VCI is used as an identifier (base station ID) indicating a location of a visited site of the terminal. In this case, the IP address can be either a global IP address or a private IP address, and also can be either a fixed IP address or a dynamically allocated IP address.

Note that when the fixed IP address is used as the terminal ID, it suffices to carry out the updating of the ARP table exactly as in the handoff control operation of FIG. 12, and even when the IP address is dynamically allocated by the MSR 220, it suffices to carry out the updating of the ARP table similarly as in the case of using the fixed IP address because there is no IP address change for the moving within the MSR 220 which is constituting a single subnet as shown in FIG. 12.

However, when the MSR 220 constitutes plural subnets so that the IP address changes in conjunction with the moving, it is necessary to cancel a VCI corresponding to the old IP address and register a VCI corresponding to the new IP address so that it is necessary to use the handoff request message that at least contains the old IP address and (new IP address, VPI/VCI) set. In such a case where the terminal ID is temporarily allocated and has a possibility of being changed in conjunction with the moving, there is a need to notify the old terminal ID as well when the change occurs, whereas in the case where the terminal ID is fixedly allocated or temporarily allocated but has no possibility of being changed in conjunction with the moving, it suffices to notify a value of the base station ID corresponding to the terminal ID.

Here, the old IP address is also notified in order to cancel a VCI corresponding to the old IP address, but when a timer as shown in FIG. 12 is used, a VCI corresponding to the old IP address can be cancelled by the timeout of the timer, without requiring the notification of the old IP address. In this case, however, when the DHCP and the like allocates the same IP address before its registration is cancelled on the table, there arises a problem that the IP packet transmission will be started erroneously toward VPI/VCI that has already been set in correspondence.

In order to resolve this problem, the following three methods (1) to (3) are available.

(1) A method in which an IP address is returned to an idle IP address management queue from which the DHCP and the like carries out the dynamical IP address allocation only when the timeout of the IP-VPI/VCI table occurs and the registration is cancelled.

(2) A method in which the allocation is made from an IP address that is remaining in the idle IP address management queue for long time rather than immediately allocating an IP address for which the dynamical IP address allocation has been just released. (This can be realized by operating the idle IP address management queue in First In First Out fashion rather than Last In First Out fashion.)

(3) A method in which a newly allocated IP address is always registered in correspondence to the current location. By always carrying out the operation to register a VPI/VCI value corresponding to the base station ID when an IP address is allocated, it becomes possible to avoid the erroneous delivery.

Note that the methods using a VPI/VCI value as the base station ID have been described here, but this base station ID is an information which is periodically notified from the radio base stations 202 and 203. This VPI/VCI value to be used as the base station ID may not necessarily be a single value and the radio base station may notify a plurality of VPI/VCI values. In such a case, it suffices for the terminal to select one of a plurality of VPI/VCI values randomly for example, and notify it. In such a case of defining a plurality of VPI/VCI values as the base station ID, by mapping each VPI/VCI value to a corresponding service class and managing the number of users that can use each VPI/VCI value, there is a merit in that it becomes possible to accommodate many users while maintaining the communication quality of each service class.

As described, the case where the MSR 220 constitutes plural subnets so that the IP address changes in conjunction with the moving requires the operation different from the case where the MSR 220 constitutes a single subnet so that the IP address does not change in conjunction with the moving.

In addition, in such a case where the dynamical IP address of the mobile terminal 201 changes within the MSR 220, in order to make the IP address of the mobile terminal 201 appears as if it is not changing from a viewpoint of Internet 224, it is necessary to provide an IP address conversion function and an IP address conversion table for the purpose of converting an IP address (IP address=G) to be used in making an access to the mobile terminal 201 between Internet 224 and the MSR 220 into an IP address to be used in making an access between the MSR 220 and the mobile terminal 201.

In the following, the concrete example of the handoff control operation in the case where the MSR 220 constitutes plural subnets will be described with reference to FIG. 47. The radio communication system shown in FIG. 47 comprises the Internet 224, the MSR 220, the radio base stations 202 and 203, and the mobile terminal 201, where the MSR 220 has a connection management table (ARP table) for managing a correspondence between IP address and VPI/VCI, and each of the radio base station 202 and 203 has a VPI/VCI-radio channel management table.

Figure 47:
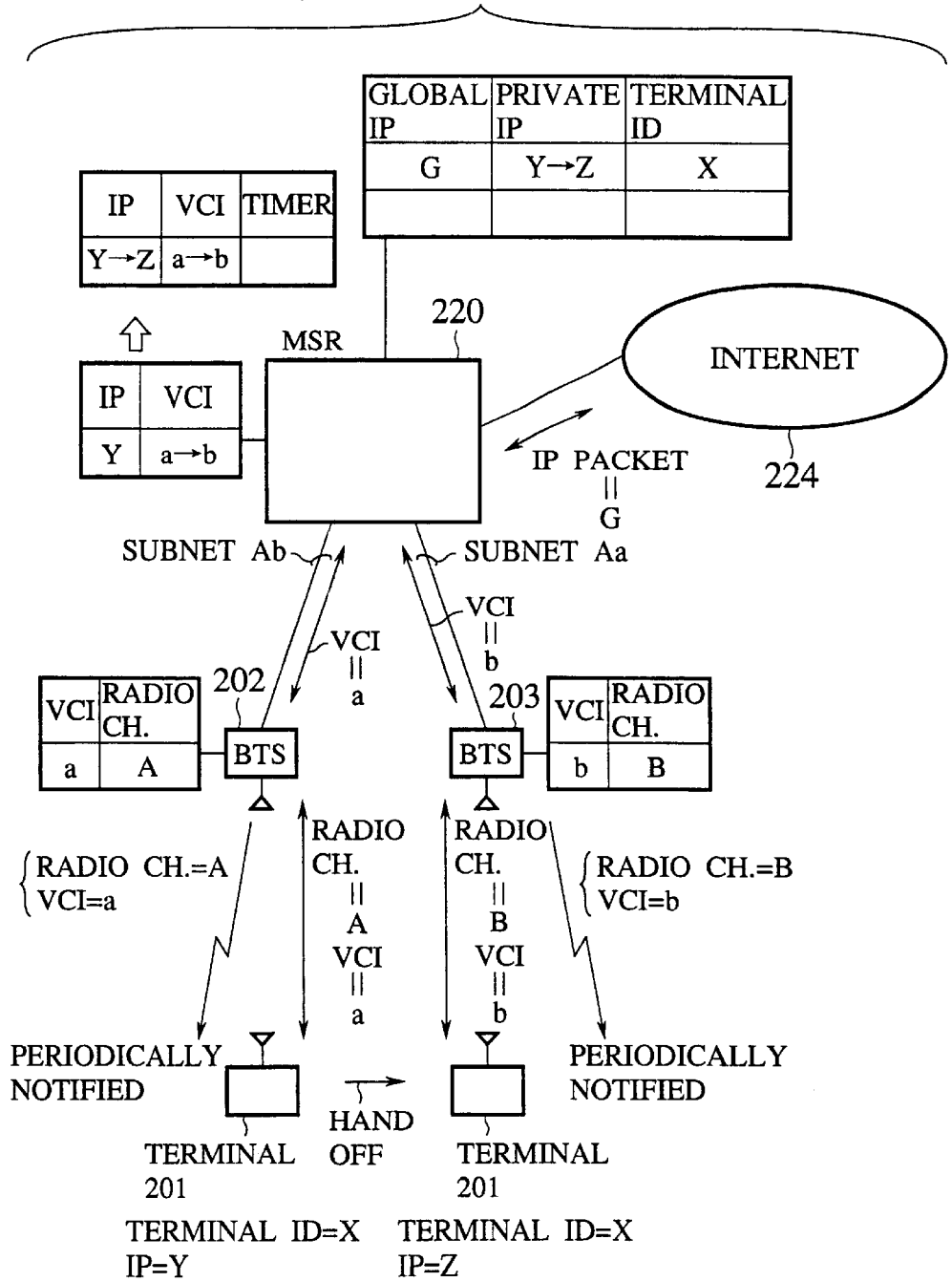
FIG. 47 is a diagram showing one exemplary handoff control operation in the mobile communication system of FIG. 5.

Also, in the radio communication system shown in FIG. 47, the control channel B as defined above and the communication channel are set up in advance in the manner of (configuration 4) of FIG. 7, and it is assumed that at least the base station ID, a PVC of the control channel B {a set of (radio CH, VPI/VCI)}, a PVC of the communication channel {a set of (radio CH, VPI/VCI)}, and a subnet ID (or DHCP server ID) are notified from each radio base station.

In FIG. 47, in the case where the mobile terminal 201 carries out the IP packet communications with Internet 224, the IP packet communications are carried out by using PVCs {PVC1 (radio CH=A, VPI/VCI=a), PVC2 (radio CH=B, VPI/VCI=b)} that are set up between the MSR 220 and the mobile terminal 201.

Now, for the case in which the mobile terminal 201 moves from the radio base station 202 to the radio base station 203 in FIG. 47, the procedure for switching from a state in which the IP packet communication with Internet 224 is carried out by using PVC1 to a state in which the IP packet communication with Internet 224 is to be carried out by using PVC2 will be described. Here, it is assumed that the MSR 220 is constituting two subnets Aa and Ab.

First, the mobile terminal 201 detects the moving from the radio base station 202 to the radio base station 203 by the fact that the base station ID that is periodically notified from the radio base station has changed, and detects the need for re-allocation of IP address by the fact that the subnet ID (DHCP server ID) that is periodically notified from the radio base station has changed.

Then, the mobile terminal 201 notifies an IP address allocation request containing at least the terminal ID=X of the mobile terminal 201 (and the subnet ID=Ab if necessary) to the MSR 220, using the control channel B of the radio base station 203 which is the radio base station used after the moving.

Upon receiving this IP address allocation request message, the MSR 220 allocates a new IP address, and updates the IP address corresponding to the terminal ID=X from Y to Z in the IP address allocation table. Then, the MSR 220 transmits an IP address allocation response message containing at least the terminal ID=X and a new IP address=Z to the mobile terminal 201.

Then, upon receiving the IP address allocation response message, the mobile terminal 201 transmits a handoff request message containing the old IP address=Y and the new IP address=Z of the mobile terminal 201 and VPI/VCI=b of PVC2 to the MSR 220, using the control channel B of the radio base station 203 which is the radio base station used after the moving. Upon receiving this handoff request message, the MSR 220 updates the connection management table (ARP table) shown in FIG. 47 by cancelling VPI/VCI=a corresponding to the old IP address=Y and registering VPI/VCI=b corresponding to the new IP address=Z as contained within this handoff request message.

In addition, the MSR 220 updates the old IP address that is set in correspondence to the IP address (IP address=G) to be used between Internet 224 and the MSR 220 in the IP address conversion table, to the new IP address.

This completes the handoff control operation, so that the IP packet communication between Internet 224 and the mobile terminal 201 is switched from a communication using PVC1 to a communication using PVC2. In addition, in the case where the MSR 220 explicitly notifies the handoff completion to the mobile terminal 201 and the mobile terminal 201 carries out the switching to the restart of the IP packet transmission from the mobile terminal 201 to Internet 224 by using this handoff completion message as a trigger, the MSR 220 may transmit a handoff completion message (which contains information contained in the handoff request message such as IP address=Y and VPI/VCI=b) to the mobile terminal 201, using the control channel B.

It is also possible to use a configuration using NAT as the IP address conversion function described above. Also, in the above, a configuration in which the IP address conversion function is provided in the MSR has been described, but it is also possible to use a configuration in which the IP address conversion function is provided in the gateway of FIG. 5, for example, separately from the MSR. In this case, a message containing the terminal ID=X, the old IP address, and the new IP address of the mobile terminal is transmitted from the mobile terminal or the MSR to the gateway, and the gateway is operated to update the old IP address that is set in correspondence to the IP address (IP address=G) to be used between Internet 224 and the gateway 223 in the IP address conversion table, to the new IP address, according to this message. The other operation is similar to that described above.

Here, the handoff request message containing the old IP address=Y, the new IP address=Z, and VPI/VCI=b of PVC2 has been described above, but when a configuration in which the entry of the old IP address=Y is to be deleted in the MSR 220 after the above described IP address re-allocation operation, the handoff request message used in FIG. 47 can have an identical configuration to the handoff request message used in FIG. 12 which contains the new IP address=Z and VPI/VCI=b of PVC2, and thereafter the operation similar to the handoff control operation of FIG. 12 can be carried out.

In the above, the operation in the case where the MSR constitutes plural subnets and has a function for allocating/releasing IP addresses of the plural subnets (or plural DHCP server functions) has been described, and the operation in the case where the mobile terminal moves over MSRs that constitute a single subnet can be regarded as exactly the same operation, by supposing that the radio base station 202 is connected to the old MSR and the radio base station 203 is connected to the new MSR in the above description, except for the following operation.

Namely, it is necessary to transmit a message containing the old IP address=Y and the terminal ID=X from the new MSR to the old MSR, and delete the entry of the old IP address=Y in the IP address allocation table (X→NULL) as well as the entry of the old IP address=Y in the ARP table at the old MSR which received that message.

Here, if each entry in the ARP table and the IP address allocation table is managed by a timer, in the case of the moving over the MSRs as described above, it is not absolutely necessary for the handoff request message to contain the old IP address value and it is not necessary to transmit the above described message from the new MSR to the old MSR, and the deletion of an entry from each table can be done by timeout.

Also, in the example of FIG. 12, a configuration using IP address as the terminal ID and VPI/VCI as the base station ID has been described, but it is also possible to use a configuration which uses the terminal ID other than IP address, such as MAC address, mobility number (mobile telephone number of E. 168 address and the like), and ATM address, for example. In such a case, a correspondence management table for the terminal ID and IP address will be newly necessary in addition to the IP-VPI/VCI table of FIG. 12. Namely, it is necessary to figure out the IP address from the terminal ID, and updates the VPI/VCI value corresponding to that figures out IP address, so that two tables of IP-terminal ID table and ARP table (IP-VCI correspondence management table) are necessary and the processing becomes two stages. In addition, in the case where the IP address is the temporarily allocated one, it is necessary to receive a notification of the terminal ID, the new and old IP addresses and the VCI as the base station ID, and cancel a VCI value corresponding to the old IP address and register a VCI value corresponding to the new IP address, while also updating the IP-terminal ID correspondence management table, that is, updating the IP address value corresponding to the terminal ID from the old IP address to the new IP address.

Figure 13:
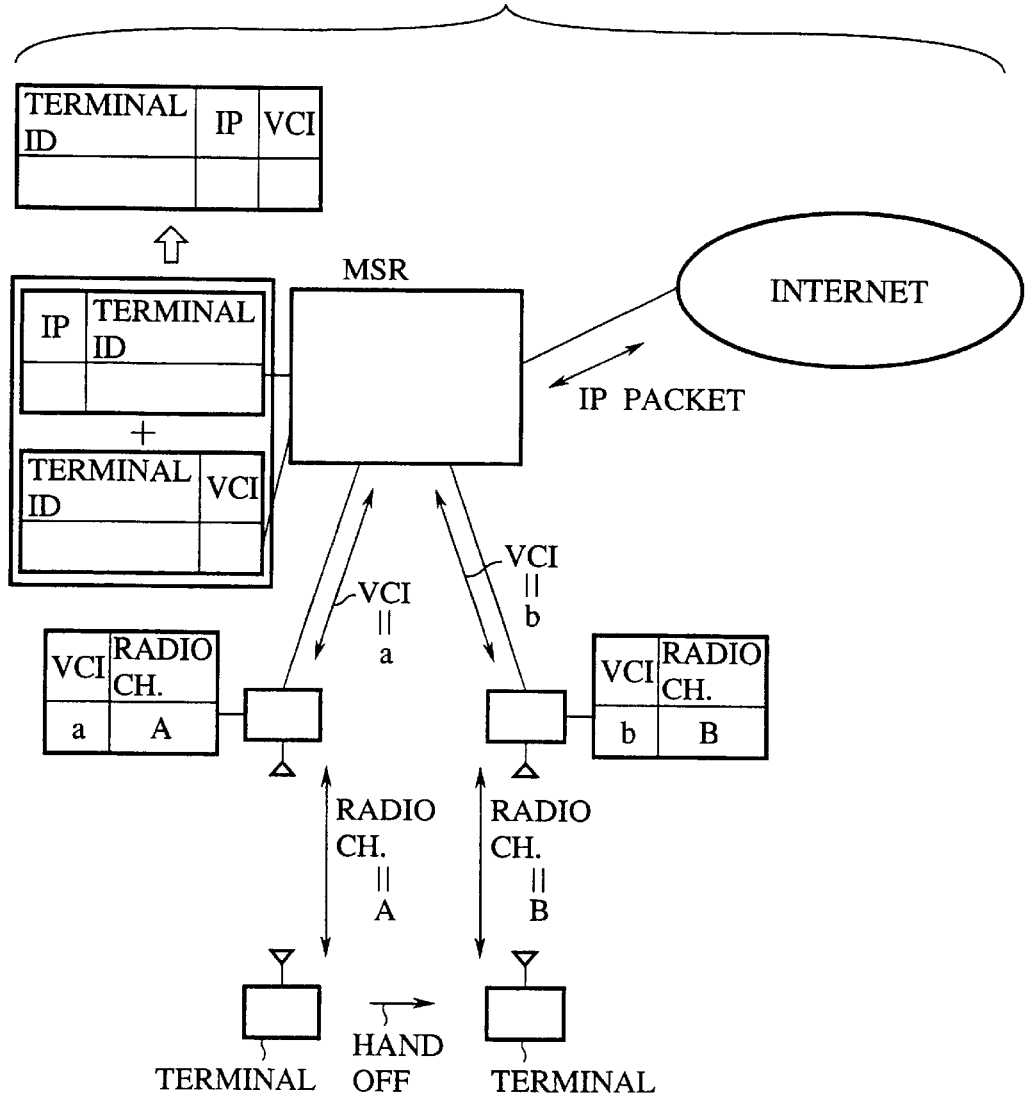
FIG. 13 is a diagram showing another exemplary table updating operation at a time of handoff control operation in the mobile communication system of FIG. 5.

In the case where the IP address is dynamically allocated one, there is a method which requires only a single stage processing rather than the cumbersome operation described above, which uses a unique terminal ID other than the IP address and a configuration having two tables of an IP-terminal ID table and a terminal ID-VCI table, as shown in FIG. 13.

In the case of this configuration, when the IP address is not changed at a time of handoff, it suffices to change only the VCI value in the terminal ID-VPI/VCI table. Moreover, the updating of the table is not cumbersome even in the case where the change of the IP address is necessary, and the terminal ID-IP address correspondence management table and the terminal ID-VPI/VCI table can be updated simultaneously, so that there is a merit in that the updating operation can be a single stage processing.

Here, the configuration in which the terminal ID-IP address correspondence management table and the terminal ID-VPI/VCI table are divided as two tables has been described, but it is possible to use a table configuration in which these two tables are combined into a single table as shown in FIG. 13. Note however that, in the case where the MSR constitutes plural subnets and there is a need to change the IP address allocation even for the moving within one MSR, there arises a need to dynamically allocate the IP address by the DHCP and the like with respect to one terminal while carrying out the handoff operation with respect to another terminal. In such a case, if there is only a single table, the processing must be carried out in time division basis so that there is a demerit in that the processing time becomes long. In order to resolve this problem, it is necessary to provide the terminal ID-IP address correspondence management table separately from the terminal ID-IP address-VPI/VCI table even though the other information is going to be stored in overlap.

Next, the concrete example of the handoff control operation of the MSR will be described with reference to FIG. 13.

The radio communication system shown in FIG. 13 comprises the Internet 224, the MSR 220, the radio base stations 202 and 203, and the mobile terminal 201, where the MSR 220 has an IP address allocation table for managing a correspondence between IP address and terminal ID, and an ARP table for managing a correspondence between terminal ID and VPI/VCI, and each of the radio base station 202 and 203 has a VPI/VCI-radio channel management table.

Also, in the radio communication system shown in FIG. 13, the control channel B as defined above and the communication channel are set up in advance in the manner of (configuration 4) of FIG. 7, and it is assumed that at least the base station ID, a PVC of the control channel B {a set of (radio CH, VPI/VCI)} and a PVC of the communication channel {a set of (radio CH, VPI/VCI)} are notified from each radio base station.

In FIG. 13, in the case where the mobile terminal 201 carries out the IP packet communications with Internet 224, the IP packet communications are carried out by using PVCs {PVC1 (radio CH=A, VPI/VCI=a), PVC2 (radio CH=B, VPI/VCI=b)} that are set up between the MSR 220 and the mobile terminal 201.

Now, for the case in which the mobile terminal 201 moves from the radio base station 202 to the radio base station 203, the procedure for switching from a state in which the IP packet communication with Internet 224 is carried out by using PVC1 to a state in which the IP packet communication with Internet 224 is to be carried out by using PVC2 will be described. Here, it is assumed that the MSR 220 is constituting a single subnet AA.

First, the mobile terminal 201 detects the moving from the radio base station 202 to the radio base station 203 by the fact that the base station ID that is periodically notified from the radio base station has changed. Then, the mobile terminal 201 notifies a handoff request message containing the terminal ID=X of the mobile terminal 201 and VPI/VCI=b of PVC2 to the MSR 220, using the control channel B of the radio base station 203 which is the radio base station used after the moving.

Upon receiving this handoff request message, the MSR 220 updates the ARP table shown in FIG. 13 according to the terminal ID=X and VPI/VCI=b contained within this handoff request message.

This completes the handoff control operation, so that the IP packet communication between Internet 224 and the mobile terminal 201 is switched from a communication using PVC1 to a communication using PVC2.

In addition, in the case where the MSR 220 explicitly notifies the handoff completion to the mobile terminal 201 and the mobile terminal 201 carries out the switching to the restart of the IP packet transmission from the mobile terminal 201 to Internet 224 by using this handoff completion message as a trigger, the MSR 220 may transmit a handoff completion message (which contains information contained in the handoff request message such as the terminal ID=X and VPI/VCI=b) to the mobile terminal 201, using the control channel B.

Figure 14:
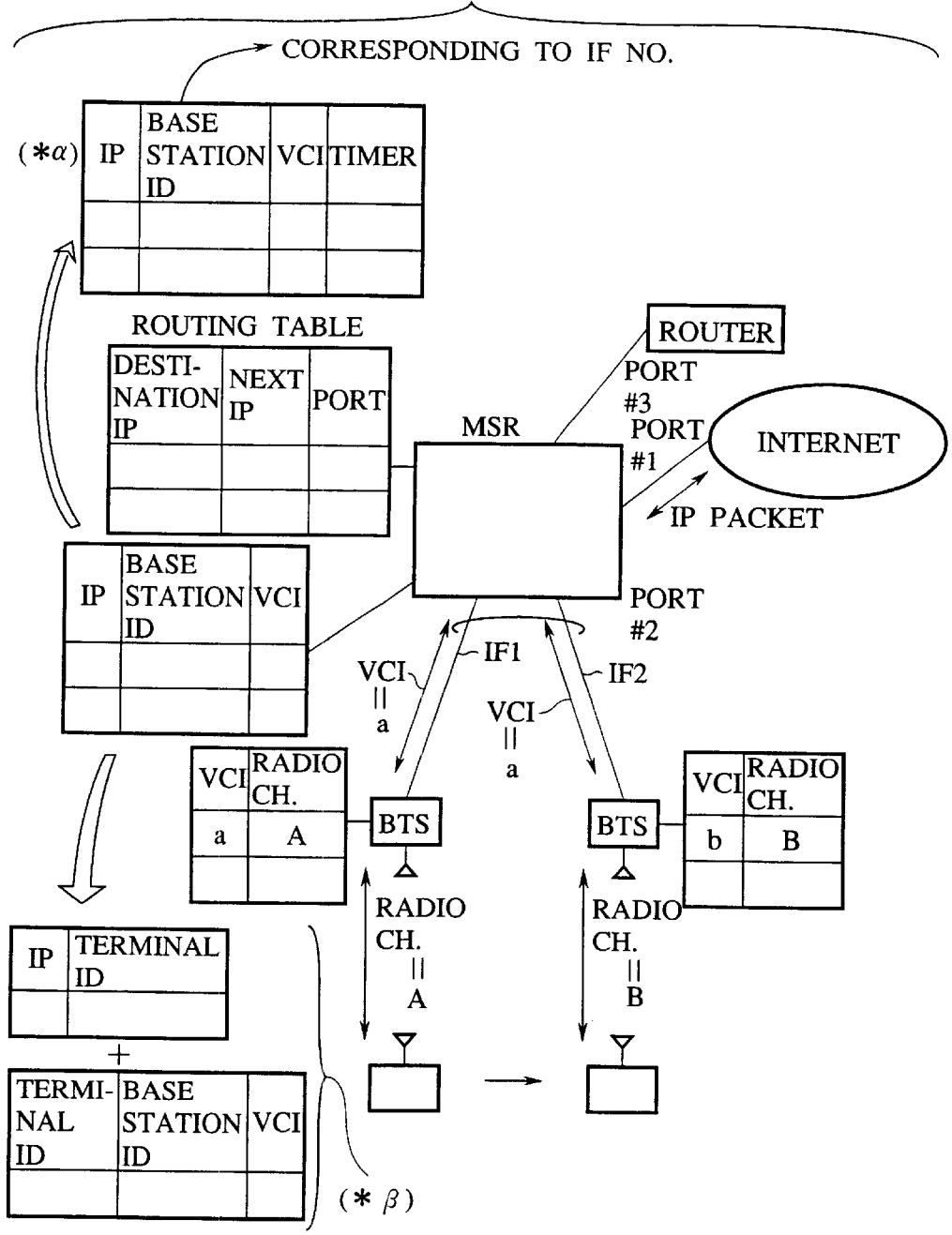
FIG. 14 is a diagram showing still another exemplary table updating operation at a time of handoff control operation in the mobile communication system of FIG. 5.

Moreover, as shown in FIG. 14, there is also a case in which the base station ID is used independently from VPI/VCI rather than using VPI/VCI as the base station ID. In this case, as the base station ID, an IF number which is a number for identifying a physical interface of the MSR may be used, or a logical identifier to be set in one-to-one or one-to-multi correspondence with the IF number may be provided similarly as the port number of the routing table. Here, in the case where the base station ID independent from VPI/VCI is used, there is a merit in that the same VPI/VCI can be reused among different base stations as long as the uniqueness of the VPI/VCI value within the base station ID can be maintained.

Also, in the case where the base station ID is allocated as a logical identifier, there is a need for a base station ID-IF number correspondence table. This is necessary when the base station ID and the IF number are set in one-to-one correspondence but the IF number is not used as the base station ID or when the base station ID and the IF number are set in one-to-multi or multi-to-one correspondence. However, when the IF number is directly used as the base station ID, the base station ID-IF number correspondence table is unnecessary.

Figure 15:
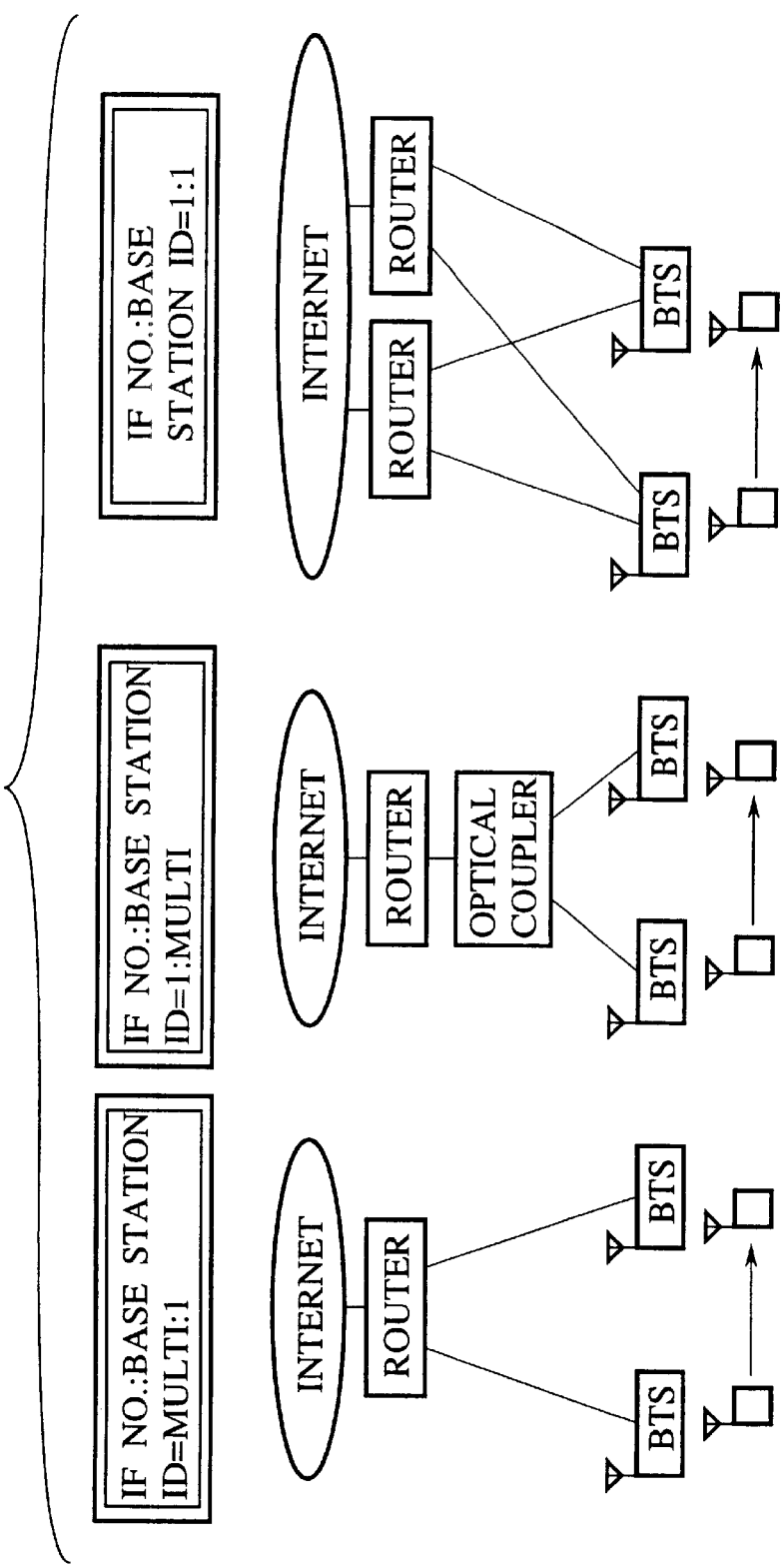
FIG. 15 is a diagram showing exemplary connections between MSR and radio base station in the mobile communication system of FIG. 5.

Also, by using an identifier independent from the base station ID and the IF number, there is a merit in that it becomes possible to realize various connection forms as shown in FIG. 15 (that is, the flexibility regarding the connection form becomes high).

Note that even in the case of base station ID≠VCI as shown in FIG. 14, it is possible to use a table configuration having a timer (*α) or a table configuration of two divided tables (*β), Just as in the case of providing the terminal ID separately from the IP address, and it is possible to expect the similar effects as in the case of the base station ID=VPI/VCI.

Next, the concrete example of the handoff control operation of the MSR will be described with reference to FIG. 14.

The radio communication system shown in FIG. 14 comprises the Internet 224, the MSR 220, the radio base stations 202 and 203, and the mobile terminal 201, where the MSR 220 has an ARP table for managing a correspondence among IP, base station ID and VPI/VCI, and each of the radio base station 202 and 203 has a VPI/VCI-radio channel management table.

Also, in the radio communication system shown in FIG. 14, the control channel B as defined above and the communication channel are set up in advance in the manner of (configuration 4) of FIG. 7, and it is assumed that at least the base station ID, a PVC of the control channel B {a set of (radio CH, VPI/VCI)} and a PVC of the communication channel {a set of (radio CH, VPI/VCI)} are notified from each radio base station.

In FIG. 14, in the case where the mobile terminal 201 carries out the IP packet communications with Internet 224, the IP packet communications are carried out by using PVCs {PVC1 (radio CH=A, VPI/VCI=a), PVC2 (radio CH=B, VPI/VCI=b)} that are set up between the MSR 220 and the mobile terminal 201.

Now, for the case in which the mobile terminal 201 moves from the radio base station 202 to the radio base station 203 in FIG. 14, the procedure for switching from a state in which the IP packet communication with Internet 224 is carried out by using PVC1 to a state in which the IP packet communication with Internet 224 is to be carried out by using PVC2 will be described. Here, it is assumed that the MSR 220 is constituting a single subnet AA.

First, the mobile terminal 201 detects the moving from the radio base station 202 to the radio base station 203 by the fact that the base station ID that is periodically notified from the radio base station has changed. Then, the mobile terminal 201 notifies a handoff request message containing the IP address=Y of the mobile terminal 201, the base station ID=BS2, and VPI/VCI=a of PVC2 to the MSR 220, using the control channel B of the radio base station 203 which is the radio base station used after the moving.

Upon receiving this handoff request message, the MSR 220 updates the ARP table shown in FIG. 14 according to the IP address=Y, the base station ID=BS2 and VPI/VCI=a contained within this handoff request message.

This completes the handoff control operation, so that the IP packet communication between Internet 224 and the mobile terminal 201 is switched from a communication using PVC1 to a communication using PVC2.

In addition, in the case where the MSR 220 explicitly notifies the handoff completion to the mobile terminal 201 and the mobile terminal 201 carries out the switching to the restart of the IP packet transmission from the mobile terminal 201 to Internet 224 by using this handoff completion message as a trigger, the MSR 220 may transmit a handoff completion message (which contains information contained in the handoff request message such as the IP address=Y, the base station ID=BS2 and VPI/VCI=a) to the mobile terminal 201, using the control channel B.

Moreover, it is also possible to use a configuration using a mapping method as shown in FIG. 16 for the terminal ID and the base station ID. Namely, a configuration using the VPI/VCI value as the terminal ID has not been described above, but the case of using the IP address (fixed, dynamical) which is a logical number and to be used in the routing has been described so that the similar configuration may be used. Also, a configuration using the IP address or the connection set up address as the base station ID have not been described above, but it is possible to use the operation similar to that in the configuration using VPI/VCI as the base station ID in such cases.

The configuration using VPI/VCI and the like as the base station ID and the terminal ID as shown in FIG. 16 has a drawback in that there is only a lower flexibility when the cases of connection between the MSR and the radio base stations as shown in FIG. 15 are taken into account. compared with the case of the configuration using the base station ID and the terminal ID independently. However, it is possible to realize the standby operation, the location registration operation, the handoff control operation, the call origination connection operation, and the call termination connection operation without any problem, when the connection is limited.

In the above, the operation at a time of the handoff control in the case using the connection set up as in (configuration 4) of FIG. 7 has been described with references to FIG. 12 to FIG. 14. Next, the handoff control operation in the case using the connection set up as in any of (configuration 1) to (configuration 3) and (configuration 5) of FIG. 7 in the system of FIG. 12 will be described.

First, the table changing operation at a time of the handoff control operation in the case of using the connection set up as in (configuration 1) (SVC for radio section, SVC for wire section) of FIG. 7 in the system of FIG. 12 will be described.

The radio communication system shown in FIG. 12 comprises the Internet 224, the MSR 220, the radio base stations 202 and 203, and the mobile terminal 201, where the MSR 220 has a connection management table (ARP table) for managing a correspondence between IP address and VPI/VCI, and each of the radio base station 202 and 203 has a VPI/VCI-radio channel management table.

The difference between (configuration 1) and (configuration 4) is that, in (configuration 1), the VPI/VCI-radio channel management table provided in the radio base station 202 and 203 is in a configuration having a function for converting VPI/VCI in the wire section into VPI/VCI and radio CH in the radio section or vice versa, and that information periodically notified by the radio base station 202 and 203 is in a configuration containing at least the base station ID and a PVC of the control channel A and/or the control channel B {a set of (radio CH, VPI/VCI)}.

In FIG. 12, in the case where the mobile terminal 201 carries out the IP packet communications with Internet 224, the IP packet communications are carried out by using SVC1A (radio CH=A, VPI/VCI=a) between the mobile terminal 201 and the radio base station 202, SVC1a (VPI/VCI=a) between the radio base station 202 and the MSR 220, SVC2B (radio CH=B, VPI/VCI=b) between the mobile terminal 201 and the radio base station 203, and SVC2b (VPI/VCI=b) between the radio base station 203 and the MSR 220, which are set up on-demand.

Now, for the case in which the mobile terminal 201 moves from the radio base station 202 to the radio base station 203 in FIG. 12, the procedure for switching from a state in which the IP packet communication with Internet 224 is carried out by using SVC1 to a state in which the IP packet communication with Internet 224 is to be carried out by using SVC2 will be described. Here, it is assumed that the MSR 220 is constituting a single subnet AA.

First, the mobile terminal 201 detects the moving from the radio base station 202 to the radio base station 203 by the fact that the base station ID that is periodically notified from the radio base station has changed. Then, the mobile terminal 201 sets up SVC2B (radio CH=B, VPI/VCI=b) in the radio section by transmitting a SETUP message to the radio base station 203 which is the radio base station used after the moving, and transmits a handoff request message (containing the communication protocol ID, the terminal ID=X, and the IP address=Y) to the radio base station 203.

Upon receiving this handoff request message, the radio base station 203 takes this as a trigger and sets up SVC2b (VPI/VCI=b) in the wire section by transmitting a SETUP message to the MSR 220, and updates the VPI/VCI-radio channel management table provided in the radio base station 203 so as to set the wire section VPI/VCI=b, the radio section VPI/VCI=b, and the radio CH=B in correspondence.

In addition, the radio base station 203 transmits the handoff request message received from the mobile terminal 201 to the MSR 220 by adding the wire section SVC2b (VPI/VCI=b) thereto. Upon receiving this handoff request message, the MSR 220 updates the connection management table (ARP table) shown in FIG. 12 according to the IP address=Y and VPI/VCI=b contained within this handoff request message.

This completes the handoff control operation, so that the IP packet communication between Internet 224 and the mobile terminal 201 is switched from a communication using SVC1 to a communication using SVC2.

The case described above is directed to the method in which the mobile terminal 201 sets up the radio section SVC by transmitting the SETUP message to the radio base station 203 while transmitting the handoff request message to the radio base station 203, and using this as a trigger, the radio base station 203 transmits the handoff request message to the MSR 220, but there is also a method in which the radio base station 203 sets up the radio section SVC2B and the wire section SVC2b upon receiving the handoff request message (containing the communication protocol ID, the terminal ID=X, and the IP address=Y) from the mobile terminal 201. The operation in this case will be described next.

First, the mobile terminal 201 detects the moving from the radio base station 202 to the radio base station 203 by the fact that the base station ID that is periodically notified from the radio base station has changed. Then, the mobile terminal 201 transmits a handoff request message (containing the communication protocol ID, the terminal ID=X, and the IP address=Y) to the radio base station 203 which is the radio base station used after the moving.

Upon receiving this handoff request message, the radio base station 203 takes this as a trigger and sets up SVC2*b* (VPI/VCI=b) in the wire section by transmitting a SETUP message to the MSR 220, while also setting up SVC2B (radio CH=B, VPI/VCI=b) in the radio section by transmitting a SETUP message to the mobile terminal 201.

In addition, when the connection set up in the wire section and the radio section is completed, the radio base station 203 updates the VPI/VCI-radio channel management table provided in the radio base station 203 so as to set the wire section VPI/VCI=b, the radio section VPI/VCI=b, and the radio CH=B in correspondence.

In addition, the radio base station 203 transmits the handoff request message received from the mobile terminal 201 to the MSR 220 by adding the wire section SVC2*b* (VPI/VCI=b) thereto. Upon receiving this handoff request message, the MSR 220 updates the connection management table (ARP table) shown in FIG. 12 according to the IP address=Y and VPI/VCI=b contained within this handoff request message.

This completes the handoff control operation, so that the IP packet communication between Internet 224 and the mobile terminal 201 is switched from a communication using SVC1 to a communication using SVC2.

It is also possible to use the method in which the wire section SVC set up is made by the MSR 220 rather than the radio base station 203. The operation in this case will be described next.

First, the mobile terminal 201 detects the moving from the radio base station 202 to the radio base station 203 by the fact that the base station ID that is periodically notified from the radio base station has changed. Then, the mobile terminal 201 sets up SVC2B (radio CH=B, VPI/VCI=b) in the radio section by transmitting a SETUP message to the radio base station 203 which is the radio base station used after the moving, and transmits a handoff request message (containing the communication protocol ID, the terminal ID=X, and the IP address=Y) to the radio base station 203.

Upon receiving this handoff request message, the radio base station 203 transmits it to the MSR 220. Upon receiving this handoff request message from the radio base station 203, the MSR 220 takes this as a trigger and sets up SVC2*b* (VPI/VCI=b) in the wire section by transmitting a SETUP message to the radio base station 203, and updates the connection management table (ARP table) shown in FIG. 12 according to the IP address=Y contained within this handoff request message and VPI/VCI=b obtained by the connection set up described above.

In addition, when SVC2*b* (VPI/VCI=b) is set up in the wire section, the radio base station 203 updates the VPI/VCI-radio channel management table provided in the radio base station 203 so as to set the wire section VPI/VCI=b, the radio section VPI/VCI=b, and the radio CH=B in correspondence.

This completes the handoff control operation, so that the IP packet communication between Internet 224 and the mobile terminal 201 is switched from a communication using SVC1 to a communication using SVC2.

Also, the radio communication system shown in FIG. 12 may carry out the handoff control operation as follows.

First, the mobile terminal 201 detects the moving from the radio base station 202 to the radio base station 203 by the fact that the base station ID that Is periodically notified from the radio base station has changed. Then, the mobile terminal 201 transmits a handoff request message (containing the communication protocol ID, the terminal ID=X, and the IP address=Y) to the radio base station 203 which is the radio base station used after the moving.

Upon receiving this handoff request message, the radio base station 203 takes this as a trigger and sets up SVC2B (radio CH=B, VPI/VCI=b) in the radio section by transmitting a SETUP message to the mobile terminal 201, while also transmitting the handoff request message as received from the mobile terminal 201 to the MSR 220.

Upon receiving this handoff request message from the radio base station 203, the MSR 220 takes this as a trigger and sets up SVC2*b* (VPI/VCI=b) in the wire section by transmitting a SETUP message to the radio base station 203, and updates the connection management table (ARP table) shown in FIG. 12 according to the IP address=Y contained within this handoff request message and VPI/VCI=b obtained by the connection set up described above.

In addition, when SVC2*b* (VPI/VCI=b) is set up in the wire section, the radio base station 203 updates the VPI/VCI-radio channel management table provided in the radio base station 203 so as to set the wire section VPI/VCI=b, the radio section VPI/VCI=b, and the radio CH=B in correspondence.

This completes the handoff control operation, so that the IP packet communication between Internet 224 and the mobile terminal 201 is switched from a communication using SVC1 to a communication using SVC2.

Next, the table changing operation at a time of the handoff control operation in the case of using the connection set up as in (configuration 2) (SVC for radio section, PVC for wire section) of FIG. 7 in the system of FIG. 12 will be described.

The radio communication system shown in FIG. 12 comprises the Internet 224, the MSR 220, the radio base stations 202 and 203, and the mobile terminal 201, where the MSR 220 has a connection management table (ARP table) for managing a correspondence between IP address and VPI/VCI, and each of the radio base station 202 and 203 has a VPI/VCI-radio channel management table.

The difference between (configuration 2) and (configuration 4) is that, in (configuration 2), the VPI/VCI-radio channel management table provided in the radio base station 202 and 203 is in a configuration having a function for converting VPI/VCI in the wire section into VPI/VCI and radio CH in the radio section or vice versa, and that information periodically notified by the radio base station 202 and 203 is in a configuration containing at least the base station ID and a PVC of the control channel A and/or the control channel B {a set of (radio CH, VPI/VCI)}.

In FIG. 12, in the case where the mobile terminal 201 carries out the IP packet communications with Internet 224, the IP packet communications are carried out by using SVC1A (radio CH=A, VPI/VCI=a) between the mobile terminal 201 and the radio base station 202 which is set up on-demand, PVC1*a* (VPI/VCI=a) between the radio base station 202 and the MSR 220 which is set up in advance, SVC2B (radio CH=B, VPI/VCI=b) between the mobile terminal 201 and the radio base station 203 which is set up on-demand, and PVC2*b* (VPI/VCI=b) between the radio base station 203 and the MSR 220 which is set up in advance.

Now, for the case in which the mobile terminal 201 moves from the radio base station 202 to the radio base station 203 in FIG. 12, the procedure for switching from a state in which the IP packet communication with Internet 224 is carried out by using SVC1A and PVC1*a* to a state in which the IP packet communication with Internet 224 is to be carried out by using SVC2B and PVC2*b* will be described. Here, it is assumed that the MSR 220 is constituting a single subnet AA.

First, the mobile terminal 201 detects the moving from the radio base station 202 to the radio base station 203 by the fact that the base station ID that is periodically notified from the radio base station has changed. Then, the mobile terminal 201 sets up SVC2B (radio CH=B, VPI/VCI=b) in the radio section by transmitting a SETUP message to the radio base station 203 which is the radio base station used after the moving, and transmits a handoff request message (containing the communication protocol ID, the terminal ID=X, and the IP address=Y) to the radio base station 203.

Upon receiving this handoff request message, the radio base station 203 takes this as a trigger and selects PVC2b (VPI/VCI=b) that is already set up in the wire section, and updates the VPI/VCI-radio channel management table provided in the radio base station 203 so as to set the wire section VPI/VCI=b, the radio section VPI/VCI=b, and the radio CH=B in correspondence.

In addition, the radio base station 203 transmits the handoff request message received from the mobile terminal 201 to the MSR 220 by adding the wire section PVC2b (VPI/VCI=b) thereto. Upon receiving this handoff request message, the MSR 220 updates the connection management table (ARP table) shown in FIG. 12 according to the IP address=Y and VPI/VCI=b contained within this handoff request message.

This completes the handoff control operation, so that the IP packet communication between Internet 224 and the mobile terminal 201 is switched from a communication using SVC1A and PVC1a to a communication using SVC2B and PVC2b.

The case described above is directed to the method in which the mobile terminal 201 sets up the radio section SVC by transmitting the SETUP message to the radio base station 203 while transmitting the handoff request message to the radio base station 203, and using this as a trigger, the radio base station 203 transmits the handoff request message to the MSR 220, but there is also a method in which the radio base station 203 sets up the radio section SVC2B and the wire section PVC2b upon receiving the handoff request message (containing the communication protocol ID, the terminal ID=X, and the IP address=Y) from the mobile terminal 201. The operation in this case will be described next.

First, the mobile terminal 201 detects the moving from the radio base station 202 to the radio base station 203 by the fact that the base station ID that is periodically notified from the radio base station has changed. Then, the mobile terminal 201 transmits a handoff request message (containing the communication protocol ID, the terminal ID=X, and the IP address=Y) to the radio base station 203 which is the radio base station used after the moving.

Upon receiving this handoff request message, the radio base station 203 takes this as a trigger and selects PVC2b (VPI/VCI=b) that is already set up in the wire section between the radio base station 203 and the MSR 220, while also setting up SVC2B (radio CH=B, VPI/VCI=b) in the radio section by transmitting a SETUP message to the mobile terminal 201.

In addition, when the connection set up in the wire section and the radio section is completed, the radio base station 203 updates the VPI/VCI-radio channel management table provided in the radio base station 203 so as to set the wire section VPI/VCI=b, the radio section VPI/VCI=b, and the radio CH=B in correspondence.

In addition, the radio base station 203 transmits the handoff request message received from the mobile terminal 201 to the MSR 220 by adding the wire section PVC2b (VPI/VCI=b) thereto. Upon receiving this handoff request message, the MSR 220 updates the connection management table (ARP table) shown in FIG. 12 according to the IP address=Y and VPI/VCI=b contained within this handoff request message.

This completes the handoff control operation, so that the IP packet communication between Internet 224 and the mobile terminal 201 is switched from a communication using SVC1A and PVC1a to a communication using SVC2B and PVC2b.

It is also possible to use the method in which the wire section PVC set up is made by the MSR 220 rather than the radio base station 203. The operation in this case will be described next.

First, the mobile terminal 201 detects the moving from the radio base station 202 to the radio base station 203 by the fact that the base station ID that is periodically notified from the radio base station has changed. Then, the mobile terminal 201 sets up SVC2B (radio CH=B, VPI/VCI=b) in the radio section by transmitting a SETUP message to the radio base station 203 which is the radio base station used after the moving, and transmits a handoff request message (containing the communication protocol ID, the terminal ID=X, and the IP address=Y) to the radio base station 203.

Upon receiving this handoff request message, the radio base station 203 transmits it to the MSR 220. Upon receiving this handoff request message from the radio base station 203, the MSR 220 takes this as a trigger and selects PVC2b (VPI/VCI=b) that is already set up in the wire section between the radio base station 203 and the MSR 220, and updates the connection management table (ARP table) shown in FIG. 12 according to the IP address=Y contained within this handoff request message and VPI/VCI=b obtained by the PVC selection described above.

In addition, when PVC2b (VPI/VCI=b) is set up in the wire section, the radio base station 203 updates the VPI/VCI-radio channel management table provided in the radio base station 203 so as to set the wire section VPI/VCI=b, the radio section VPI/VCI=b, and the radio CH=B in correspondence.

This completes the handoff control operation, so that the IP packet communication between Internet 224 and the mobile terminal 201 is switched from a communication using SVC1A and PVC1a to a communication using SVC2B and PVC2b.

Also, the radio communication system shown in FIG. 12 may carry out the handoff control operation as follows.

First, the mobile terminal 201 detects the moving from the radio base station 202 to the radio base station 203 by the fact that the base station ID that is periodically notified from the radio base station has changed. Then, the mobile terminal 201 transmits a handoff request message (containing the communication protocol ID, the terminal ID=X, and the IP address=Y) to the radio base station 203 which is the radio base station used after the moving.

Upon receiving this handoff request message, the radio base station 203 takes this as a trigger and sets up SVC2B (radio CH=B, VPI/VCI=b) in the radio section by transmitting a SETUP message to the mobile terminal 201, while also transmitting the handoff request message as received from the mobile terminal 201 to the MSR 220.

Upon receiving this handoff request message from the radio base station 203, the MSR 220 takes this as a trigger and selects PVC2b (VPI/VCI=b) that is already set up in the wire section between the radio base station 203 and the MSR 220, and updates the connection management table (ARP table) shown in FIG. 12 according to the IP address=Y contained within this handoff request message and VPI/VCI=b obtained by the PVC selection described above.

In addition, when PVC2b (VPI/VCI=b) is set up in the wire section, the radio base station 203 updates the VPI/

VCI-radio channel management table provided in the radio base station 203 so as to set the wire section VPI/VCI=b, the radio section VPI/VCI=b, and the radio CH=B in correspondence.

This completes the handoff control operation, so that the IP packet communication between Internet 224 and the mobile terminal 201 is switched from a communication using SVC1A and PVC1a to a communication using SVC2B and PVC2b.

Next, the table changing operation at a time of the handoff control operation in the case of using the connection set up as in (configuration 3) (PVC for radio section, SVC for wire section) of FIG. 7 in the system of FIG. 12 will be described.

The radio communication system shown in FIG. 12 comprises the Internet 224, the MSR 220, the radio base stations 202 and 203, and the mobile terminal 201, where the MSR 220 has a connection management table (ARP table) for managing a correspondence between IP address and VPI/VCI, and each of the radio base station 202 and 203 has a VPI/VCI-radio channel management table.

The difference between (configuration 3) and (configuration 4) is that, in (configuration 3), the VPI/VCI-radio channel management table provided in the radio base station 202 and 203 is in a configuration having a function for converting VPI/VCI in the wire section into VPI/VCI and radio CH in the radio section or vice versa, and that information periodically notified by the radio base station 202 and 203 is in a configuration containing at least the base station ID and a PVC of the control channel A and/or the control channel B {a set of (radio CH, VPI/VCI)}.

In FIG. 12, in the case where the mobile terminal 201 carries out the IP packet communications with Internet 224, the IP packet communications are carried out by using PVC1A (radio CH=A, VPI/VCI=a) between the mobile terminal 201 and the radio base station 202 which is set up in advance, SVC1a (VPI/VCI=a) between the radio base station 202 and the MSR 220 which is set up on-demand, PVC2B (radio CH=B, VPI/VCI=b) between the mobile terminal 201 and the radio base station 203 which is set up in advance, and SVC2b (VPI/VCI=b) between the radio base station 203 and the MSR 220 which is set up on-demand.

Now, for the case in which the mobile terminal 201 moves from the radio base station 202 to the radio base station 203 in FIG. 12, the procedure for switching from a state in which the IP packet communication with Internet 224 is carried out by using PVC1A and SVC1a to a state in which the IP packet communication with Internet 224 is to be carried out by using PVC2B and SVC2b will be described. Here, it is assumed that the MSR 220 is constituting a single subnet AA.

First, the mobile terminal 201 detects the moving from the radio base station 202 to the radio base station 203 by the fact that the base station ID that is periodically notified from the radio base station has changed. Then, the mobile terminal 201 selects PVC2B (radio CH=B, VPI/VCI=b) that is already set up in the radio section between the mobile terminal 201 and the radio base station 203 which is the radio base station used after the moving, and transmits a handoff request message (containing the communication protocol ID, the terminal ID=X, and the IP address=Y) to the radio base station 203.

Upon receiving this handoff request message, the radio base station 203 takes this as a trigger and sets up SVC2b (VPI/VCI=b) in the wire section by transmitting a SETUP message to the MSR 220, and updates the VPI/VCI-radio channel management table provided in the radio base station 203 so as to set the wire section VPI/VCI=b, the radio section VPI/VCI=b, and the radio CH=B in correspondence.

In addition, the radio base station 203 transmits the handoff request message received from the mobile terminal 201 to the MSR 220 by adding the wire section SVC2b (VPI/VCI=b) thereto. Upon receiving this handoff request message, the MSR 220 updates the connection management table (ARP table) shown in FIG. 12 according to the IP address=Y and VPI/VCI=b contained within this handoff request message.

This completes the handoff control operation, so that the IP packet communication between Internet 224 and the mobile terminal 201 is switched from a communication using PVC1A and SVC1a to a communication using PVC2B and SVC2b.

The case described above is directed to the method in which the mobile terminal 201 selects the radio section PVC while transmitting the handoff request message to the radio base station 203, and using this as a trigger, the radio base station 203 transmits the handoff request message to the MSR 220, but there is also a method in which the radio base station 203 sets up the radio section PVC2B and the wire section SVC2b upon receiving the handoff request message (containing the communication protocol ID, the terminal ID=X, and the IP address=Y) from the mobile terminal 201. The operation in this case will be described next.

First, the mobile terminal 201 detects the moving from the radio base station 202 to the radio base station 203 by the fact that the base station ID that is periodically notified from the radio base station has changed. Then, the mobile terminal 201 transmits a handoff request message (containing the communication protocol ID, the terminal ID=X, and the IP address=Y) to the radio base station 203 which is the radio base station used after the moving.

Upon receiving this handoff request message, the radio base station 203 takes this as a trigger and sets up SVC2b (VPI/VCI=b) in the wire section by transmitting a SETUP message to the MSR 220, while also selecting PVC2B (radio CH=B, VPI/VCI=b) that is already set up in the radio section between the radio base station 203 and the mobile terminal 201.

In addition, when the connection set up in the wire section and the radio section is completed, the radio base station 203 updates the VPI/VCI-radio channel management table provided in the radio base station 203 so as to set the wire section VPI/VCI=b, the radio section VPI/VCI=b, and the radio CH=B in correspondence.

In addition, the radio base station 203 transmits the handoff request message received from the mobile terminal 201 to the MSR 220 by adding the wire section SVC2b (VPI/VCI=b) thereto. Upon receiving this handoff request message, the MSR 220 updates the connection management table (ARP table) shown in FIG. 12 according to the IP address=Y and VPI/VCI=b contained within this handoff request message.

This completes the handoff control operation, so that the IP packet communication between Internet 224 and the mobile terminal 201 is switched from a communication using PVC1A and SVC1a to a communication using PVC2B and SVC2b.

It is also possible to use the method in which the wire section SVC set up is made by the MSR 220 rather than the radio base station 203. The operation in this case will be described next.

First, the mobile terminal 201 detects the moving from the radio base station 202 to the radio base station 203 by the fact that the base station ID that is periodically notified from the radio base station has changed. Then, the mobile terminal 201 selects PVC2B (radio CH=B, VPI/VCI=b) that is already set up in the radio section between the mobile terminal 201 and the radio base station 203 which is the radio base station used after the moving, and transmits a handoff request message (containing the communication protocol ID, the terminal ID=X, and the IP address=Y, as well as the radio CH=B, the radio section VPI/VCI=b if necessary) to the radio base station 203.

Upon receiving this handoff request message, the radio base station 203 transmits it to the MSR 220. Upon receiving this handoff request message from the radio base station 203, the MSR 220 takes this as a trigger and sets up SVC2*b* (VPI/VCI=b) in the wire section by transmitting a SETUP message to the radio base station 203, and updates the connection management table (ARP table) shown in FIG. 12 according to the IP address=Y contained within this handoff request message and VPI/VCI=b obtained by the connection set up described above.

In addition, when SVC2*b* (VPI/VCI=b) is set up in the wire section, the radio base station 203 updates the VPI/VCI-radio channel management table provided in the radio base station 203 so as to set the wire section VPI/VCI=b, the radio section VPI/VCI=b, and the radio CH=B in correspondence.

This completes the handoff control operation, so that the IP packet communication between Internet 224 and the mobile terminal 201 is switched from a communication using PVC1A and SVC1*a* to a communication using PVC2B and SVC2*b*.

Also, the radio communication system shown in FIG. 12 may carry out the handoff control operation as follows.

First, the mobile terminal 201 detects the moving from the radio base station 202 to the radio base station 203 by the fact that the base station ID that is periodically notified from the radio base station has changed. Then, the mobile terminal 201 transmits a handoff request message (containing the communication protocol ID, the terminal ID=X, and the IP address=Y) to the radio base station 203 which is the radio base station used after the moving.

Upon receiving this handoff request message, the radio base station 203 takes this as a trigger and selects PVC2B (radio CH=B, VPI/VCI=b) that is already set up in the radio section between the radio base station 203 and the mobile terminal 201, while also transmitting the handoff request message as received from the mobile terminal 201 to the MSR 220.

Upon receiving this handoff request message from the radio base station 203, the MSR 220 takes this as a trigger and sets up SVC2*b* (VPI/VCI=b) in the wire section by transmitting a SETUP message to the radio base station 203, and updates the connection management table (ARP table) shown in FIG. 12 according to the IP address=Y contained within this handoff request message and VPI/VCI=b obtained by the connection set up described above.

In addition, when SVC2*b* (VPI/VCI=b) is set up in the wire section, the radio base station 203 updates the VPI/VCI-radio channel management table provided in the radio base station 203 so as to set the wire section VPI/VCI=b, the radio section VPI/VCI=b, and the radio CH=B in correspondence.

This completes the handoff control operation, so that the IP packet communication between Internet 224 and the mobile terminal 201 is switched from a communication using PVC1A and SVC1*a* to a communication using PVC2B and SVC2*b*.

Finally, the table changing operation at a time of the handoff control operation in the case of using the connection set up as in (configuration 5) (SVC for radio section and wire section without termination) of FIG. 7 in the system of FIG. 12 will be described.

In this case, the operation is similar to the the handoff control operation in the case of (configuration 4) except that, instead of carrying out the operation by PVC selection, SVC2 is set up between the mobile terminal 201 and the MSR 220 by transmitting a SETUP message from the mobile terminal 201 or the MSR 220.

For this reason, the difference between (configuration 5) and (configuration 4) is that, in (configuration 5), information periodically notified by the radio base station 202 and 203 is in a configuration containing at least the base station ID and a PVC of the control channel A and/or the control channel B {a set of (radio CH, VPI/VCI)}, and that the connection set up address (such as ATM address, for example) of the MSR 220 is also notified in the case of setting up a connection from the mobile terminal 201 with respect to the MSR 220, or that the handoff request message also contains the terminal ID or the connection set up address (such as ATM address, for example) of the mobile terminal 201 in the case of transmitting a SETUP message from the MSR 220 to the mobile terminal 201.

Here, the allocation release of the radio channel and VPI/VCI with respect to the originally located radio base station may be realized according to a timer, or by notifying values of the radio channel and VPI/VCI to be released by the similar procedure as in the case of allocating the radio channel and VPI/VCI, except for the difference in message types to be used.

Next, a method by which the base station detects the moving of the mobile terminal and the MSR judges the visited site base station and carries out the switching will be described.

In the base station initiative type handoff operation, the radio station detects the degradation of the radio communication quality such as the received signal strength of the mobile terminal, and notifies it to the MSR. Upon receiving this notification, the MSR asks the radio base stations in a surrounding zone to measure the radio state, and judges the visited site according to the measured radio state of collected from each radio base station. After the visited site is judged, the operation similar to the terminal initiative type handoff operation as described above is carried out.

Now, the concrete example of the handoff control operation by the MSR will be described with reference to FIG. 50.

Figure 50:
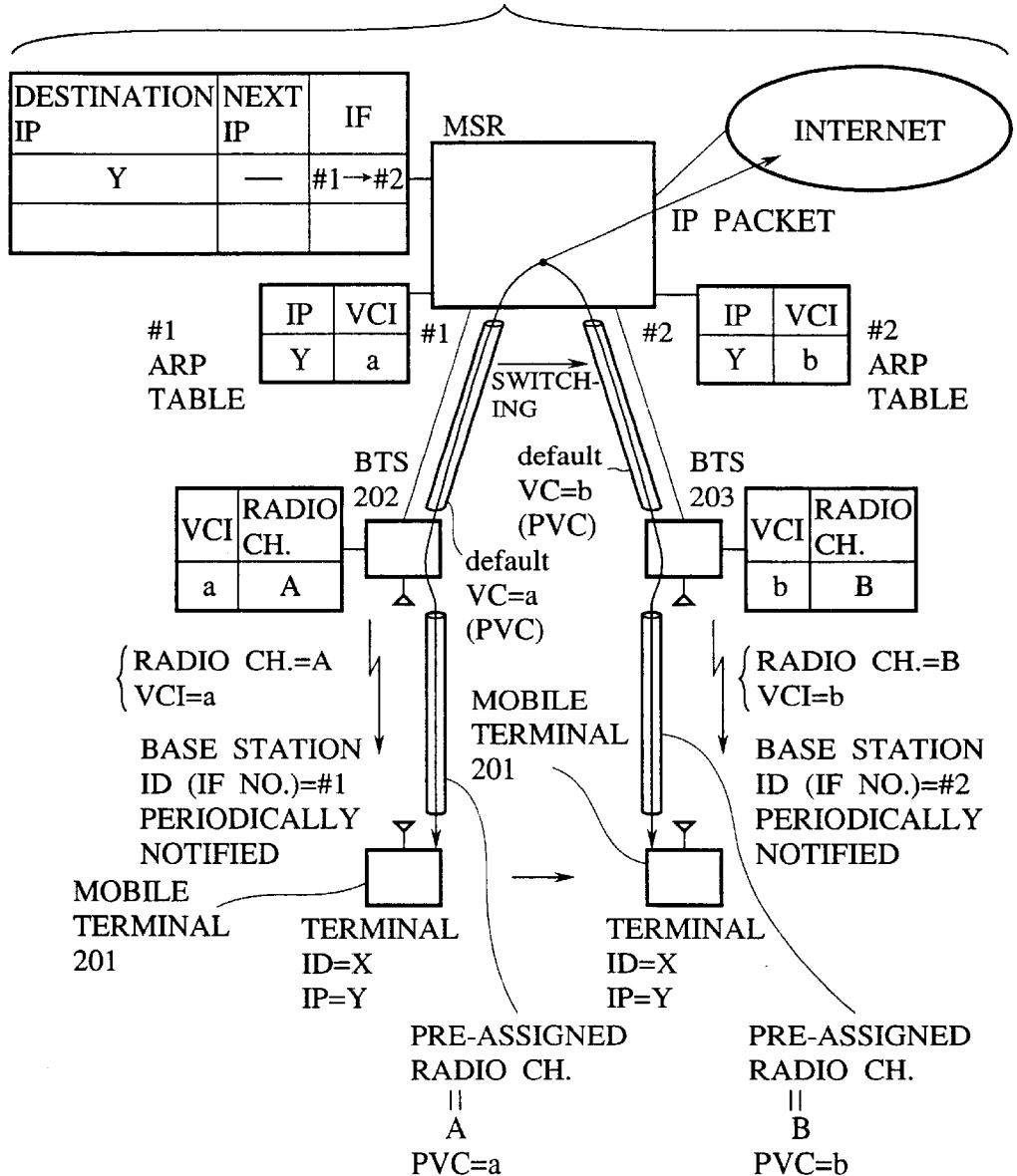
FIG. 50 is a diagram showing another exemplary handoff control operation in the mobile communication system of FIG. 5.

The radio communication system shown in FIG. 50 comprises the Internet 224, the MSR 220, the radio base stations 202 and 203, and the mobile terminal 201, where the MSR 220 has a routing table for managing a correspondence among destination IP, next IP and IF number, and an ARP table for managing a correspondence between IP address and VPI/VCI, and each of the radio base station 202 and 203 has a VPI/VCI-radio channel management table.

Also, in the radio communication system of FIG. 50, at least a default VC (PVC) which is a VC to be utilized as a shared channel that is set up in advance is defined between the MSR and the radio base station, and at least a pre-assigned radio channel (PVC) which is a radio channel that is set up in advance is defined between the radio base station and the mobile terminal. In addition, the control channel B as defined above and the communication channel are set up in advance in the manner of (configuration 4) of FIG. 7, and it is assumed that at least the base station ID (IF number), a PVC of the control channel B {a set of (radio CH, VPI/VCI)} and a PVC of the communication channel {a set of (radio CH, VPI/VCI)} are notified from each radio base station.

In FIG. 50, in the case where the mobile terminal 201 carries out the IP packet communications with Internet 224, the IP packet communications are carried out by using PVCs {PVC1 (radio CH=A, VPI/VCI=a), PVC2 (radio CH=B, VPI/VCI=b)} that are set up between the MSR 220 and the mobile terminal 201.

Now, for the case in which the mobile terminal 201 moves from the radio base station 202 to the radio base station 203, the procedure for switching from a state in which the IP packet communication with Internet 224 is carried out by using PVC1 to a state in which the IP packet communication with Internet 224 is to be carried out by using PVC2 will be described.

First, the mobile terminal 201 detects the moving from the radio base station 202 to the radio base station 203 by the fact that the base station ID that is periodically notified from the radio base station has changed. Then, the mobile terminal 201 notifies a handoff request message containing the IP address=Y of the mobile terminal 201 (and the base station ID=#2 if necessary) to the MSR 220, using the control channel B of the radio base station 203 which is the radio base station used after the moving.

Upon receiving this handoff request message, the MSR 220 refers to the routing table according to the IP address=Y contained within this handoff request message, and delete the entry of that IP address in the ARP table #1 for the old base station ID=#1 while updating the entry of the IP address=Y in the routing table according to the IF number=#2 for which the handoff request is received. In addition, the MSR 220 figures out (or selects) the default VC=b corresponding to the new base station ID=#2, and registers the IP address=Y and the VPI/VCI=b in the ARP table #2.

This completes the handoff control operation, so that the IP packet communication between Internet 224 and the mobile terminal 201 is switched from a communication using PVC1 to a communication using PVC2.

In addition, in the case where the MSR 220 explicitly notifies the handoff completion to the mobile terminal 201 and the mobile terminal 201 carries out the switching to the restart of the IP packet transmission from the mobile terminal 201 to Internet 224 by using this handoff completion message as a trigger, the MSR 220 may transmit a handoff completion message (which contains information contained in the. handoff request message such as the IP address=Y, the base station ID=#2, and VPI/VCI=b) to the mobile terminal 201, using the control channel B.

In the case where the value of PVC set up between the MSR 220 and the mobile terminal 201 is notified by transmitting the handoff completion message from the MSR 220 to the mobile terminal 201 in this manner, it becomes possible for the mobile terminal 201 to ascertain which PVC should be used even when a plurality of communication PVCs are set up between the MSR 220 and the mobile terminal 201.

Also, it is possible to use some specific default VC for transfer if no default VC is registered in the ARP table. In such a case, there is no need for the registration of the entry in the ARP table.

Next, the operation procedure of the mobile terminal 201 will be described with references to FIG. 17 and FIG. 18. Here, the following description is directed to an exemplary case in which the mobile terminal 201 turns the power ON outside of zone and then moves into an area of the radio base station 202, and makes a call origination connection to the IP terminal 225 after carrying out the location registration and IP address allocation operations, and then subsequently moves from the radio base station 202 to the radio base station 203 in the communicating state and is disconnected at the radio base station 203, and then subsequently there is a call termination from the IP terminal 225.

First, the operation of the mobile terminal 201 at a time of turning the power ON outside of zone will be described with references to FIG. 19 and FIG. 20.

Figure 19:
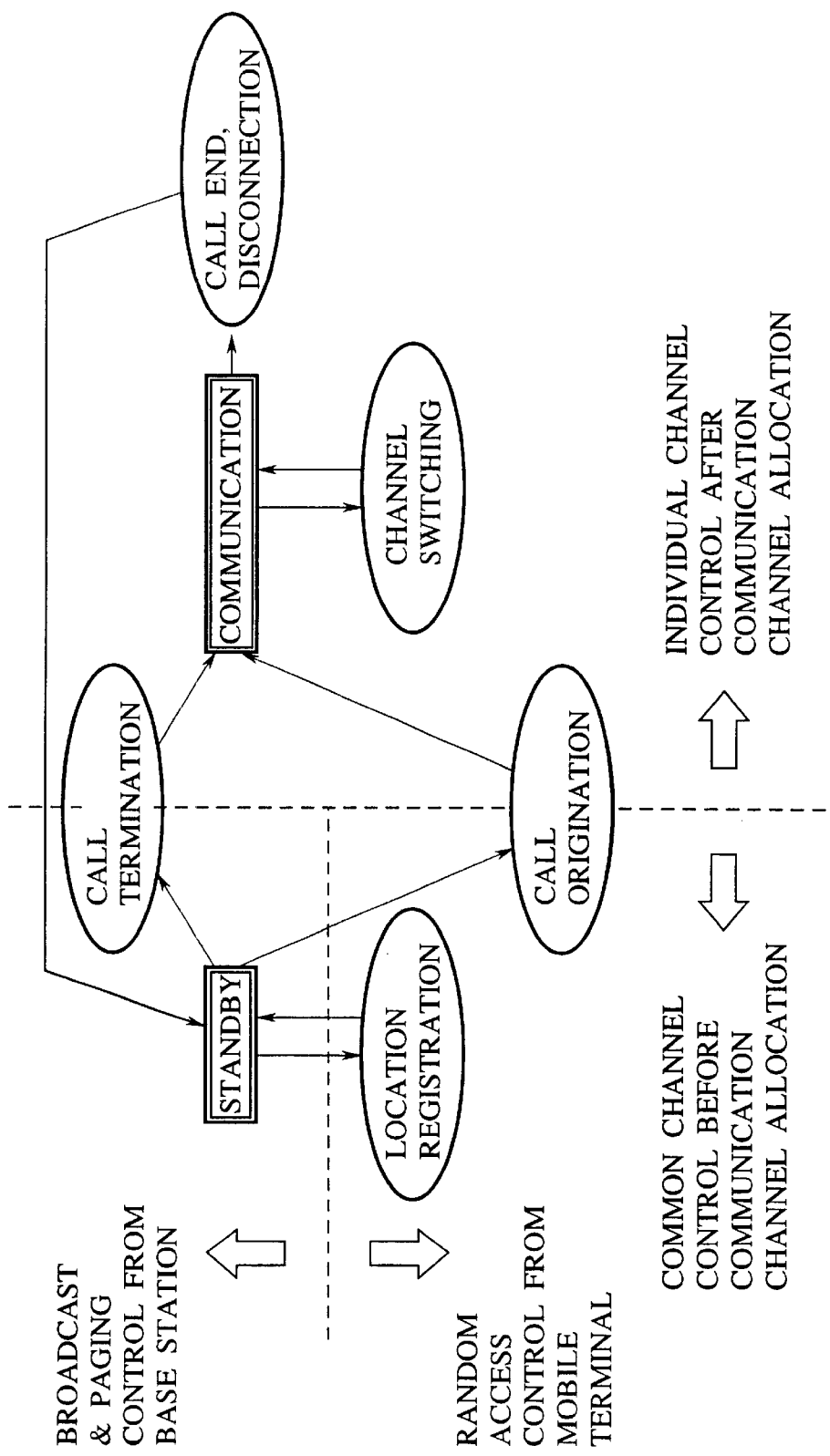
FIG. 19 is a diagram showing an operation state transition of a mobile terminal in the mobile communication system of FIG. 5.

FIG. 19 shows a state transition diagram for the operation of the mobile terminal 201. As shown in FIG. 19, the operation state of this mobile terminal 201 includes a standby operation state, a location registration operation state, a call origination operation state, a call termination operation state, a call end and disconnection operation state, and a channel switching during communication operation (handoff operation) state. In further detail, the terminal operation at a time of the power ON/standby is carried out according to the flow chart of FIG. 20 as follows.

Figure 20:
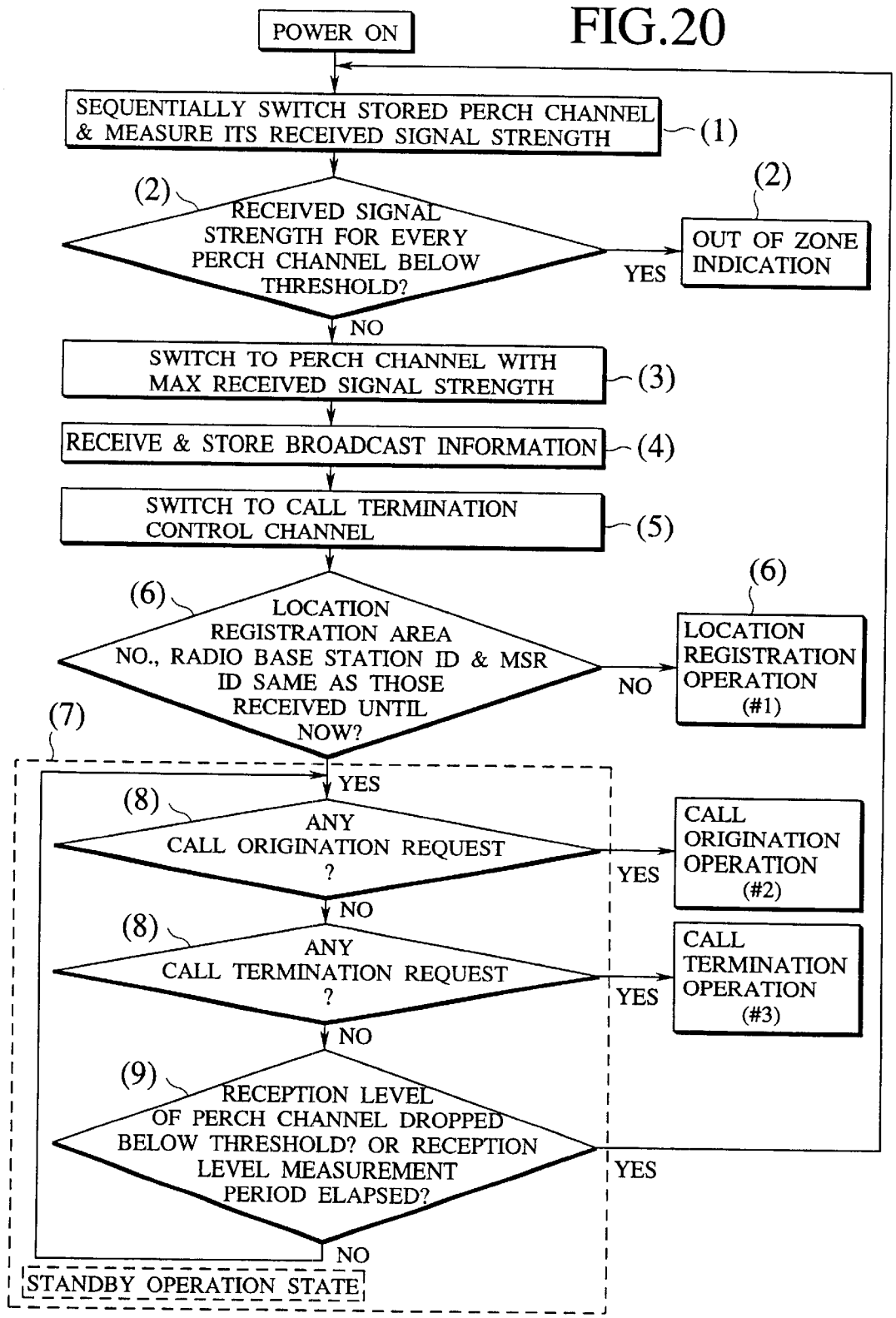
FIG. 20 is a flow chart showing an operation of a mobile terminal at a time of power ON/standby in the mobile communication system of FIG. 5.

When the mobile terminal 201 turns the power ON outside of zone, it repeats the operation to indicate that it is out of zone by carrying out the operations (1) and (2) of FIG. 20. Here, The perch channel (dedicated control channel) used in (2) is a common control channel for transmitting control information necessary for call set up, which is one of the pre-assigned radio channel in FIG. 17 and FIG. 18.

Next, the operation of the mobile terminal 201 in the case of carrying out the location registration and IP address allocation by moving inside of zone from outside of zone will be described with reference to FIG. 20. When the mobile terminal 201 moves inside of zone from outside of zone, the operations (1) to (5) of FIG. 20 are carried out. Then, the location registration and IP address allocation operations are carried out and a transition to the standby operation state is made.

Here, there is a method in which the location registration and IP address allocation operations are to be carried out at a time of call origination or call termination connection, and there is also a method in which the IP address allocation is carried out before switching to the call termination control channel after receiving the broadcast channel, and which timing is optimum for carrying them out depends on the charging scheme described above and a relationship with the service.

For this reason, it is possible to use a configuration in which the location registration and IP address allocation operations can be executed at optimum execution timings in correspondence to the charging scheme and a relationship with the service.

In addition, it is also possible to use a configuration in which timings for carrying out the location registration and IP address allocation operations can be dynamically switched to the optimum timings depending on the charging scheme and a relationship with the service.

Next, the location registration operation of the mobile terminal 201 will be described.

The location/address registration operation includes a location/address registration detection phase and a location/address registration execution phase, and it is also possible to provide a response/confirmation phase after the location address registration. The location/address registration execution phase may contain the registration of address information for the purpose of setting up a connection in addition to the registration of location information.

Using this location/address registration operation, it becomes possible for the MSR to carry out the VPI/VCI selection for PVC according to the location registration information, or the location confirmation operation based on paging, and by registering the connection set up address such as ATM address, it becomes possible to realize the call termination by entering into the connection set up operation at a time of receiving an IP packet without requiring the location confirmation operation.

Figure 17:
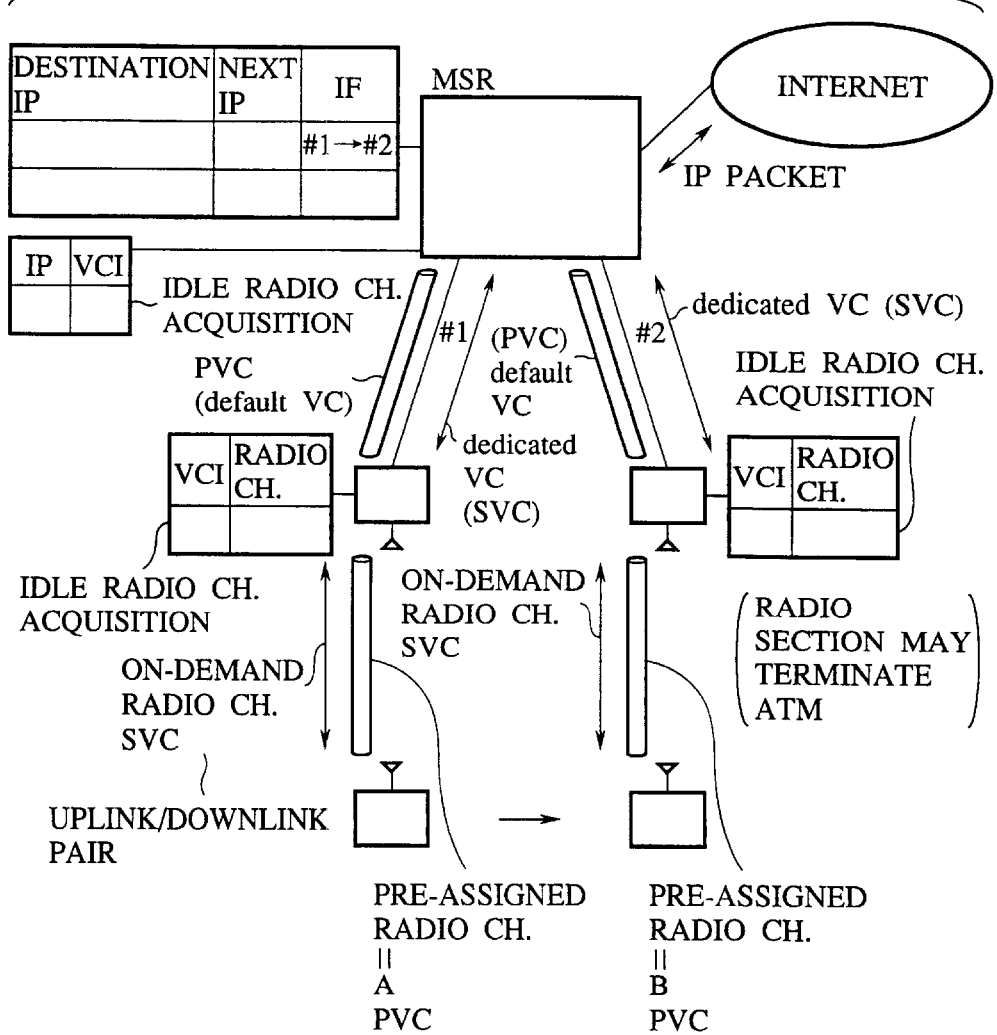
FIG. 17 is a diagram showing one exemplary operation procedure of a mobile terminal in the mobile communication system of FIG. 5.
Figure 18:
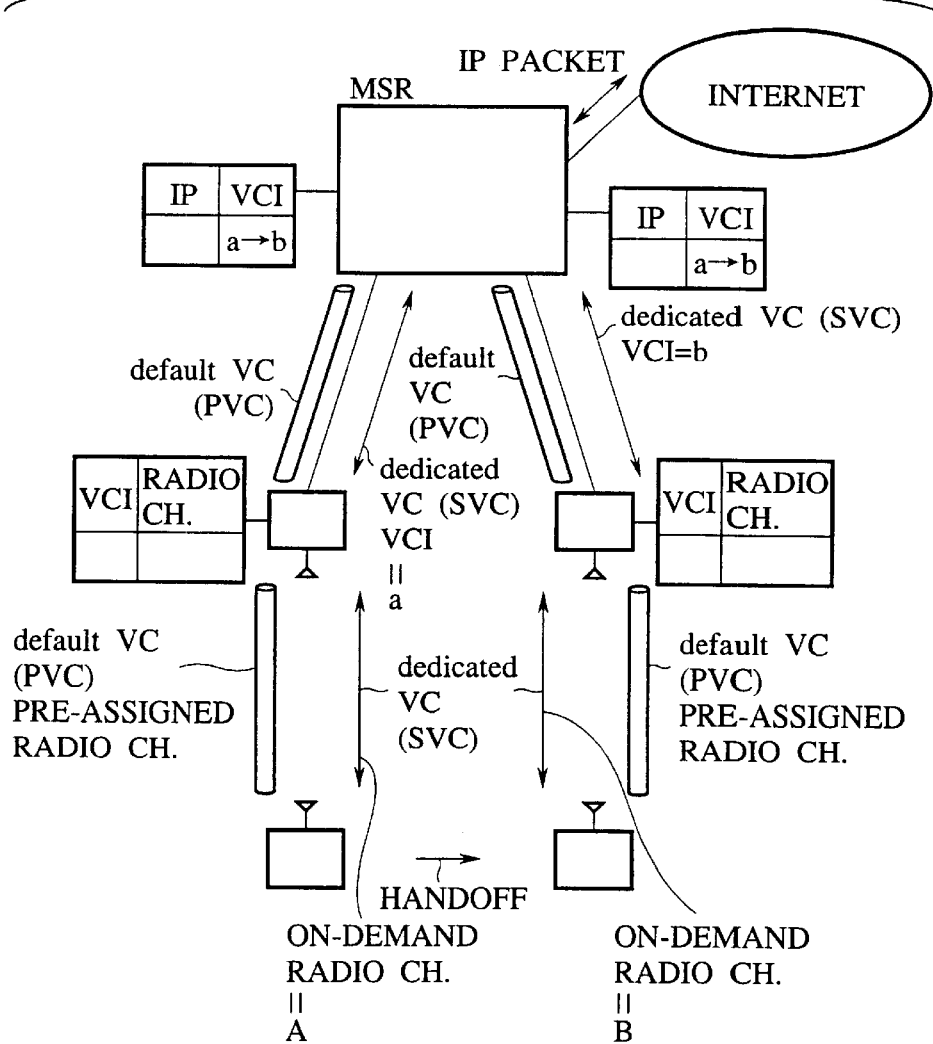
FIG. 18 is a diagram showing another exemplary operation procedure of a mobile terminal in the mobile communication system of FIG. 5.

Here, messages are exchanged between the mobile terminal 201 and the MSR for the purpose of making the location registration, using the pre-assigned radio channel and the default VC channel (PVC) of FIG. 17 and FIG. 18.

In the following, detailed concrete examples for the standby operation, the location registration operation, and the IP address allocation operation will be described.

The standby operation state is an idle state during the operations for call origination, call termination, location registration, etc., while the power of the mobile terminal 201 is turned ON, in which the mobile terminal 201 measures a received signal strength of each perch channel (dedicated control channel)(BCCH) stored within a memory by sequentially switching the perch channels (dedicated control channels), and switches to BCCH of the maximum received signal strength while receiving and storing into the memory the information related to the channel structure, the system information, etc.

Now the terminal operations (1) to (9) at a time of the power ON/standby will be described with reference to FIG. 20.

(1) When the power of the terminal is turned ON, a radio communication module (radio card, etc.) connected to the terminal body sequentially switches perch channels (dedicated control channels) stored in a memory and measures the received signal strength of each perch channel (dedicated control channel).

(2) When the received signal strength of every perch channel (dedicated control channel) is below a threshold, it is judges that the terminal is located out of zone and an out of zone indication is made.

(3) When there is a perch channel (dedicated control channel) with the received signal strength above the threshold, the terminal is switched to a perch channel (dedicated control channel) with the maximum received signal strength.

(4) The broadcast channel (BCCH) transmitted through that perch channel (dedicated control channel) is received, and stored in a memory. At this point, the information broadcast from the radio base station includes the radio base station ID, the MSR ID, the location registration area number, the random access (call origination control) channel number, the call termination control channel number, the perch channel (dedicated control channel) number of neighboring base station, the regulation information (transmission probability, etc.), the system related information such as control channel structure information (broadcast information related to the mobile communication system and broadcast information related to the packet communication), etc. Besides that, it is also possible to broadcast identifiers of various server functions such as DHCP server function, NAT function, ATM-ARP server function, etc., the connection set up address, FA ID or FA address itself of the Mobile IP, etc.

(5) Then, the paging channel (PCH) information is periodically received by switching to the call termination control channel. At this point, it is also possible to receive the perch channel (dedicated control channel) simultaneously, in addition to the call termination control channel. It is also possible to receive PCH and BCCH periodically in time division by forming a super-frame.

(6) Also, whether the location registration area number, the radio base station ID and the MSR ID contained in the received broadcast (BCCH) information are the same as those received until now is Judged. If any of these is different from that received until now, a transition to the location registration operation state is made so as to carry out the location registration.

Here, when the location registration area number is different, the location registration is carried out with respect to a location registration register within the mobile communication network via the radio base station.

On the other hand, when the MSR ID is different, the location registration is carried out with respect to the MSR via the radio base station (in order to carry out the location registration to Internet type system). Also, the location registration may be carried out when the radio base station ID is different, but the above described two identifiers are usually used so as not to make the location registration traffic unnecessarily large.

Here, when the MSR has an FA function, it is possible to broadcast the FA address in addition to the MSR ID as the broadcast channel (BCCH) information, and it is also possible to use the FA address as the MSR ID.

Moreover, BCCH may be in a configuration in which the CO type system related information for the mobile communication network as well as the CL type system related information for Internet are defined within the same BCCH channel, or a configuration in which separate logical channels are defined for the CO type BCCH and the CL type BCCH. In such a configuration in which the CO type BCCH (BCCH1) related to the mobile communication system and the CL type BCCH (BCCH2) related to Internet are defined separately, BCCH1 is received when the communication using the mobile communication network is desired, or BCCH2 is received when the Internet communication is desired, and both BCCH1 and BCCH2 are received when both types of communications are desired, so that there is a merit in that unnecessary reception can be eliminated.

Also, the terminal that utilizes only a service whose call originating side is a terminal may have a configuration in which the location registration operation for the purpose of realizing the call termination is unnecessary. However, even in this case, the radio base station ID is to be notified to the network as an own location at a time of call origination.

(7) When the above described numbers or identifiers are the same as those received until now, a transition to the standby operation state is made.

(8) In the standby operation state, when a call origination request is received, a transition to the call origination connection operation is made, whereas when a call termination request is received, a transition to the call termination connection operation is made.

(9) Also, when the received signal strength of the perch channel (dedicated control channel) drops below the threshold, the operation returns to the perch channel (dedicated control channel) received signal strength measurement operation (1). If the received signal strength is not below the threshold, the operation returns to the operation (8) so that whether there is a call origination connection request and whether there is a call termination connection request are checked repeatedly.

Figure 21:
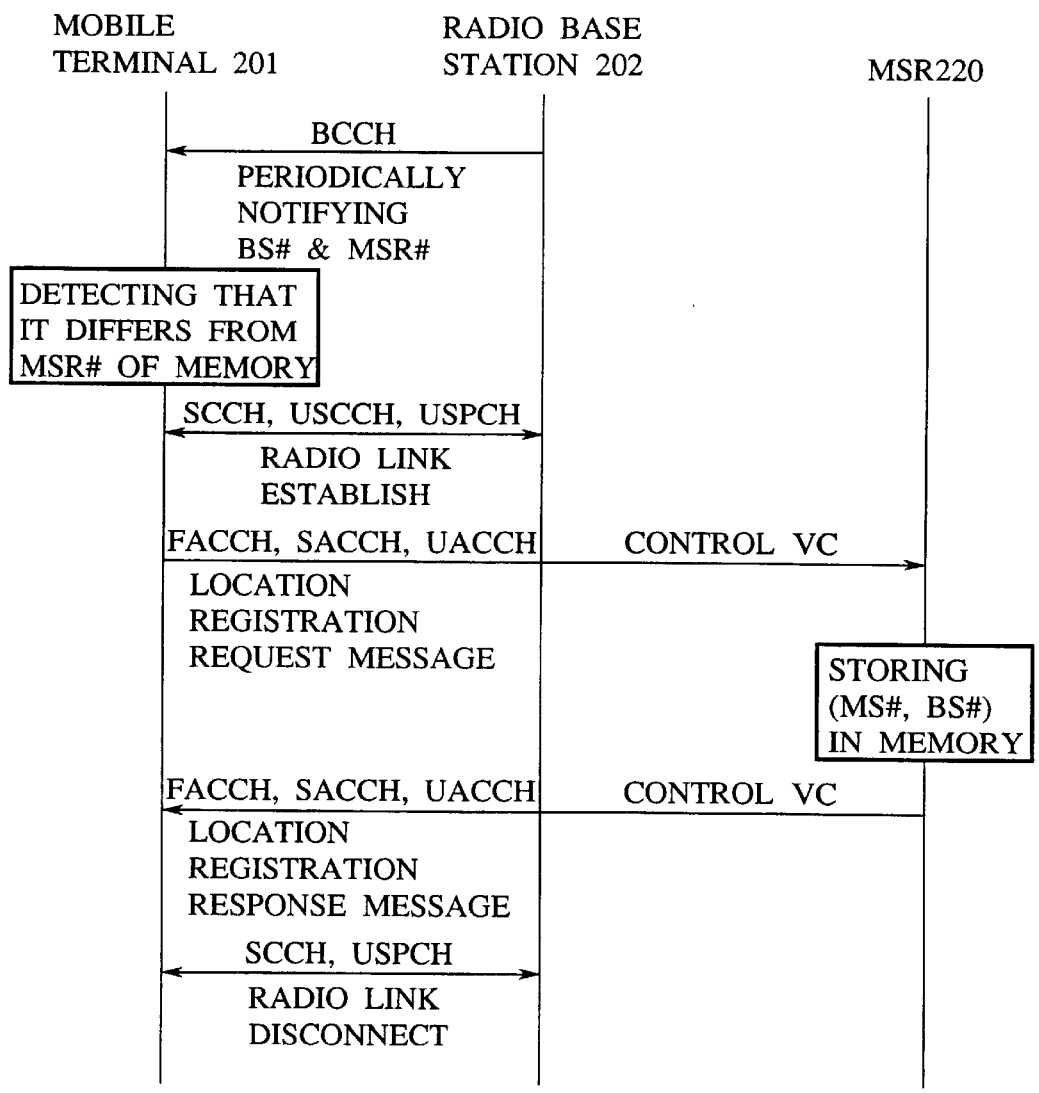
FIG. 21 is a sequence chart showing a location registration operation procedure in the mobile communication system of FIG. 5.

Next, the location registration operation will be described with references to FIG. 19 to FIG. 21.

The location registration operation state is an operation state in which the current location of the mobile terminal 201 is notified to the network (MSR in this embodiment), and more specifically, the current location of the mobile terminal 201 is notified from the mobile terminal 201 to the network by using ACCH (FACCH, SACCH) and/or UACCH (USACCH, UFACCH) defined within USPCH after the random access using SCCH/USCCH, as shown in FIG. 19.

Here, it is possible to use ACCH in the case of CO type communication and USCCH in the case of CL type communication. The location registration operation is carried out when the mobile terminal 201 turns the power ON while being within the service area of the MSR, or when the mobile terminal 201 enters from outside of zone of the MSR into inside the service area of the MSR.

In this embodiment, the case of carrying out the location registration operation using the MSR ID has been described, but it is also possible to realize the location registration operation using other identifier or by detecting that the location registration area (LAI) becomes different. Also, in the case of the service mode in which the mobile terminal 201 only originates calls, it is possible to use a configuration in which the mobile terminal 201 registers its own location in the call origination connection for the first time, without carrying out the location registration operation.

Next, the location registration operation procedure including the following steps (1) to (4) will be described with reference to FIG. 21.

(1) First, when it is detected the values of the radio base station ID and the MSR ID periodically broadcast from BCCH become different from those stored in the memory, a random access using USCCH is made and the radio channel (USPCH) allocation is carried out so as to establish a radio link.

(2) Next, a location registration request message is transmitted to the MSR 220, using ACCH (UACCH) associated with USPCH in the radio section and control VC in the wire section. This location registration request message contains the terminal ID of the mobile terminal 201. The terminal (MS) ID is an information for distinguishing the mobile terminal 201 from the other mobile terminals which is a number assigned without any overlap.

In addition to the location information, it is also possible for the location registration information to include the connection set up address, the PID (Personal ID), the terminal ID, and the base station ID, for the purpose of registering more detailed location information, if necessary.

(3) Upon receiving the location registration request message, the MSR 220 registers the terminal (MS) ID in the memory, and notifies a location registration response message indicating that the location registration is completed, using the control VC in the wire section and UACCH in the radio section, to the mobile terminal 201. Also, a request for allocation of address such as IP address or ATM address may be contained in the location registration request message or provided by the location registration request message itself, and a location registration response message may contain a part of a whole of the numbers (IP address, ATM address, etc.) allocated to the mobile terminal 201.

(4) After receiving the location registration response message, the mobile terminal 202 carries out the disconnection of the radio link (USPCH).

Next, the IP address allocation operation will be described with references to FIG. 22 and FIG. 23.

Figure 22:
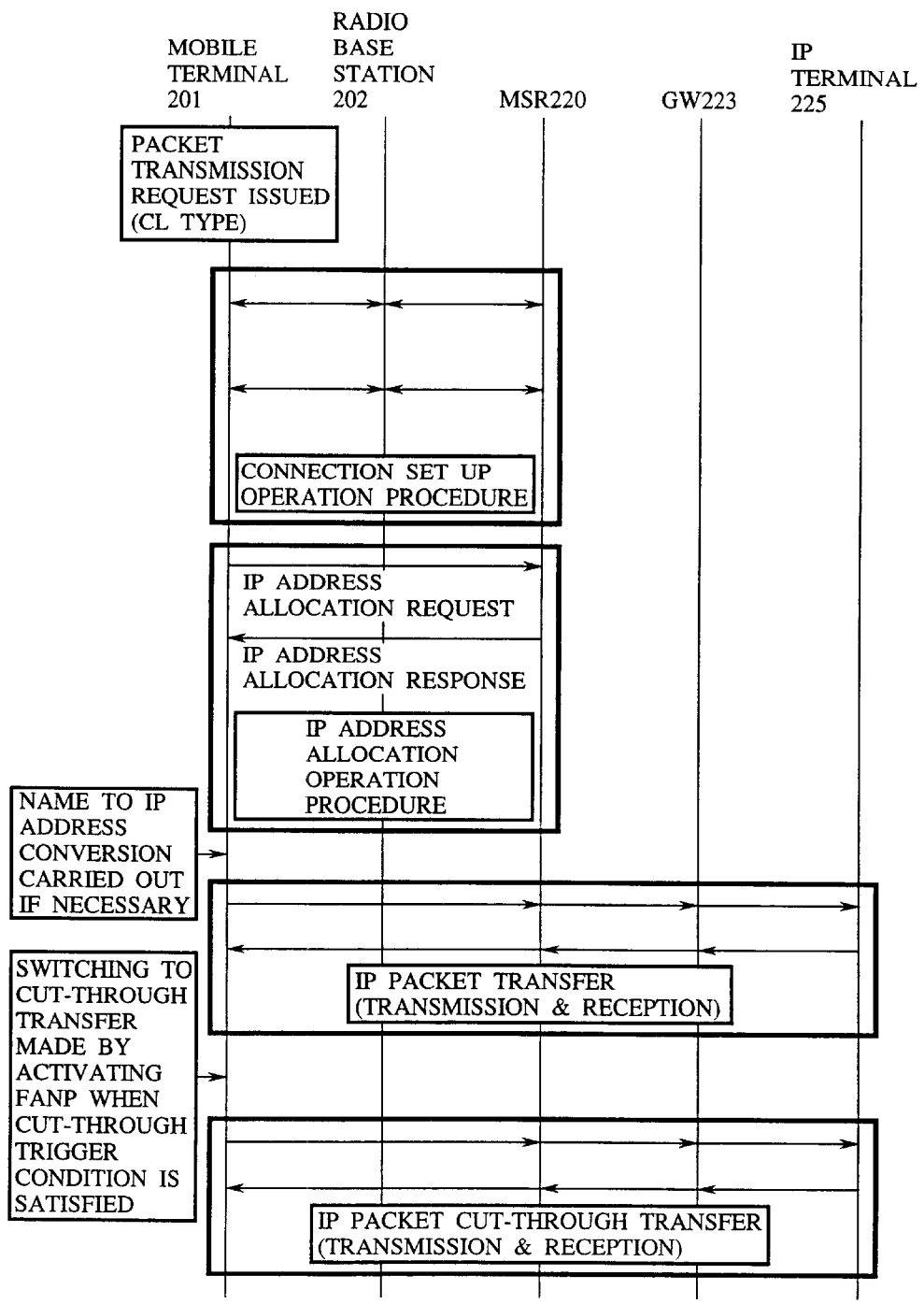
FIG. 22 is a sequence chart showing one exemplary call origination operation procedure in the mobile communication system of FIG. 5.
Figure 23:
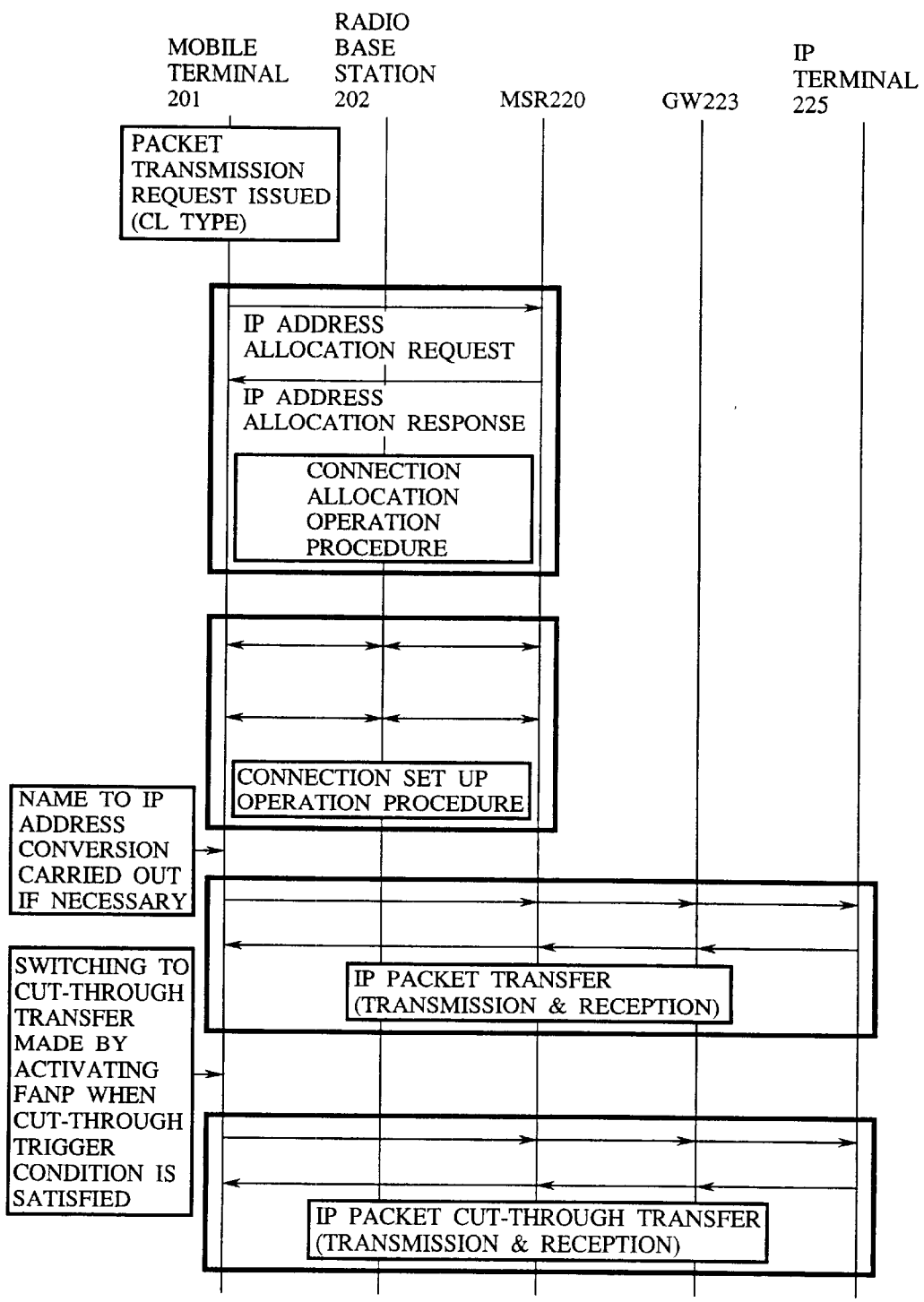
FIG. 23 is a sequence chart showing another exemplary call origination operation procedure in the mobile communication system of FIG. 5.

As shown in FIG. 22 and FIG. 23, the IP address allocation operation is carried out by exchanging an IP address allocation request message and an IP address allocation response message between the address server (DHCP server, which is assumed to be provided in the MSR here) for carrying out the IP address allocation and the mobile terminal. An access to the address server is made according to the ATM address, the VPI/VCI value, or a part or a whole of the IP address of the DHCP server contained in the broadcast information. The IP address allocation operation by the DHCP server will be described in detail below.

Next, the operation of the mobile terminal in the case of carrying out the call origination connection to the IP terminal within the area of the radio base station will be described.

The call origination operation state is an operation state in which, when there is an access request from the mobile terminal 201 to the other terminal (such as the IP terminal 225 or the cellular terminal 227 of FIG. 5 for example), the radio channel (TCH) allocation and the connection setup control message exchange using ACCH are carried out after the random access using SCCH so as to make it possible to communicate with the cellular terminal 227 in the case of CO type communication, or the radio channel (USPCH, USCCH) allocation is carried out after the random access using SCCH so as to make it possible to communicate with the IP terminal 225 in the case of CL type communication.

Next, the call origination connection operation procedure will be described with references to FIG. 22 and FIG. 23. The call origination connection operation procedure includes (1) a call origination request detection phase, (2) a connection set up phase, (3) an IP address allocation phase, and (4) an IP packet transfer phase, which are executed in an order of (1)→(2), (3)→(4). Either one of (2) and (3) may be executed before the other, and can be omitted in the case where the allocation is already made at a time of the power ON or location registration.

In the call origination connection operation procedure shown in FIG. 22, when a packet transmission request from the mobile terminal 201 occurs, the connection set up operation procedure and the IP address allocation operation procedure are executed and the IP address of the IP terminal 225 is checked by making an access to the DNS (Domain Name System) server for carrying out the name-IP address conversion if necessary, and the IP packet transfer is carried out. In addition, when the cut-through trigger condition is satisfied, the connection set up is carried out only at one side (FANP) and the switching to a cut-through path is made.

In the call origination connection operation procedure shown in FIG. 23, when a packet transmission request from the mobile terminal 201 occurs, the IP address allocation operation procedure and the connection set up operation procedure are executed in an order opposite to that of FIG. 22, and the IP address of the IP terminal 225 is checked by making an access to the DNS server for carrying out the name-IP address conversion if necessary, and the IP packet transfer is carried out. Similarly as in the case of FIG. 22, when the cut-through trigger condition is satisfied, the connection set up is carried out only at one side (FANP) and the switching to a cut-through path is made.

Also, in the case where the IP address is allocated at a time of the power ON or the location registration, so that it is already allocated at a time of the call origination connection operation, the call origination connection operation procedure of FIG. 23 starts from the connection set up operation procedure.

Here, the connection set up in FIG. 22 and FIG. 23 can be realized by either one of the following two configurations (1) and (2).

(1) <<mobile terminal→radio base station→radio CH, radio VC allocation/set up>> <<radio base→MSR→wire VC allocation/set up>>

A configuration in which the allocation of radio VC and radio CH and the establishing of a radio link which are to be set up in the radio section between the mobile terminal 201 and the radio base station 202 are carried out by the radio base station 202 upon request from the mobile terminal 201, while the selection of wire PVC or the set up of wire VC to be used in the wire section between the radio base station 202 and the MSR 220 is carried out by the MSR 220 upon request from the radio base station 202.

(2) <<mobile terminal→radio base station→radio CH>> <<mobile terminal→MSR→radio VC allocation>> <<mobile terminal→MSR→wire VC allocation>>

A configuration in which the allocation of radio CH and the establishing of a radio link which are to be set up in the radio section between the mobile terminal 201 and the radio base station 202 are carried out by the radio base station 202 upon request from the mobile terminal 201 while the allocation of radio VC is carried out by the MSR 220 upon request from the mobile terminal 201, and the selection of wire PVC or the set up of wire VC to be used in the wire section between the radio base station 202 and the MSR 220 is carried out by the MSR 220 upon request from the radio base station 202.

In these (1) and (2), a method for carrying out the VC allocation and the radio channel allocation from the request message destination side with respect to the request message source side has been described, but there is also a method for obtaining idle radio VC, idle radio CH, and idle wire VC at the request message source side.

Also, in the connection set up of FIG. 22 and FIG. 23, whether the radio base station 202 should transmit the wire PVC selection/wire VC set up request to the MSR 220 or the mobile communication network 226 is determined according to the connection type information which is transmitted by the mobile terminal 201 to the radio base station 202 at the same as the radio CH and radio VC allocation request is transmitted.

Next, the handoff control in the case where the mobile terminal moves within one MSR will be described.

The channel switching during communication (handoff) operation state is an operation state for continuing communication when the mobile terminal 201 moves from the radio base station 202 to the radio base station 203, in which the control message exchange is carried out using ACCH and/or SCCH. Here. it is possible to carry out the control message exchange by using ACCH in the case of CO type communication or USCCH in the case of CL type communication.

Figure 24:
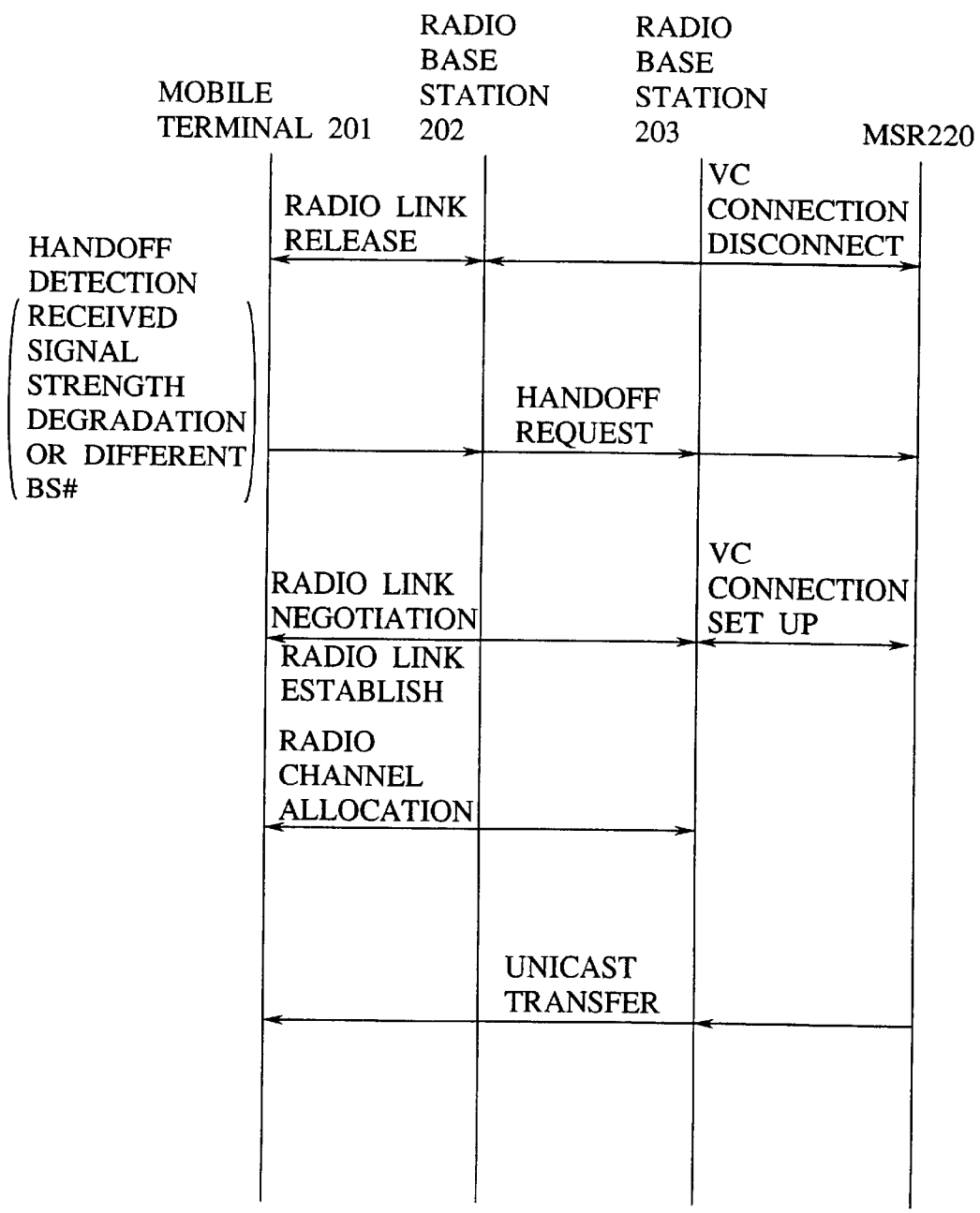
FIG. 24 is a sequence chart showing one exemplary handoff control procedure in the mobile communication system of FIG. 5.

Next, with reference to FIG. 24, one example of the handoff control operation in the case where the mobile terminal 201 moves from the radio base station 202 to the radio base station 203 will be described.

First, the mobile terminal 201 detects the degradation of the received signal strength or that the radio base station ID (BS#) that is periodically notified by BCCH becomes different from BS# stored in the internal memory of the mobile terminal 201, and transmits a handoff request message to the MSR 220.

Then, upon receiving the handoff request message from the mobile terminal 201, the MSR 220 carries out the VC connection set up between the MSR 220 and the radio base station 203 according to the radio base station ID (BS#) of the radio base station 203 that is described within that message, while the radio base station 203 establishes a radio link between the mobile terminal 201 and the radio base station 203 and carries out the radio channel allocation with respect to the mobile terminal 201. Then, using the connection so established, the unicast transfer is carried out.

Figure 25:
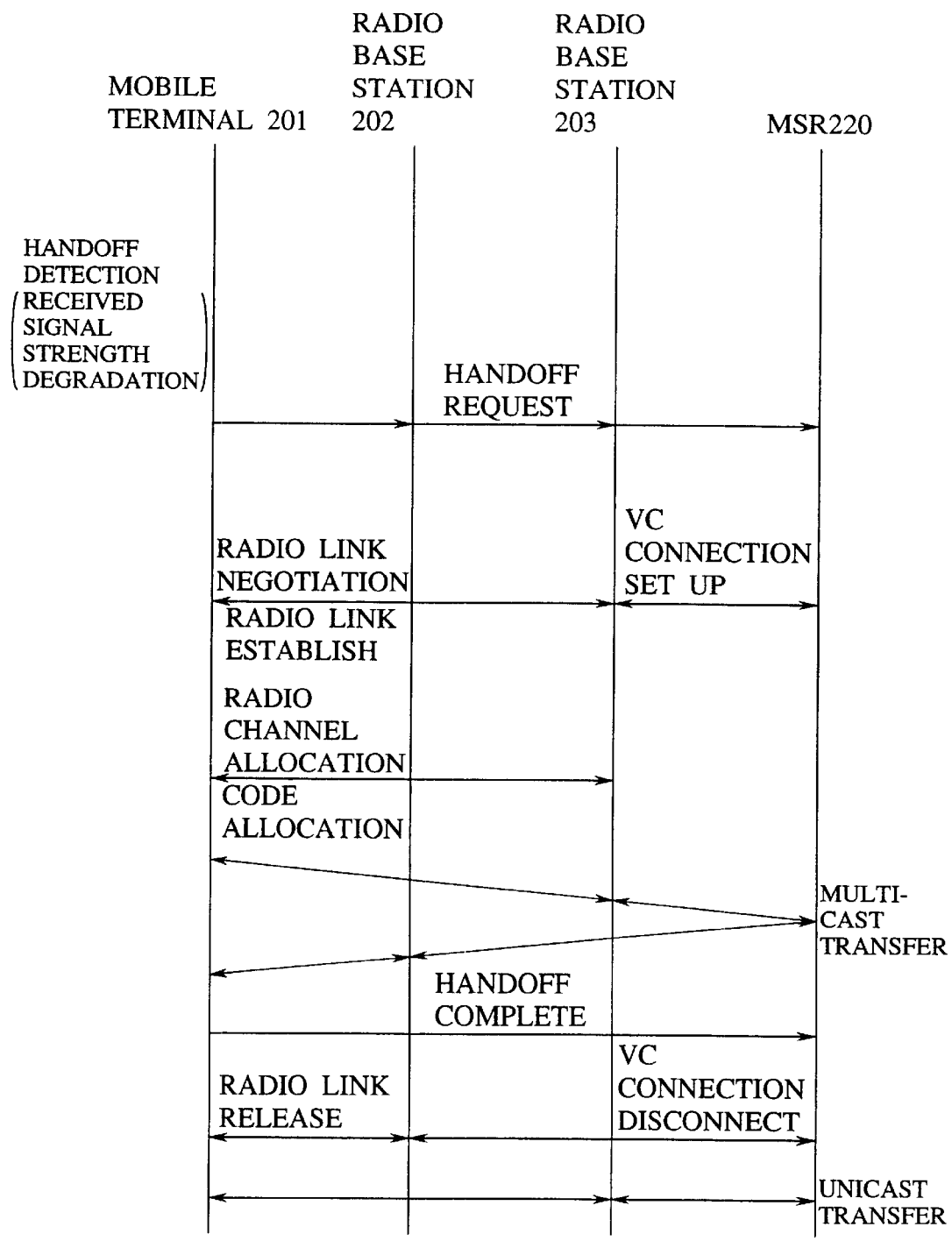
FIG. 25 is a sequence chart showing another exemplary handoff control procedure in the mobile communication system of FIG. 5.

Next, with reference to FIG. 25, another example of the handoff control operation in the case where the mobile terminal 201 moves from the radio base station 202 to the radio base station 203 will be described.

First, the mobile terminal 201 detects the degradation of the received signal strength, and transmits a handoff request message to the MSR 220. Upon receiving the handoff request message from the mobile terminal 201, the MSR 220 carries out the VC connection set up between the MSR 220 and the radio base station 203 according to the radio base station ID (BS#) of the radio base station 203 that is described within that message, while the radio base station 203 establishes a radio link between the mobile terminal 201 and the radio base station 203 and carries out the radio channel allocation with respect to the mobile terminal 201. Then, the multicast transfer is carried out.

When the received signal strength of the radio base station 203 becomes good at the mobile terminal 201, the mobile terminal 201 transmits a handoff completion message to the MSR 220. Then, according to a command from the MSR 220 that received this message, the radio base station 202 carries out the radio link release and the VC connection disconnection and returns to the unicast transfer.

Here, apart from the handoff, it is also possible to use a method in which the mobile terminal 201 requests a radio channel to each radio base station within a range for which the broadcast channel of BCCH can reach, so as to realize the multiple connection with a plurality of base stations, and receives data from all the radio channels corresponding to respective VCs and selects data in the best reception state.

Figure 26:
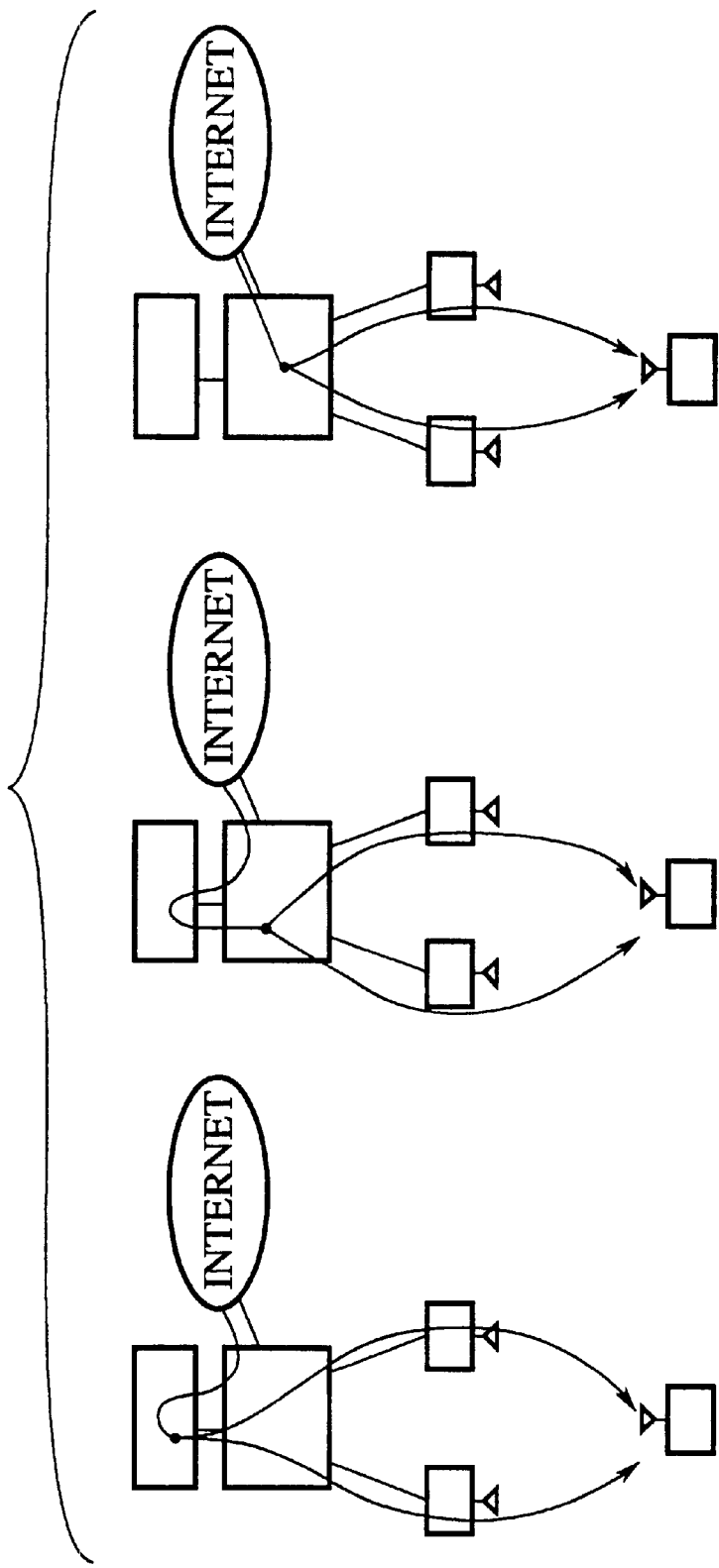
FIG. 26 is a diagram showing multicast transfer methods at a time of handoff that can be used in the mobile communication system of FIG. 5.
Figure 27:
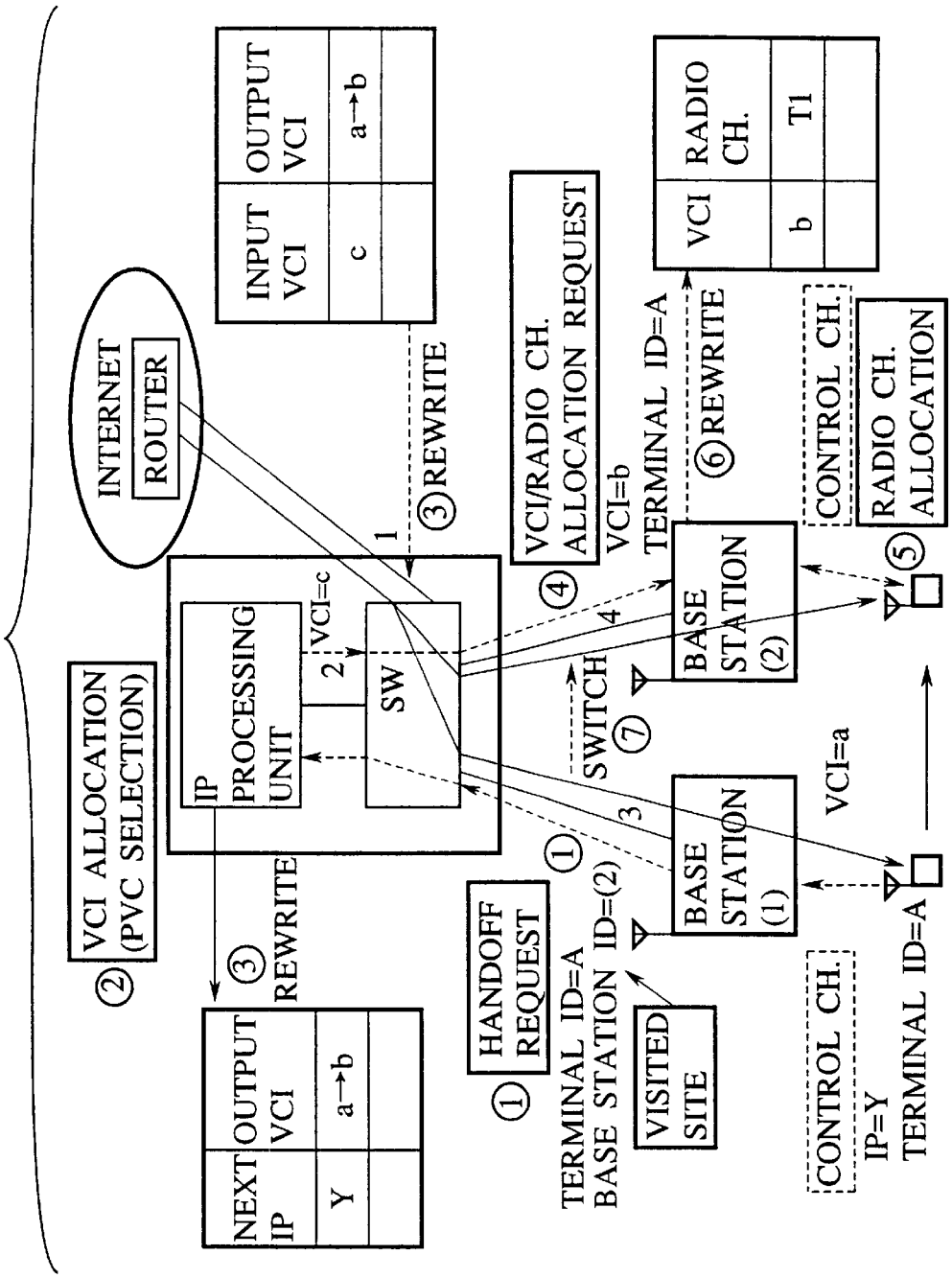
FIG. 27 is a diagram showing one exemplary operation at a time of handoff control in the mobile communication system of FIG. 5.

Also, as shown in FIG. 26, the following three methods (1) to (3) are available as the multicast transfer method.

(1) A method in which the IP multicast at the IP processing unit on layer 3 in the MSR is used for the multicast transfer at a time of handoff.

(2) A method in which the ATM switch on datalink layer carries out the multicast transfer after the output from the IP processing unit on layer 3 in the MSR.

(3) A method in which only the datalink layer switch (ATM) in the MSR carries out the multicast transfer of some scheme or switches schemes according to communication quality.

Next, the concrete example of the table rewriting operation at the radio base station and the MSR at a time of the handoff operation will be described with references to FIG. 17, FIG. 18 and FIGS. 27 to 29. Also, FIGS. 30 to 35 show various table configurations.

First, the handoff operation in the case of no cut-through transfer will be described.

The communication system shown in FIG. 17 comprises the mobile terminal 201, the radio base stations 202 and 203, the MSR 220, and Internet 224, where the radio section between the mobile terminal 201 and the radio base stations 202 and 203 has radio channels (radio CH, SVC) set up on-demand and pre-assigned radio channels (radio CH, PVC).

In addition, a Default VC (PVC in which the processing goes up to the IP forwarding processing unit)and a Dedicated VC (individually allocated PVC or SVC in which the processing can go up to the IP forwarding processing unit or can be cut-through transferred at a switch level) are provided between each one of the radio base stations 202 and 203 and the MSR 220.

Each one of the radio base stations 202 and 203 has a radio channel-VPI/VCI correspondence management table, for setting the radio channel and VPI/VCI in correspondence and carrying out VPI/VCI conversion according to the need. In addition, the MSR 220 carries out the routing processing to determine whether an IP packet received from Internet 224 should be transferred to the other router or to the radio base station 202 or 203, and has a routing table having at least a set of destination IP address, Next Hop IP address, and IF number (interface number) to be used for outputting, and an ARP table (connection management table) capable of at least setting IP address and VCI in correspondence directly or indirectly.

In this communication system, it is assumed that an IP packet from Internet 224 is transferred from the MSR 220 via the radio base station 202 to the mobile terminal 201. In this case, the following operations (1) to (4) are carried out.

(1) When the IP packet is received from Internet 224, the MSR 220 checks whether this IP packet is an IP packet destined to this MSR 220 or an IP packet to be forwarded to next, and forwards this IP packet to the next IP and interface number corresponding to the destination IP by referring to the routing table if it is not destined to this MSR 220.

(2) Then, VPI/VCI corresponding to the IP address is taken out by referring to the ARP (connection management) table, and an ATM cell is assembled from the IP packet by attaching the VPI/VCI thereto and transferred to the radio base station 202.

(3) In addition, at the radio base station 202, the radio channel corresponding to VPI/VCI of the received ATM cell is taken out from the radio channel-VPI/VCI management table, and a radio packet is transmitted up to the mobile terminal 201 by attaching a radio header, etc., and using the allocated radio channel.

(4) When this radio packet is received, the mobile terminal 201 carries out the format conversion in the sequence of radio packet→ATM cell→AAL5→IP packet so as to receive the IP packet.

Next, the operation in the case of transition from a state in which the IP packet is transferred through a route of Internet 224→MSR 220→radio base station 202→mobile terminal 201 to a state in which it is transferred a route of Internet 224→MSR 220→radio base station 203→mobile terminal 201 by the handoff will be described with reference to FIG. 29, which includes the following steps (1) to (7).

(1) When the mobile terminal 201 detects the moving from the radio base station 202 (1) to the radio base station 203 (2), the mobile terminal 201 transmits a handoff request message containing the own terminal ID=A (which may not necessarily be the terminal ID as long as it can uniquely identify the terminal) and the base station ID=(2) (which may not necessarily be the base station ID as long as it can uniquely identify the visited site location), to the MSR 220, using the pre-assigned radio channel of the visited site radio base station 203 and the control PVC for example. (Here, the handoff request message may be notified via the originally located site base station, in which case either the common control channel or the associated control channel may be used.)

Figure 32:
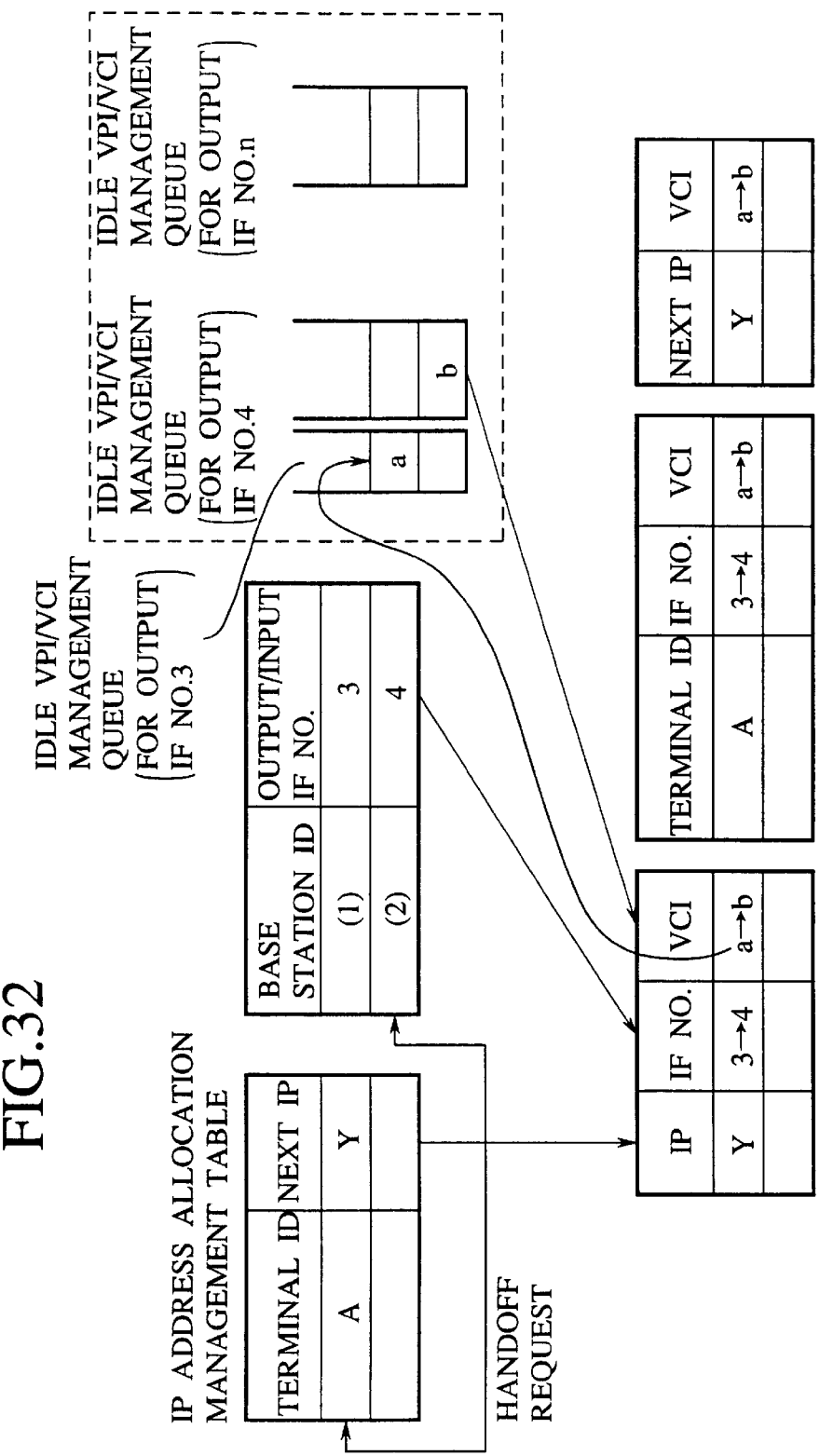
FIG. 32 is a diagram showing exemplary configuration and updating operation of a location information memory unit that can be used in the mobile communication system of FIG. 5.

(2) Upon receiving this handoff request message, the MSR 220 figures out the IP address=Y corresponding to the terminal ID=A, and also figures out the output IF number=4 from the base station ID=(2) (this output IF number is the port number of the switch which is different from the IF number of the routing table, and indicates a physical IF number in contrast to the IF number of the routing table which indicates a logical output interface which is a management unit of the ARP table), as shown in FIG. 32. Then, a value of VPI/VCI (VPI/VCI=b) is obtained from an idle VPI/VCI management queue provided for each output IF number, according to the figured out output IF number=4. At this point, the transmission of the figured out IP packet to the old base station is stopped once.

(3) Then, by referring to the ARP table according to the figured out IP address, the output IF number=3 and the VPI/VCI value (VPI/VCI=a) for the originally located site that are registered in the corresponding entry are read out, and this VPI/VCI=a is returned to the idle VPI/VCI management queue corresponding to the read out output IF number=3. In addition, the output IF number=4 and the VPI/VCI value (VPI/VCI=b) for the visited site base station that are figured out at the above (2) are written into the ARP table.

(4) Then, a VCI/radio CH allocation request (containing VPI/VCI=b and terminal ID=A) is transmitted to the visited site base station 203, so as to request the set up of a radio channel between the mobile terminal 201 and the radio base station 203.

(5) Upon receiving this VCI/radio CH allocation request, the radio base station 203 carries out the operation to set up a radio connection between the mobile terminal 201 and the radio base station 203.

(6) Then, the corresponding value of the radio CH-VPI/VCI correspondence table is set according to the terminal ID=A or VPI/VCI=b. After that, a VCI/radio CH allocation response (not shown) is returned to the MSR 220.

(7) Upon receiving this VCI/radio CH allocation response (not shown), the MSR 220 restarts the transmission of the IP packet stored in the internal buffer queue. In this manner, the switching has been realized.

Here, the connection set up between the MSR 220 and the mobile terminal 201 that is carried out by the above (4) to (6) may be carried out by the existing connection set up procedure of Q. 2931, etc., rather than using the method for executing the PVC selection as described above.

Also, the order of the ARP table updating of the above (3) and the connection set up of the above (4) to (6) may be interchanged. In such a case, the restart of the IP packet transmission at the above (7) is to be carried out according to the fact that the ARP table updating is completed.

It is also possible to carry out the handoff processing of the re-connection type in which the mobile terminal 201 requests the connection set up via the visited site base station. In such a case, it is possible to realize the handoff by transmitting a connection set up message containing the terminal ID and the visited site base station ID from the mobile terminal 201 to the MSR 220 so as to carry out the connection set up, and carrying out the ARP table updating similarly as described above.

Also, the case of stopping the IP packet transmission during the handoff operation has been described above, but it is also possible to realize the handoff in a state of continuing the transmission without stopping it once, or by a configuration for carrying out the multicast transfer using the ARP table.

Also, in the above (3), there is a need for the operation to return the old VPI/VCI to the idle VPI/VCI management queue, but this may be done by taking it out from a table for managing the output VPI/VCI value corresponding to the input VPI/VCI value (which may be the VPI/VCI conversion table shown in FIG. 29), and returns it to the idle VPI/VCI management queue. In such a case, although not shown in the figure, there is a need to store the input VPI/VCI value in addition to the IP address value corresponding to the terminal ID in FIG. 32.

Next, the handoff operation in the case of using cut-through transfer will be described with reference to FIG. 18.

The communication system shown in FIG. 18 comprises the mobile terminal 201, the radio base stations 202 and 203, the MSR 220, and Internet 224, where the radio section between the mobile terminal 201 and the radio base stations 202 and 203 has radio channels (radio CH, SVC) set up on-demand and pre-assigned radio channels (radio CH, PVC).

In addition, a Default VC (PVC in which the processing goes up to the IP forwarding processing unit)and a Dedicated VC (individually allocated PVC or SVC in which the processing can go up to the IP forwarding processing unit or can be cut-through transferred at a switch level) are provided between each one of the radio base stations 202 and 203 and the MSR 220.

Each one of the radio base stations 202 and 203 has a radio channel-VPI/VCI correspondence management table, for setting the radio channel and VPI/VCI in correspondence and also carrying out VPI/VCI conversion according to the need. In addition, the MSR 220 carries out the routing processing to determine whether an IP packet received from Internet 224 should be transferred to the other router or to the radio base station 202 or 203, and has a routing table (not shown, see FIG. 17) having at least a set of destination IP address, Next Hop IP address, and IF number (interface number) to be used for outputting, an ARP table (connection management table) capable of at least setting IP address and VCI in correspondence directly or indirectly, and a VPI/VCI conversion table for converting input VPI/VCI into output VPI/VCI.

In this communication system, it is assumed that an IP packet from Internet 224 is transferred from the MSR 220 via the radio base station 202 to the mobile terminal 201.

In this case, the following operations (1) to (4) are carried out.

(1) When the IP packet is received from Internet 224, the MSR 220 checks whether this IP packet is an IP packet destined to this MSR 220 or an IP packet to be forwarded to next, and forwards this IP packet to the next IP and interface number corresponding to the destination IP by referring to the routing table if it is not destined to this MSR 220.

(2) Then, VPI/VCI corresponding to the IP address is taken out by referring to the ARP (connection management) table, and an ATM cell is assembled from the IP packet by attaching the VPI/VCI thereto and transferred to the radio base station 202.

(3) In addition, at the radio base station 202, the radio channel corresponding to VPI/VCI of the received ATM cell is taken out from the radio channel-VPI/VCI management table, and a radio packet is transmitted up to the mobile terminal 201 by attaching a radio header, etc., and using the allocated radio channel.

(4) When this radio packet is received, the mobile terminal 201 carries out the format conversion in the sequence of radio packet→ATM cell→AAL5→IP packet so as to receive the IP packet.

Here, when some specific condition such as that the IP packet is transferred for relatively long time, the correspondence in the VPI/VCI conversion table itself is changed and the IP packet is transferred by cutting through the upper level IP forwarding processing unit.

Figure 28:
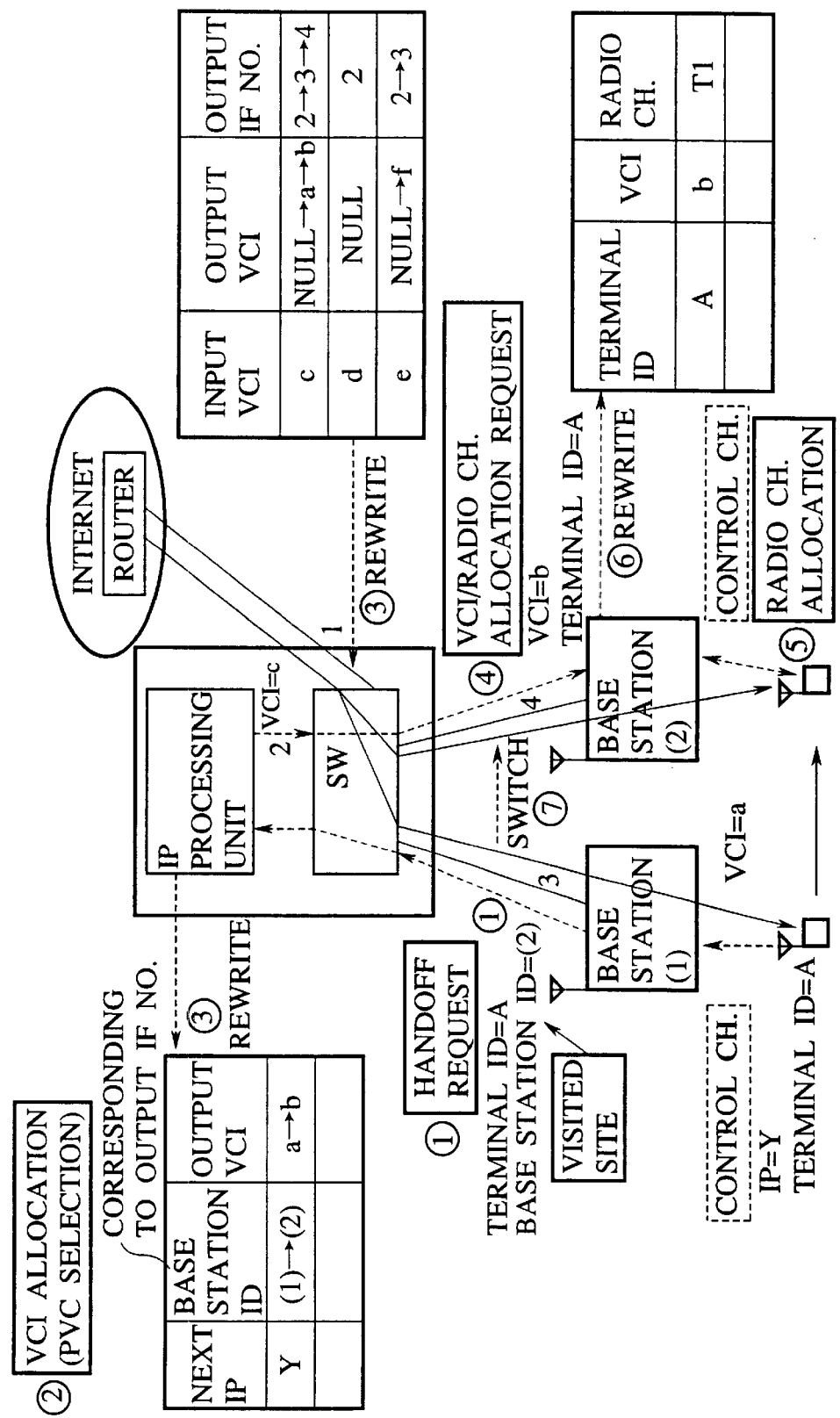
FIG. 28 is a diagram showing another exemplary operation at a time of handoff control in the mobile communication system of FIG. 5.

In the following, how this cut-through operation is carried out and how table change is to be made at that time will be described for the case in which the FANP operation is used only between the MSR and the router in Internet while the FANP operation is not used and a cut-through is set up between the MSR and the mobile terminal (one side FANP operation), and for the case in which the FANP operation is used for both between the MSR and the router in Internet as well as between the MSR and the mobile terminal while cut-throughs in both directions are set up (both side FANP operation), in an exemplary case of transition from the state of FIG. 29 to the state of FIG. 28.

First, the one side FANP operation will be described.

Figure 29:
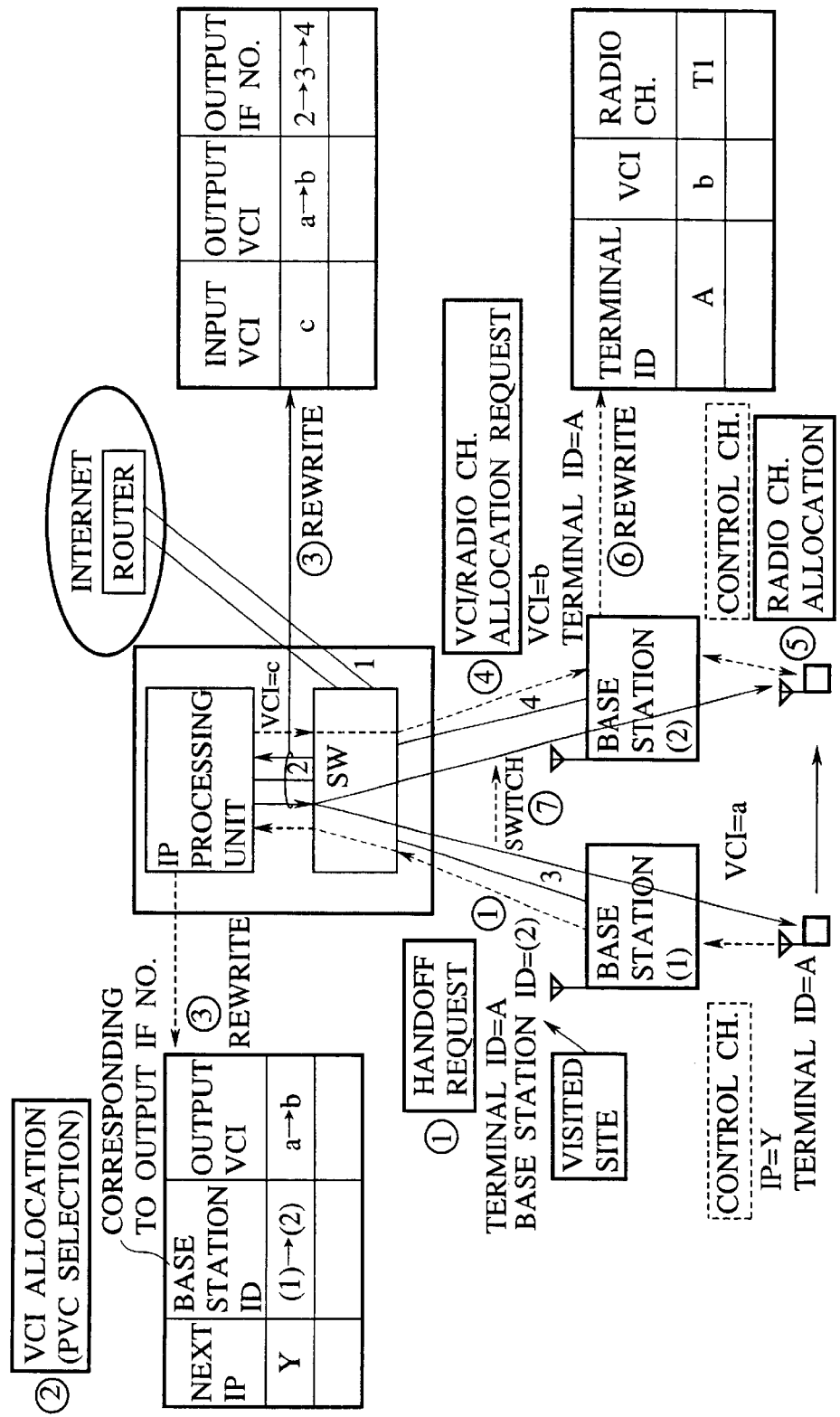
FIG. 29 is a diagram showing another exemplary operation at a time of handoff control in the mobile communication system of FIG. 5.
Figure 31:
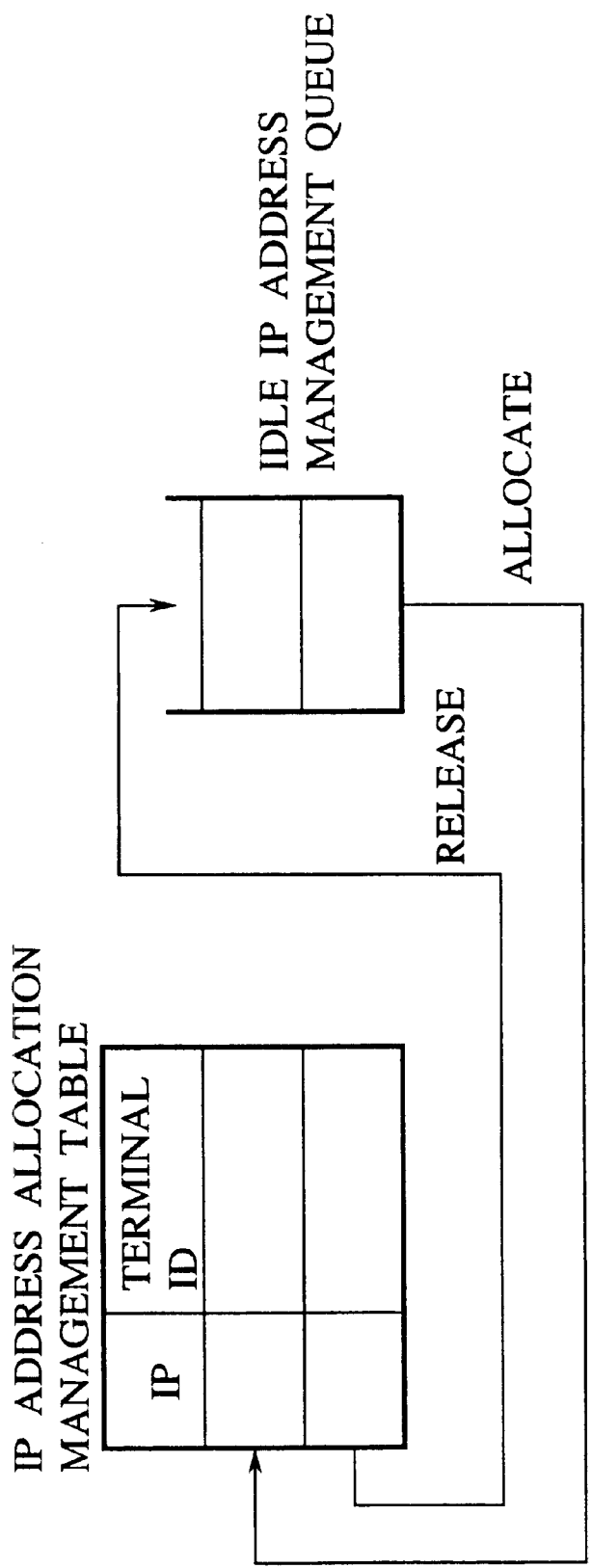
FIG. 31 is a diagram showing an exemplary configuration of an address allocation memory unit used in the mobile communication system of FIG. 5.

Here, in FIG. 29, it is assumed that the mobile terminal is located at the base station (1), and the IP packet communication between the router in Internet and the mobile terminal is carried out by using the default VC (input VCI=d) that is set up in advance between the router in Internet and the MSR and VCI=a between the MSR and the mobile terminal. In this case, the VPI/VCI conversion table is in a state of having input VCI=d, output VCI=NULL and output IF number=2, while the ARP table is in a state of having next IP address=Y, base station ID=(1) and output VCI=a.

In this state, when the cut-through trigger condition occurs, the FANP operation between the router in Internet and the MSR is carried out such that the dedicated VC (input VCI=c, output VCI=NULL, output IF number=2) is set up in the VPI/VCI conversion table first, and then a message for setting this input VCI=c and the IP address=Y in correspondence is exchanged. Then, the VPI/VCI conversion table is updated to the state of having input VCI=c, output VCI= NULL→a and output IF number=2→3, so as to realize the binding of the VPI/VCI conversion table with VCI=a (dedicated VC already set up by signaling and the like) that is used for communication between the MSR and the mobile terminal. In this manner, the cut-through transfer as shown in FIG. 28 is realized.

Next, the both side FANP operation will be described. Here, in FIG. 29, it is assumed that the mobile terminal is located at the base station (1), and the IP packet communication between the router in Internet and the mobile terminal is carried out by using the default VC (input VCI=d) that is set up in advance between the router in Internet and the MSR and VCI=a between the MSR and the mobile terminal. In this case, the VPI/VCI conversion table is in a state of having input VCI=d, output VCI=NULL and output IF number=2, while the ARP table is in a state of having next IP address=Y, base station ID=(1) and output VCI=a.

In this state, when the cut-through trigger condition occurs, the FANP operation between the router in Internet and the MSR is carried out such that the dedicated VC (input VCI=e, output IF number=2) is set up in the VPI/VCI conversion table first, and then a message for setting this input VCI=e and the IP address=Y in correspondence is exchanged.

In addition, the FANP operation between the MSR and the radio base station or between the MSR and the mobile terminal is activated such that the dedicated VC (output VCI=f) is set up between the MSR and the radio base station or between the MSR and the mobile terminal first, and then a message for setting this VCI=f and the IP address=Y in correspondence is exchanged.

Then, the VPI/VCI conversion table is updated to a state of having input VCI=e, output VCI=NULL→f and output IF number=2→3, so as to realize the binding of the VPI/VCI conversion table with VCI=f that is used for communication between the MSR and the mobile terminal and VCI=e that is set up for communication between Internet and the MSR. In this manner, the cut-through transfer as shown in FIG. 28 is realized.

Next, how handoff is realized in this case of cut-through transfer state will be described. Namely, the operation in the case of transition from a cut-through transfer state in which the IP packet is transferred through a route of Internet 224→MSR 220→radio base station 202→mobile terminal 201 to a state in which it is transferred a route of Internet 224→MSR 220→radio base station 203→mobile terminal 201 by the handoff will be described with reference to FIG. 27, which includes the following steps (1) to (7).

(1) When the mobile terminal 201 detects the moving from the radio base station 202 (1) to the radio base station 203 (2), the mobile terminal 201 transmits a handoff request message containing the own terminal ID=A (which may not necessarily be the terminal ID as long as it can uniquely identify the terminal) and the base station ID=(2) (which may not necessarily be the base station ID as long as it can uniquely identify the visited site location), to the MSR 220, using the pre-assigned radio channel of the visited site radio base station 203 and the control PVC for example. (Here, the handoff request message may be notified via the originally located site base station, in which case either the common control channel or the associated control channel may be used.)

(2) Upon receiving this handoff request message, the MSR 220 figures out the IP address=Y corresponding to the terminal ID=A, and also figures out the output IF number=4 from the base station ID=(2) (this output IF number is the port number of the switch which is different from the IF number of the routing table, and indicates a physical IF number in contrast to the IF number of the routing table which indicates a logical output interface which is a management unit of the ARP table), as shown in FIG. 32. Then, a value of VPI/VCI (VPI/VCI=b) is obtained from an idle VPI/VCI management queue provided for each output IF number, according to the figured out output IF number=4.

Also, although not shown in FIG. 32, the input VPI/VCI value corresponding to the terminal ID is also stored besides the IP address corresponding to the terminal ID, so that the input VPI/VCI=c is also figured out. At this point, the transmission of the figured out IP packet to the old base station is stopped once.

In the case of using a configuration which does not carry out the ARP table updating subsequently, the operation to figure out the IP address corresponding to the terminal ID is not absolutely necessary. The operation to figure out the IP address is also not necessary in the case of using the fixed IP address instead of the terminal ID.

(3) Then, by referring to the VPI/VCI conversion table according to the figured out input VPI/VCI (=c), the output VPI/VCI=a and the output IF number=3 for the originally located site that are registered in the corresponding entry are read out, and this VPI/VCI (=a) is returned to the idle VPI/VCI management queue corresponding to the read out output IF number=3. In addition, the output IF number=4 and the VPI/VCI value (VPI/VCI=b) for the visited site base station that are figured out at the above (2) are written into the entry of input VPI/VCI=C.

(4) Then, a VCI/radio CH allocation request (containing VPI/VCI=b and terminal ID=A) is transmitted to the visited site base station 203, so as to request the set up of a radio channel between the mobile terminal 201 and the radio base station 203.

(5) Upon receiving this VCI/radio CH allocation request, the radio base station 203 carries out the operation to set up a radio connection between the mobile terminal 201 and the radio base station 203.

(6) Then, the corresponding value of the radio CH-VPI/VCI correspondence table is set according to the terminal ID=A or VPI/VCI=b. After that, a VCI/radio CH allocation response (not shown) is returned to the MSR 220.

(7) Upon receiving this VCI/radio CH allocation response (not shown), the MSR 220 restarts the transmission of the IP packet stored in the internal buffer queue. In this manner, the switching has been realized.

Here, the connection set up between the MSR 220 and the mobile terminal 201 that is carried out by the above (4) to (6) may be carried out by the existing connection set up procedure of Q. 2931, etc., rather than using the method for executing the PVC selection as described above.

Also, the order of the VPI/VCI conversion table updating of the above (3) and the connection set up of the above (4) to (6) may be interchanged. In such a case, the restart of the IP packet transmission at the above (7) is to be carried out according to the fact that the VPI/VCI conversion table updating is completed.

It is also possible to carry out the handoff processing of the re-connection type in which the mobile terminal 201 requests the connection set up via the visited site base station. In such a case, it is possible to realize the handoff by transmitting a connection set up message containing the terminal ID and the visited site base station ID from the mobile terminal 201 to the MSR 220 so as to carry out the connection set up, and carrying out the VPI/VCI conversion table updating similarly as described above.

Also, the case of stopping the IP packet transmission during the handoff operation has been described above, but it is also possible to realize the handoff in a state of continuing the transmission without stopping it once, or by a configuration for carrying out the multicast transfer using the VPI/VCI conversion table.

In the above description of the handoff operation at a time of the cut-through transfer, the ARP table updating has not been described but, if the ARP table is set in advance at a time of the switching from the cut-through transfer to the transfer using the usual IP forwarding processing, there is a merit in that the switching can be realized quickly.

For this reason, it is also possible to add the following operation (3)' between the above (3) and (4) of the handoff operation at a time of the cut-through transfer described above.

(3)' The output IF number=4 and the VPI/VCI value (VPI/VCI=b) for the visited site base station that are figured out at the above (2) are written into the ARP table.

It is also possible to replace the above (3) by the following operation (3)".

(3)" By referring to the ARP table according to the figured out IP address (=Y), the output IF number=3 and the VPI/VCI value (VPI/VCI=a) for the originally located site that are registered in the corresponding entry are read out, and this VPI/VCI=a is returned to the idle VPI/VCI management queue corresponding to the read out output IF number=3.

It is also possible to add the following operation (3)''' after executing the ARP table updating processing in which (the output IF number=4 and) the VPI/VCI value (VPI/VCI=b) for the visited site base station that are figured out at the above (2) are written into the ARP table.

(3)''' The output IF number=4 and the VPI/VCI value (VPI/VCI=b) for the visited site base station that are figured out at the above (2) are written into the entry of input VPI/VCI=c.

Also, in the handoff operation described above, if the input VPI/VCI value is also stored in the entry of the ARP table, there is no need to provide a table for managing the correspondence between the terminal ID and the input VPI/VCI (not shown in FIG. 32) at a time of updating the VPI/VCI conversion table after the ARP table updating.

Figure 33:
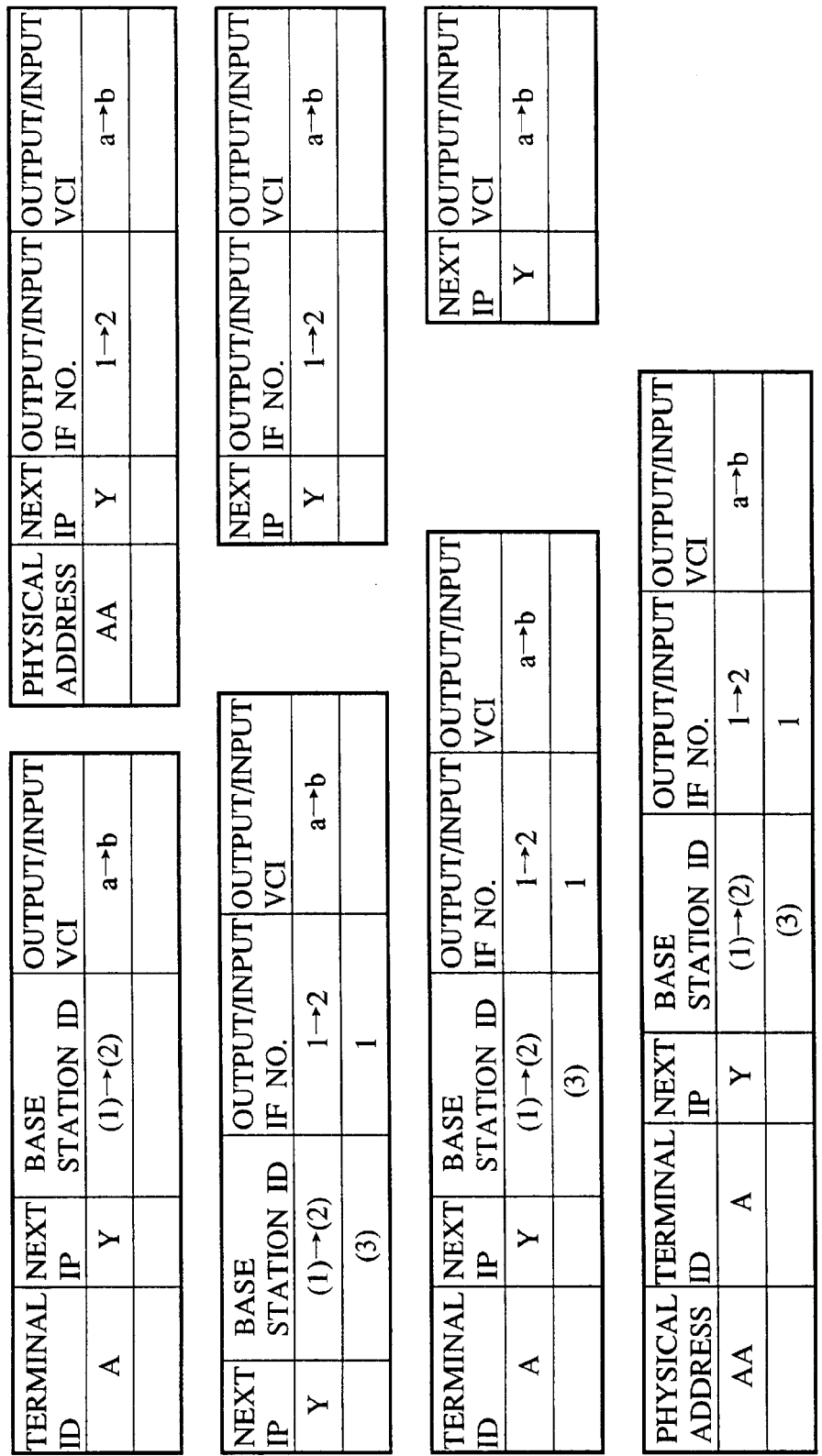
FIG. 33 is a diagram showing other exemplary configurations of a location information memory unit that can be used in the mobile communication system of FIG. 5.
Figure 34:
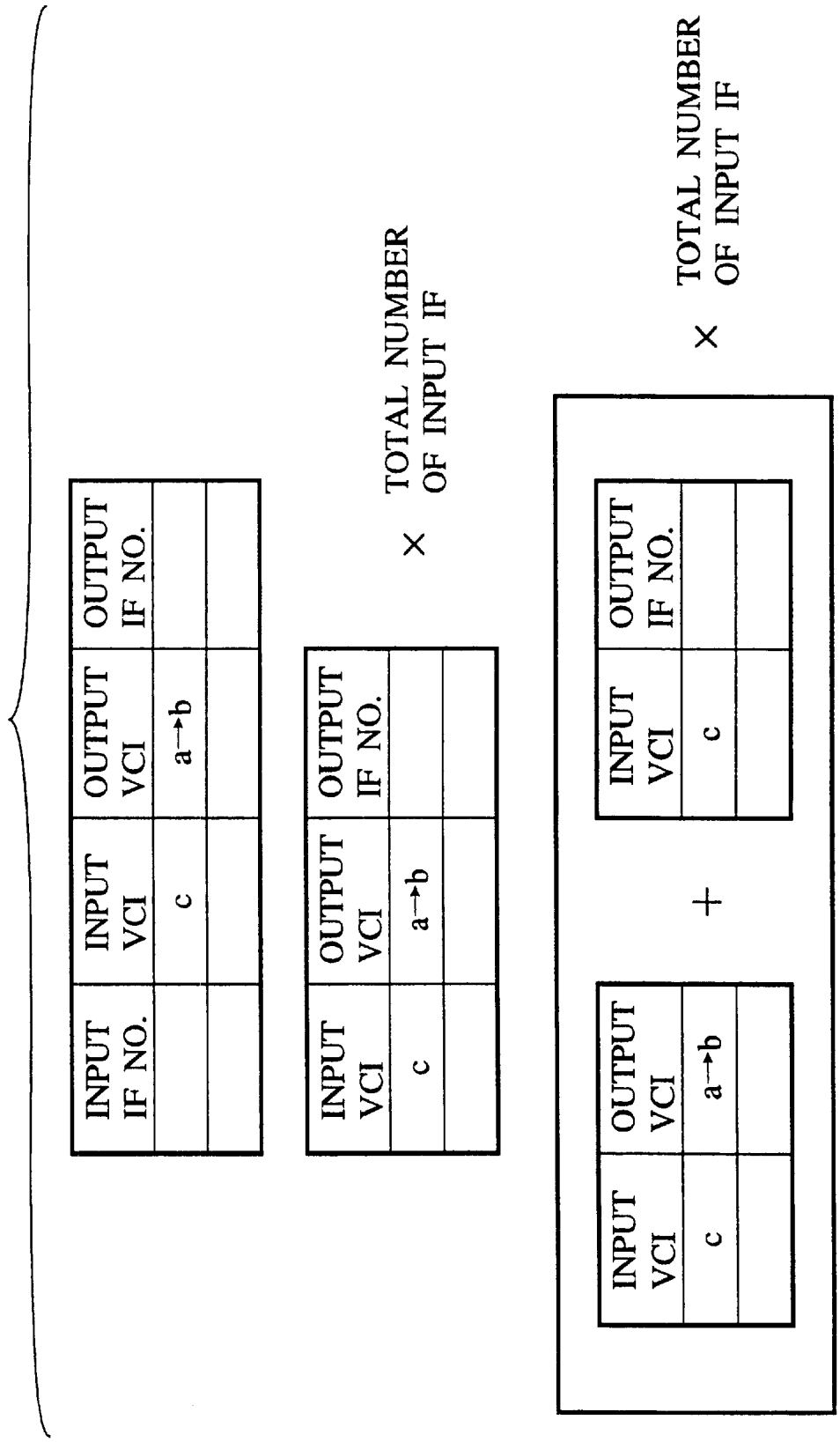
FIG. 34 is a diagram showing other exemplary configurations of an address allocation memory unit that can be used in the mobile communication system of FIG. 5.
Figure 35:
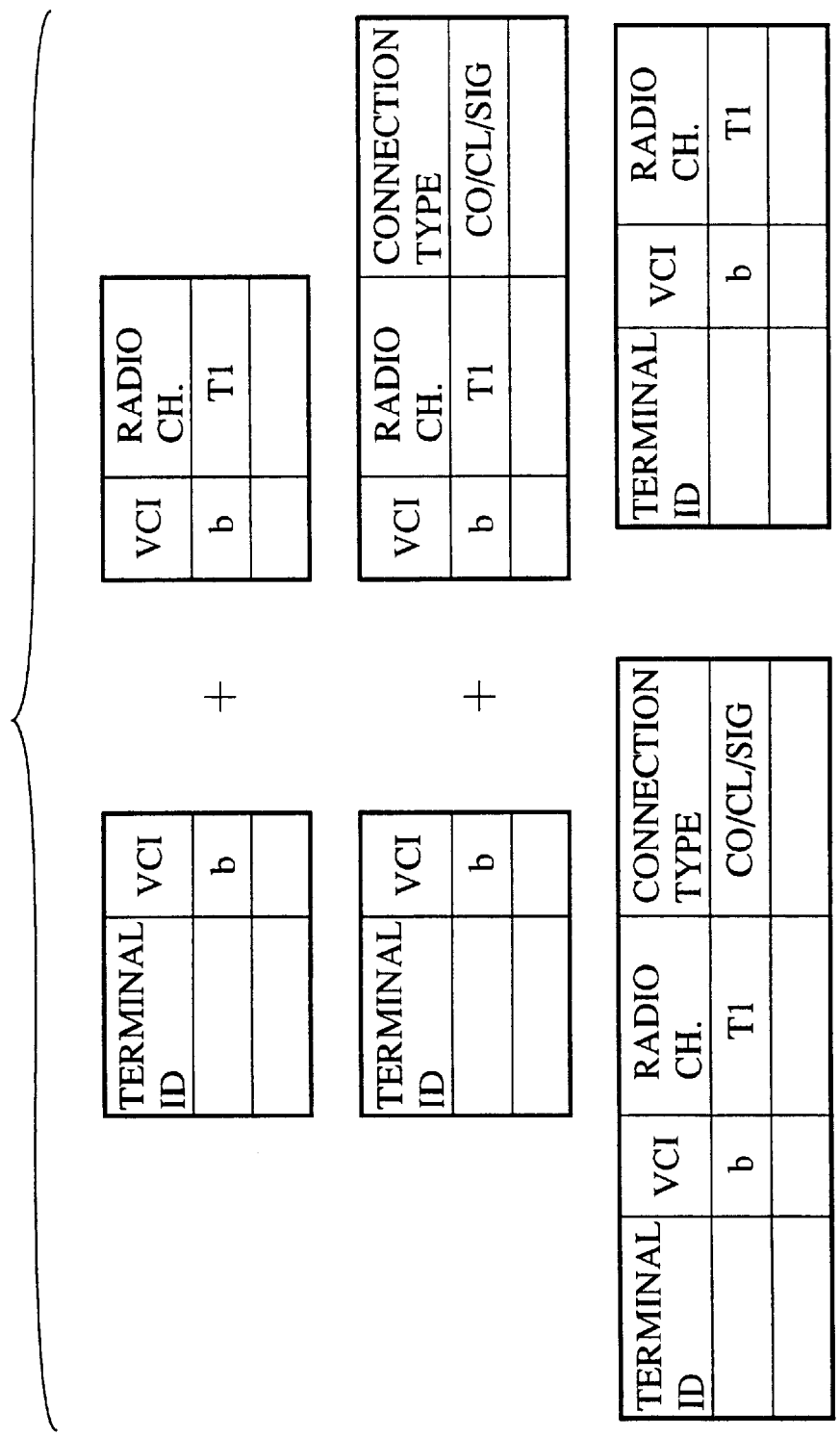
FIG. 35 is a diagram showing exemplary configurations of a VPI/VCI conversion table (and a VPI/VCI management table of MSR) that can be used in the mobile communication system of FIG. 5.

Also, the above description is directed only to an exemplary case of using a specific configuration having the ARP table, the VPI/VCI conversion table and the radio channel-VPI/VCI correspondence management table, but it is also possible to realize the handoff operation by using configuration of tables as shown in FIG. 33 to FIG. 35, and the present invention can be realized by using any of these table configurations.

Next, the case in which the mobile terminal is disconnected within the area of the radio base station will be described.

The call ending and disconnection operation state is an operation state in which the exchange of control messages related to a disconnection at a time of ending the communication is carried out by using ACCH in the case of CO type communication or by using USCCH in the case of CL type communication, until the communication is ended and disconnected. Here, in the case of CO type communication, the message exchange for the radio channel release and the wire connection release is carried out at a time of communication ending, while in the case of CL type communication, the message exchange for the radio channel release and the release of IP address and the like is carried out at a time of communication ending.

Here, the CL type communication implies that the IP packet of the layer 3 is connection-less type. Consequently, there is no need for the connection release when PVC is used for the datalink layer level transmission, but there is a need to carry out the connection release at a time of communication ending when the communication was made by carrying out the connection set up on-demand.

The disconnection operation usually includes a disconnection request detection phase and a disconnection execution phase. The disconnection request detection phase is a phase for detecting whether a disconnection request is issued internally or not at the MSR or the mobile terminal 201, where the disconnection operation is executed with respect to the opposite side of the connection set up when the disconnection request is issued.

This disconnection operation can be realized by either a network side disconnection procedure in which the disconnection procedure is initiated from the MSR side with respect to the mobile terminal 201, or a terminal side disconnection procedure in which the disconnection procedure is initiated from the mobile terminal 201 side with respect to the MSR.

Now, these two disconnection procedures will be described with references to FIGS. 36A and 36B.

Figure 36A:
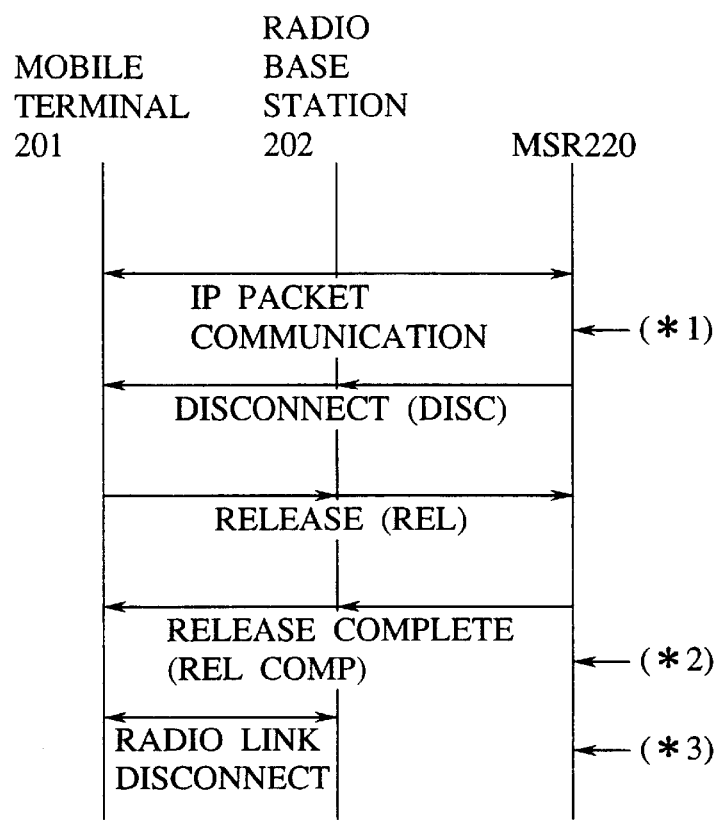
FIGS. 36A and 36B are sequence charts showing exemplary communication disconnection procedures that can be used in the mobile communication system of FIG. 5.

FIG. 36A shows the network side disconnection procedure which includes the following steps (1) to (4).

(1) First, when the timer provided in the connection management table of the MSR becomes timeout or an explicit disconnection request is issued, a disconnection (DISC) message is transmitted from the MSR to the mobile terminal 201 by suing the control channel (UACCH, ACCH) associated with the already set up connection in the radio section and the control VC in the wire section.

(2) Then, a release (REL) message is transmitted from the mobile terminal 201 to the MSR.

(3) Then, a release completion (REL COMP) message is returned from the MSR to the mobile terminal 201.

(4) Then, the operation is completed by disconnecting the radio link between the radio base station and the mobile terminal 201.

Here, the IP address release operation may be included before or after the radio link disconnection operation, and before the disconnection operation starts.

Figure 36B:
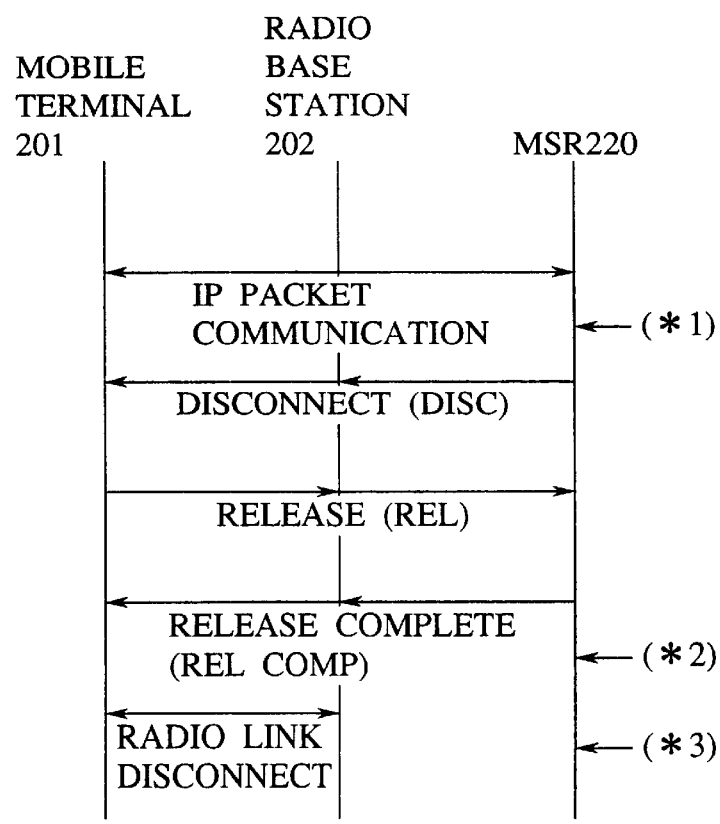

FIG. 36B shows the terminal side disconnection procedure which includes the following steps (1) to (4).

(1) First, when the timer provided in the connection management table of the mobile terminal 201 becomes timeout or an explicit disconnection request is issued, a disconnection (DISC) message is transmitted from the mobile terminal 201 to the MSR by suing the control channel (UACCH, ACCH) associated with the already set up connection in the radio section and the control VC in the wire section.

(2) Then, a release (REL) message is transmitted from the MSR to the mobile terminal 201.

(3) Then, a release completion (REL COMP) message is returned from the mobile terminal 201 to the MSR.

(4) Then, the operation is completed by disconnecting the radio link between the radio base station and the mobile terminal 201.

Here, similarly as in the case of the network side disconnection procedure, the IP address release operation may be included before or after the radio link disconnection operation, and before the disconnection operation starts.

When the network side disconnection procedure is executed, the entry updating of the ARP table (in which at least the IP address and VPI/VCI are set in correspondence) of the MSR that is on the network side is basically carried out before the execution of the disconnection procedure, but it is also possible to carry out this entry updating after the execution of the disconnection procedure. It is also possible to maintain the old connection management table (ARP table) until the set up of a connection to be newly set up is completed in the case where the disconnection procedure is carried out at a time of handoff operation at least.

Next, a method for pausing the transmission at a time of handoff will be described.

The IP packet transmission at a time of handoff can be temporarily stopped while queueing IP packets in an internal buffer. A situation in which the handoff request is issued is expected to be a situation in which the transfer efficiency is poor and only re-transmission is caused even when the IP packet transfer to the old connection is attempted, because of the very poor quality in the radio section. In view of this fact, it is preferable to temporarily stop the IP packet transmission and store IP packets in the internal queue at a time of handoff, and resume the transmission of IP packets stored in the internal queue when the connection set up is completed again.

Considering these points, it is also possible to define a pause state in addition to a registration state and a cancellation state as the entry state of the ARP table at a time of handoff. In this case, a packet in the registration state will be transmitted after being queued, while a packet in the cancellation state will be discarded without being queued, and a packet in the pause state will be queued but not transmitted.

When the IP packet transmission is paused at a time of handoff in this manner, there is a possibility for influencing the TCP operation depending on cases. For this reason, it is also possible to provide the MSR with a function for converting TCP in the radio section and TCP in the wire section. In this case, when a packet is in the pause state as described above, a window size is adjusted (a TCP window size is reduced) so as to lower the transfer rate at the transmitting side.

Next, the operation in the case where there is a call termination from the IP terminal at the mobile terminal within the area of the radio base station will be described.

The call termination operation state is an operation state since an access request (calling) is made from the other terminal (the cellular terminal 227 or the IP terminal 225 of FIG. 5, for example) until it becomes a communication in progress state, in which after being called by PCH, the radio channel (TCH) allocation and the exchange of control messages for connection set up using ACCH are carried out so as to be able to communicate with the cellular terminal 227 in the case of CO type communication, or the own IP address is notified to the IP terminal 225 so as to be able to communication with the IP terminal 225 in the case of CL type communication.

The call termination connection operation includes (1) a call termination request detection phase, (2) a location check (paging) phase, (3) an address resolution phase, (4) a connection set up phase, and (5) an IP packet transfer phase, which are to be executed in an order of (1)→(2), (3), (4)→(5).

Here, (2) is an operation for checking the connection target, which may be executed either simultaneously with or separately from the address resolution of (3) for the purpose of connection set up. When the value of VPI/VCI (PVC) that is permanently set up is obtained at a time of phases (2) and (3), it suffices for the connection set up phases (4) to write that value into the connection management table without carrying out any signaling operation.

Next, with references to FIG. 37 and FIG. 38, the call termination connection operation will be described. The call termination connection operation procedure shown in FIG. 37 is an operation procedure in which the MSR 220 carries out the location check operation procedure based on receiving of an IP packet from the IP terminal 225, and then the connection set up operation procedure is carried out from the mobile terminal 201 so as to carry out the IP packet communication and the IP packet cut-through transfer. The call termination connection operation procedure shown in FIG. 38 is an operation procedure in which the MSR 220 carries out the location check operation procedure based on receiving of an IP packet from the IP terminal 225, and then the connection set up operation procedure is carried out from the MSR 220 so as to carry out the IP packet communication and the IP packet cut-through transfer.

Here, in the connection set up in FIG. 37 and FIG. 38, the operation becomes different depending on which one of the mobile terminal 201, the radio base station 202, and the MSR 220 is going to be an entity for managing the setting of the wire section to be either one of (PVC selection, SVC allocation) and the setting of the radio section to be any one of (on-demand radio CH allocation, pre-assigned radio CH selection) and (radio PVC selection, radio SVC allocation), but the call termination operation can be realized in any of these configurations.

Also, the connection set up of FIGS. 22 and 23 and FIGS. 37 and 38 can be realized by utilizing the existing connection set up procedure such as Q. 2931, etc.

Also, the IP address allocation of FIGS. 22 and 23 can be realized by utilizing the existing IP address allocation set up procedure such as DHCP, etc.

Here, the location check operation procedure of FIGS. 37 and 38 described above is activated when a subnet ID field of the destination IP address of the received IP packet coincides with a subnet of the MSR 220, and derives the terminal ID from the IP address and carries out the paging operation similar to that of the mobile communication according to that terminal ID, where upon receiving this paging request, the mobile terminal 201 returns a paging response to the MSR 220. Then, the MSR 220 checks the location of the mobile terminal 201 according to the terminal identifier (terminal ID) and the radio base station identifier (radio base station ID) contained within that paging response.

Also, the location check operation procedure of FIGS. 37 and 38 described above is activated when a subnet ID field of the destination IP address of the received IP packet coincides with a subnet of the MSR 220, and derives the terminal ID from the IP address and carries out the paging operation similar to that of the mobile communication according to that terminal ID, where the location check operation procedure is carried out by the operation procedure similar to that of ARP by resolving (terminal ID, radio base station ID) corresponding to the IP address. Namely, the location check is carried out in such a manner that an ARP request packet from is transmitted from the MSR 220, and upon receiving this ARP request packet the mobile terminal 201 returns an ARP response packet containing the terminal ID and the radio base station ID to the MSR 220.

Next, the detailed configuration of the MSR will be described with reference to FIG. 39.

As shown in FIG. 39, the MSR is a router device comprising a control unit 310 and a switch unit 311, where the control unit 310 has at least an IP forwarding function 300, a location management (MM) function 301, a network layer address allocation function (DHCP function) 302, and a cut-through path set up/release function 303. Here, the switch unit 311 may not necessarily be an ATM switch, but in the following description it is assumed that the switch unit 311 is formed by an ATM switch.

The location management (MM) function 301 is formed by a location information memory module 320 and a location update module 321. The DHCP function 302 is formed by an address allocation memory module 322 and an address allocation change module 323. The switch unit 311 is formed by a transfer target memory module 324 and a transfer target determining module 325.

In this embodiment, the MSR has the following characteristics.

(1) The MSR differs from (conventional router device+mobile access technique) in that, when the mobile terminal 201 moves between the radio base stations 202 and 203, the location movement management function of the MSR detects the moving of that mobile terminal 201 (by receiving a moving notice from any of the mobile terminal 201 and the radio base stations 202 and 203 and detecting the received notice), and the datalink layer switch unit (such as Ethernet switch, ATM switch, etc.) carries out the switching of the transfer route at the datalink level, so as to be able to realize the handoff faster than the conventional handoff technique on the network layer level used in the Internet type network.

(2) The MSR also differs from (conventional router device+mobile access technique) in that, when the mobile terminal 201 moves between the radio base stations 202 and 203, the location movement management function of the MSR detects the moving of that mobile terminal 201 (by receiving a moving notice from any of the mobile terminal 201 and the radio base stations 202 and 203 and detecting the received notice), and the instantaneous disconnection of the communication is eliminated by realizing the multiple connection at the MSR, in contrast to (conventional router device+mobile access technique) in which the communication is disconnected and then reconnected after the mobile terminal 201 has moved to the visited site radio base station 203, so as to be able to realize the handoff with superior communication quality than the conventional handoff technique used in the Internet type network.

Also, by additionally storing the correspondence with respect to the service quality information (traffic type (such as media type), connection type, terminal type) in the transfer target memory module 324, the transfer target determining module 325 can easily switch among the datalink layer level transfer, the network layer level transfer, the unicast transfer, and the multicast transfer, according to the service quality stored in the transfer target memory module 324, on the basis of the table entry contents and the above characteristics (1) and (2).

Also, as a method of multiple connection, a method for carrying out the multicast transfer (such as IP packet multicast, for example) on the network layer level and a method for carrying out the multicast transfer (such as ATM cell multicast, for example) on the datalink layer level are available. When combined with the layer 3 switch, even the multiple connection on the network layer level can be expected to improve the performance significantly, but the performance can be even better in the multiple connection on the datalink layer level.

In addition, in the radio communication system of CDMA scheme, the MSR can make use of the features of the CDMA scheme in the case where the multicast transfer is indispensable in order to realize the soft handoff. Also, by providing a server (provided at a location of gateway, for example) which has centralized location management function as described above, the high speed and high quality handoff can be supported even for the handoff over MSRs.

Here, it is also possible to use a combination with the conventional mobile access technique such as Mobile IP for the handoff over MSRs. Namely, for the local handoff control within the MSR, the location movement management function is provided in the MSR and the communication channel switching type or re-connection type handoff control is carried out on the datalink layer level (such as ATM level), whereas the conventional re-connection type mobile access technique is used for the handoff over MSRs.

When the MSR of the present invention is combined with the existing technique in this manner, there is a demerit in that the communication will be temporarily disconnected at a time of the handoff between MSRs for a time longer than the handoff on the datalink layer level, but there is a merit that the service area can be enlarged.

Next, with reference to FIG. 39, each function block and interface between functional modules of the MSR will be described.

As shown in FIG. 39, the MSR comprises the switch unit 311 and the control unit 310, where the switch unit 311 and the control unit 310 is connected by input/output ports 51 in which the default VC and the control VC are set up.

The switch unit 311 is formed by the transfer target determining module 325 and the transfer target memory module 324. The transfer target determining module 325 has input ports 21 to 2N and output port 11 to 1N as the external connection interfaces of the MSR, while the input/output ports 51 for the control VC and the default VC and a VPI/VCI management table changing interface 31 as connection interfaces with respect to the control unit 310 of the MSR, and an internal connection interface 50 between the transfer target determining module 325 and the transfer target memory module (VPI/VCI management table) 324 within the switch unit 311. This transfer target determining module 325 has an exchange function for reading out an output port by making an access to the transfer target memory module 324 according to VPI/VCI of an ATM cell entered from some port, and outputting the ATM cell to that output port. In the case where a plurality of output ports are specified in the transfer target memory module 324, it also has a function for carrying out the multicast transfer of the ATM cell.

The transfer target memory module 324 is a table for managing correspondence among input VPI/VCI, output VPI/VCI, and output port number, which has a cut-through path set up/release function 303 and a connection interface with respect to the transfer target determining module 325, and carries out read/write of output VPI/VCI information, output port number, etc., by making access to entry according to input VPI/VCI.

Here, the ATM cell entered from the input ports 21 to 2N of the switch unit 311 is received by preliminary processing unit provided at each input port of the transfer target determining module 325, and an access to the transfer target memory module 324 is made according to VPI/VCI of the ATM cell header. Then, the ATM cell is outputted to a desired output port by a switch inside the transfer target determining module 325 according to the output port number described in an accessed entry. At this point, when the entered ATM cell is a control information, it is outputted to the input/output ports 51, whereas when it is a user information, it is outputted to the output ports 11 to 1N.

Also, the ATM cell entered from the input/output ports 51 is similarly received by the preliminary processing unit provided at each input/output port, and outputted to a desired output port by the switch inside the transfer target determining module 325 according to the output port number described in an entry accessed by referring to the transfer target memory module 324.

The control unit 310 is formed at least by the location management function 301, the network layer address allocation function 302, the cut-through path set up/release function 303 and the IP forwarding function 300.

The IP forwarding function 300 is a functional block for carrying out the IP packet processing as carried out by the usual router device, which analyzes the IP packet and executes either one of the following two operations.

(1) If the IP packet is destined to this MSR, the packet is given to the network layer address allocation function 302, the location management function 301 and the cut-through path set up/release function 303 through interfaces 41, 42 and 43, respectively.

(2) If the IP packet is not destined to this MSR, an output port to a router device (or a terminal) to which it should be outputted next is determined by referring to the routing table, and outputted to the default VC of the input/output port again after converting it back to the ATM cell.

Also, the network layer address allocation function 302 is formed by the address allocation change module 323 and the address allocation memory module 322. The address allocation change module 323 carries out either one of the following two operations according to a message of the IP packet received from the IP forwarding function 300.

(1) If the message is an IP address allocation request from the mobile terminal 201, an IP address is taken out from the idle IP address management queue according to this IP address allocation request, and then an access to the address allocation memory module 322 is made according to the taken out IP address and the terminal ID is stored into the accessed entry. Then, an address allocation response message containing the taken out IP address is converted into an IP packet and outputted to the IP forwarding function 300.

(2) If the message is an IP address release request from the mobile terminal 201, an access to the address allocation memory module 322 is made according to that IP address and the terminal ID described therein is deleted, while that IP address is stored into the idle IP address management queue. Then, an IP address release response message is converted into an IP packet and outputted to the IP forwarding function 300.

Note that the general description has been given here but it is also possible to use the DHCP function for this IP address allocation.

The cut-through path set up/release function 303 is connected with the transfer target memory module 324, the location management function 301, the transfer target determining module 325 (and/or the IP forwarding function 300) through signal lines 31, 36, 34 (and/or 43), respectively.

The cut-through path set up/release function 303 makes an access to the transfer target memory module 324 through a signal line 31, and switches the transfer target determining module (switch) routing path by carrying out read/write of the output port value corresponding to VPI/VCI. This path setting switching operation is carried out as the cut-through path set up/release function 303 receives a switching trigger signal from the location management function 301 requesting the switching of (point-to-point connection→multicast connection) or (multicast connection→point-to-point connection).

Also, the IP packet entered from the input/output port 51 (default VC) and processed by the IP forwarding function 300 is analyzed, and when a switching trigger for the cut-through path setting occurs, the switching from the VC setting for passing through the IP forwarding function 300 to the VC setting for by-passing to the transfer target determining module 325 is made.

Also, when the switching trigger for release occurs, the VC release is carried out. The VC release is carried out either according to the timer or by taking the handoff as a trigger.

The location management function 301 is formed by a location update module 321 and a location information memory module 320, and carries out the exchange of information with the transfer target determining module 325, the cut-through path set up/release function 303 and the IP forwarding function 300 through signal lines 32, 36 and 42, respectively. The location update module 321 analyzes the IP packet or the ATM cell received from the IP forwarding function 300 or the transfer target determining unit 325, and upon receiving a location registration message, updates the content (a set of a part or a whole of terminal ID, radio base station ID, IP address, VPI/VCI, output IF number, physical address, etc.) of the location information memory module 320 and sends a response to the mobile terminal 201 through the control VC.

Also, when there is a call termination request with respect to the mobile terminal 201, the access to the location information memory module 320 is made and when the registered entry is found, a message containing the terminal ID of the mobile terminal 201 is notifies to the radio base station, and the paging is carried out by using PCH. If no registered entry is found, it implies that the mobile terminal does not exist within the MSR, so that the paging is not carried out.

The location information memory module 320 stores a set of (a part or a whole of terminal ID, radio base station ID, IP address, VPI/VCI, output IF number, physical address, etc.), where the entry content is written by being accessed from the location update module 321. The entry updating is carried out at times of the location registration, the handoff control, the address allocation/release, etc.

At a time of the location registration, at least the terminal ID (and may be also the radio base station ID) is registered, and the registration/updating of the correspondence among (a part or a whole of a set of terminal ID, radio base station ID, IP address, VPI/VCI, output IF number, physical address, etc.).

At a time of handoff control and at a time of address allocation/release, the registration/updating of the correspondence among (a part or a whole of a set of terminal ID, radio base station ID, IP address, VPI/VCI, output IF number, physical address, etc.) is carried out.

For example, this updating operation is done by a configuration of the location information memory module as shown in FIG. 32. Namely, according to the terminal ID information contained within the handoff request message from the mobile terminal, the corresponding IP address=Y is figured out, and according to the visited site base station ID=(2), the output IF number=4 corresponding to that base station is figured out. Then, the VPI/VCI value is obtained from the idle VPI/VCI management queue (for #4) provided for each IF number according to the figured out output IF number #4, and the updating of the IF number of the location information memory module (ARP table)=3→4 and VPI/VCI=a→b is carried out.

Also, as shown in FIG. 32, when the ARP table is formed by terminal ID, IF number (base station ID) and VPI/VCI, upon receiving the handoff request message, the IF number is changed by using the terminal ID contained within the handoff request message as a key, while VPI/VCI=b is obtained from the idle VPI/VCI management queue (#4) corresponding to the received IF number (base station ID) and the change of VPI/VCI=a→b is made.

Also, the location management function 301 and the network layer address allocation function 302 may be placed on the upper layer of the IP forwarding function 300, or on the upper layer of the AAL layer. (It is also possible to place them on the lower layer of or the same layer as the IP forwarding function 300.)

Also, FIG. 40 shows a configuration of the transfer target memory module 324. As shown in FIG. 40, the transfer target memory module 324 has an entry of information such as media type, etc. By switching the transfer method according to the media type on a basis of a transfer target change module provided within the cut-through path set up/release function 303, there is a merit in that it is possible to realize the path switching according to the requested quality of the communication.

Also, when the preliminary processing unit of the switch unit refers to the transfer target memory module 324 and transfers the service quality Information of this media attribute information, etc. in addition to the routing information, etc., to the transfer target determining module 325, it can be used for the priority control within the transfer target determining module 325.

Next, with reference to FIG. 41, the radio base station will be described in detail.

Figure 41:
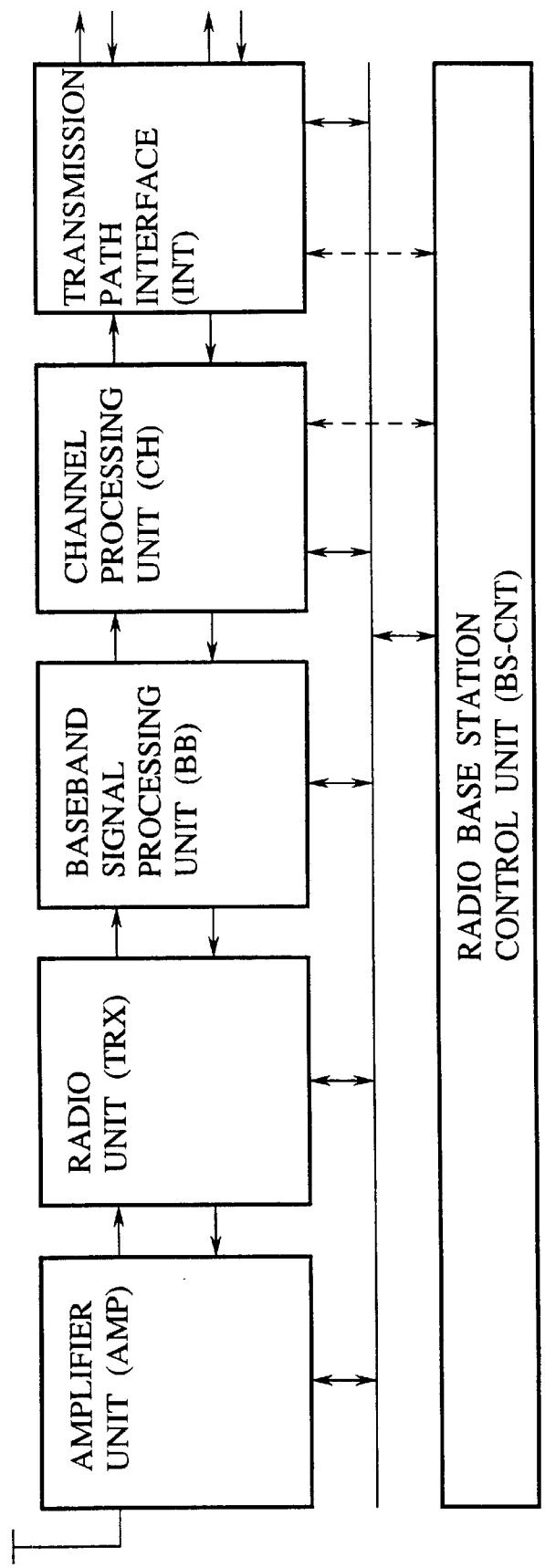
FIG. 41 is a block diagram showing an exemplary configuration of a radio base station in the mobile communication system of FIG. 5.

FIG. 41 shows a configuration of each one of the radio base stations 202, 203, 210 and 211. The radio base station shown in FIG. 41 comprises an amplifier unit (for transmission and reception), a radio unit, a baseband signal processing unit, a channel processing unit, a transmission path interface, and a radio base station control unit.

Figure 42:
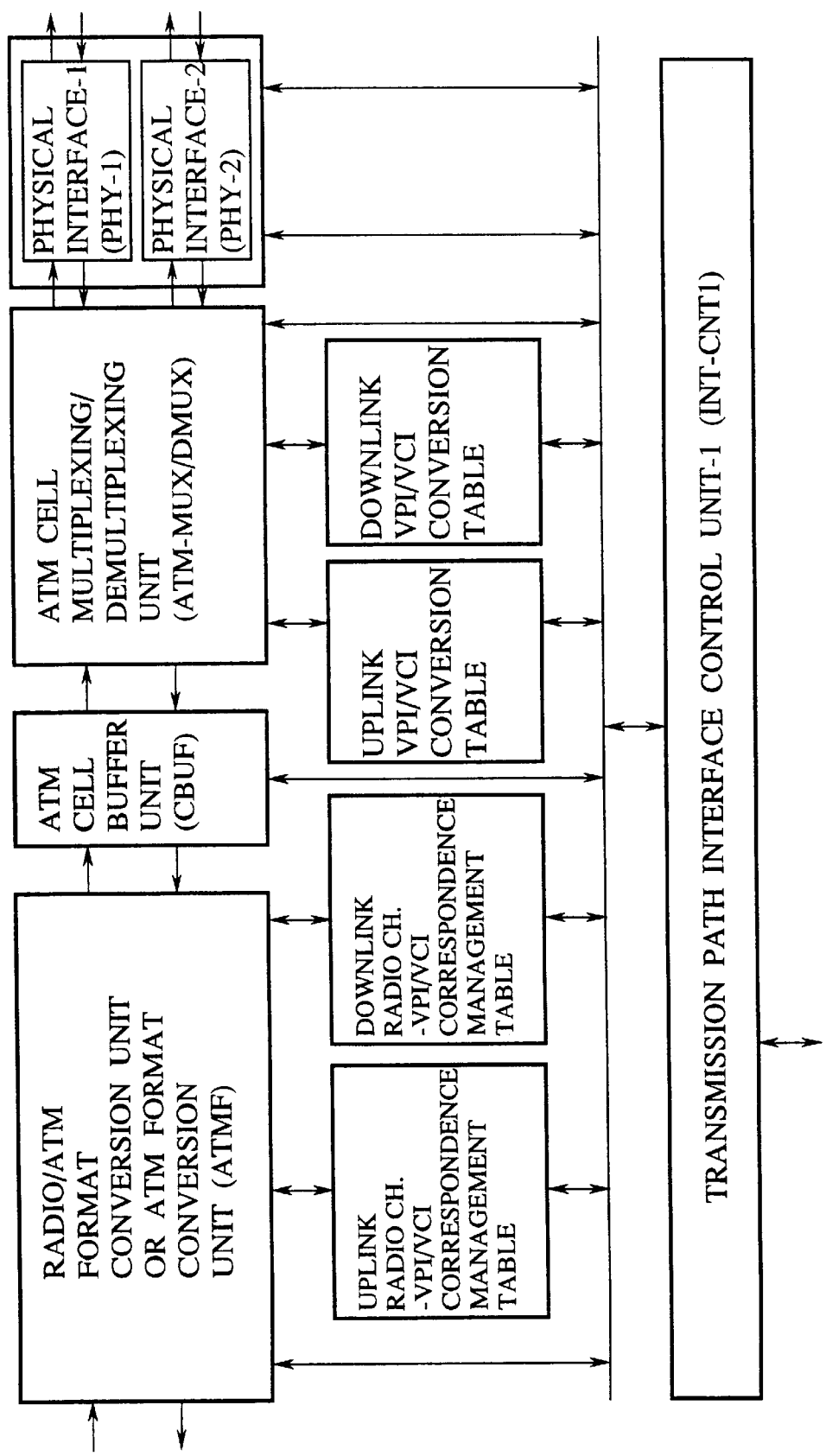
FIG. 42 is a block diagram showing one exemplary internal configuration of a transmission path interface in the radio base station of FIG. 41.
Figure 43:
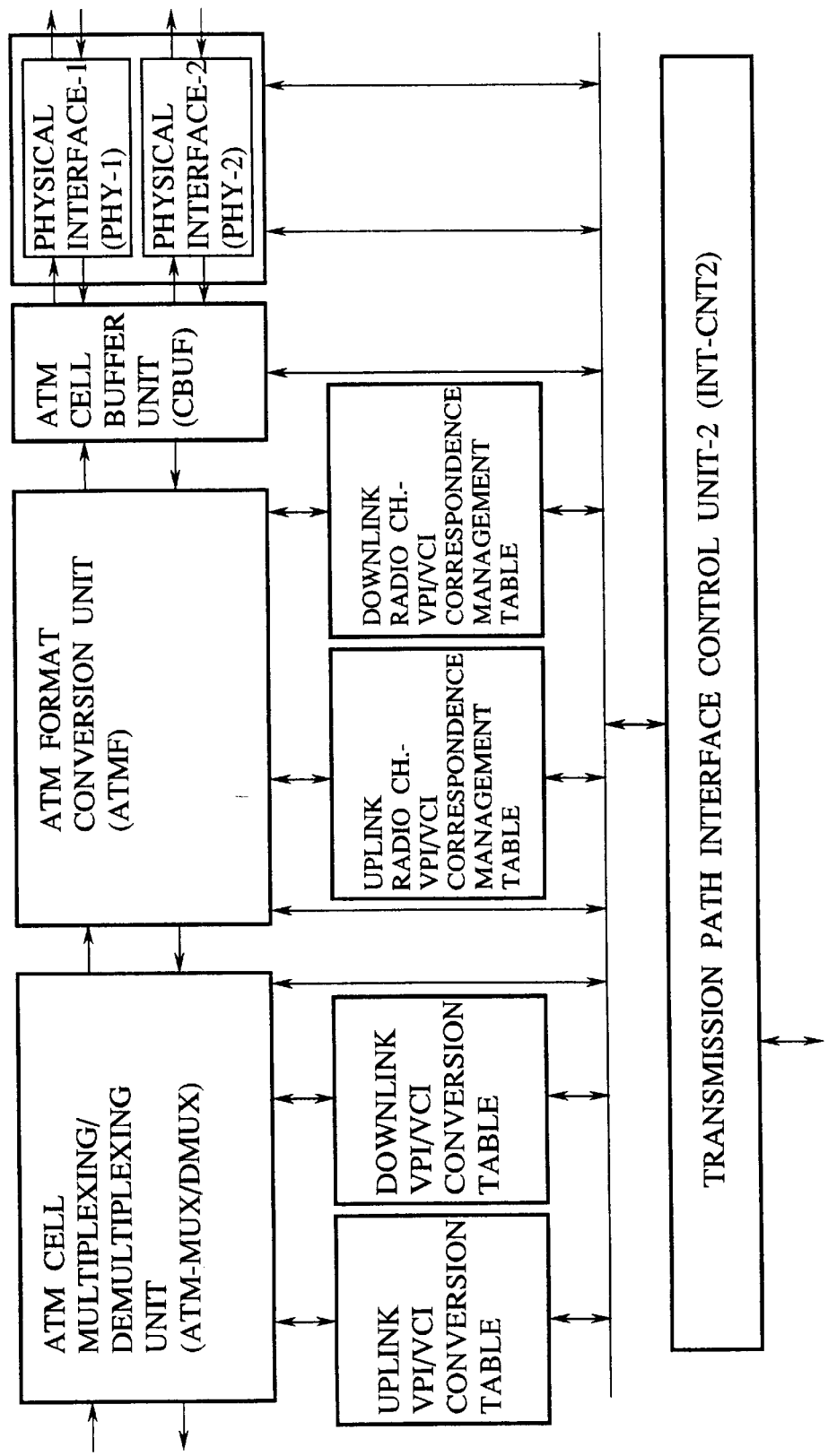
FIG. 43 is a block diagram showing another exemplary internal configuration of a transmission path interface in the radio base station of FIG. 41.
Figure 44:
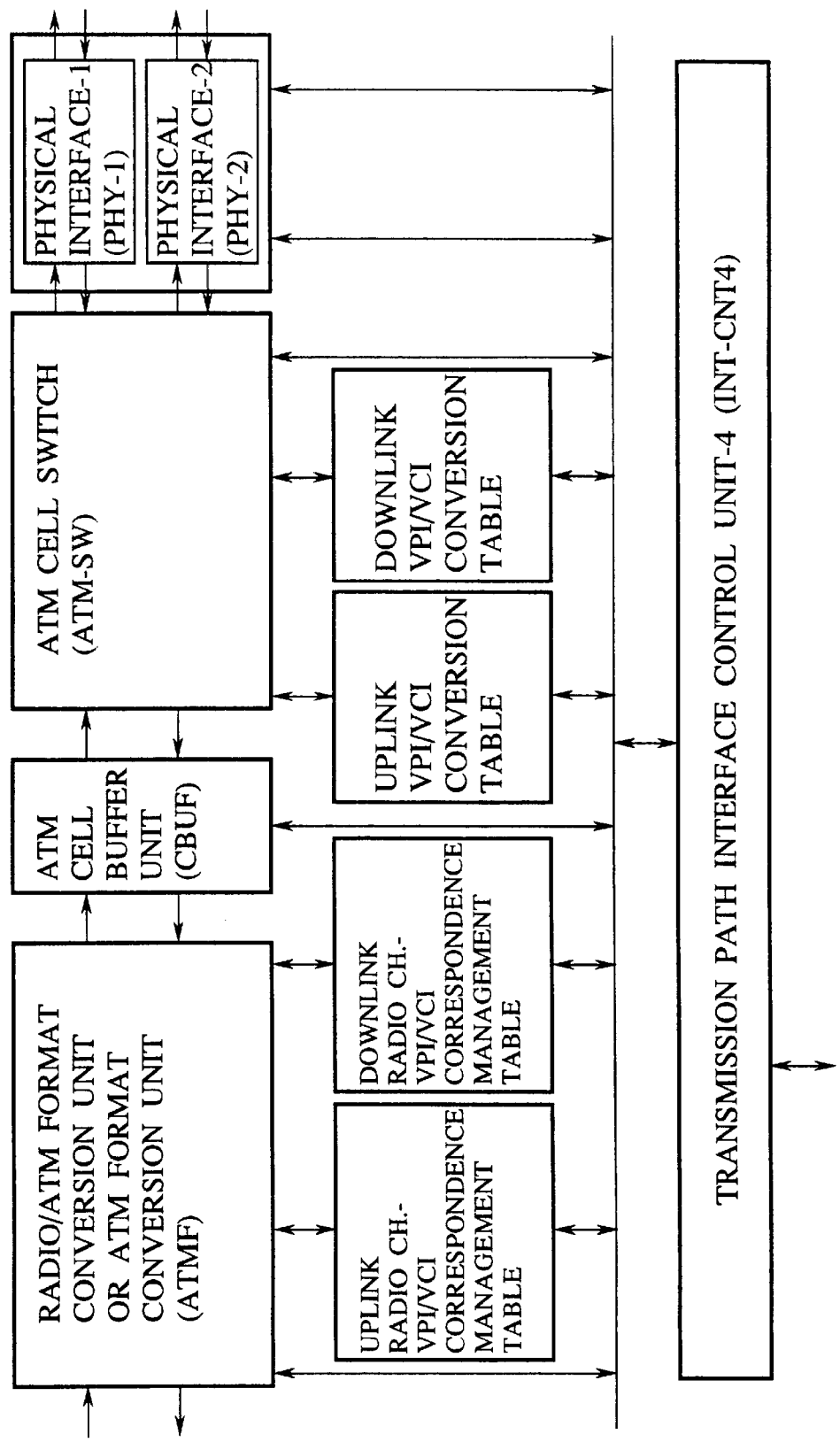
FIG. 44 is a block diagram showing still another exemplary internal configuration of a transmission path interface in the radio base station of FIG. 41.

Also. FIG. 42 to FIG. 44 show exemplary internal configurations of the transmission interface that has a unit for multiplexing/demultiplexing CO type communication and CL type communication, VPI/VCI conversion tables, VPI/VCI management tables (tables for managing correspondence between radio CH and VPI/VCI), etc. In addition, FIG. 35 shows exemplary configurations of a VPI/VCI management table (radio CH-VPI/VCI correspondence management table).

As shown in FIG. 35, there are various possible configurations for the VPI/VCI management table (radio CH-VPI/VCI correspondence management table), and when the allocation of the radio channel or radio VC, the PVC selection in the wire section, and the VPI/VCI allocation are carried out, the updating of the VPI/VCI management table (radio CH-VPI/VCI correspondence management table) shown in FIGS. 42 to 44 is carried out.

This updating of the radio CH-VPI/VCI correspondence management table is carried out at times of the call origination connection operation, the call termination connection operation, the handoff control operation, etc., as described above.

Also, FIG. 34 shows exemplary configurations of a VPI/VCI conversion table. Here, in the case of conversion of VPI/VCI used in the radio section and VPI/VCI used in the wire section where the connection type information is not existing in the entry of the VPI/VCI management table, the connection type information is provided in this VPI/VCI conversion table.

This is the same configuration as that of the VPI/VCI management table of the MSR described above, and the configurations of the VPI/VCI conversion table shown in FIG. 34 can be used for the VPI/VCI management table of the MSR as well.

Figure 45:
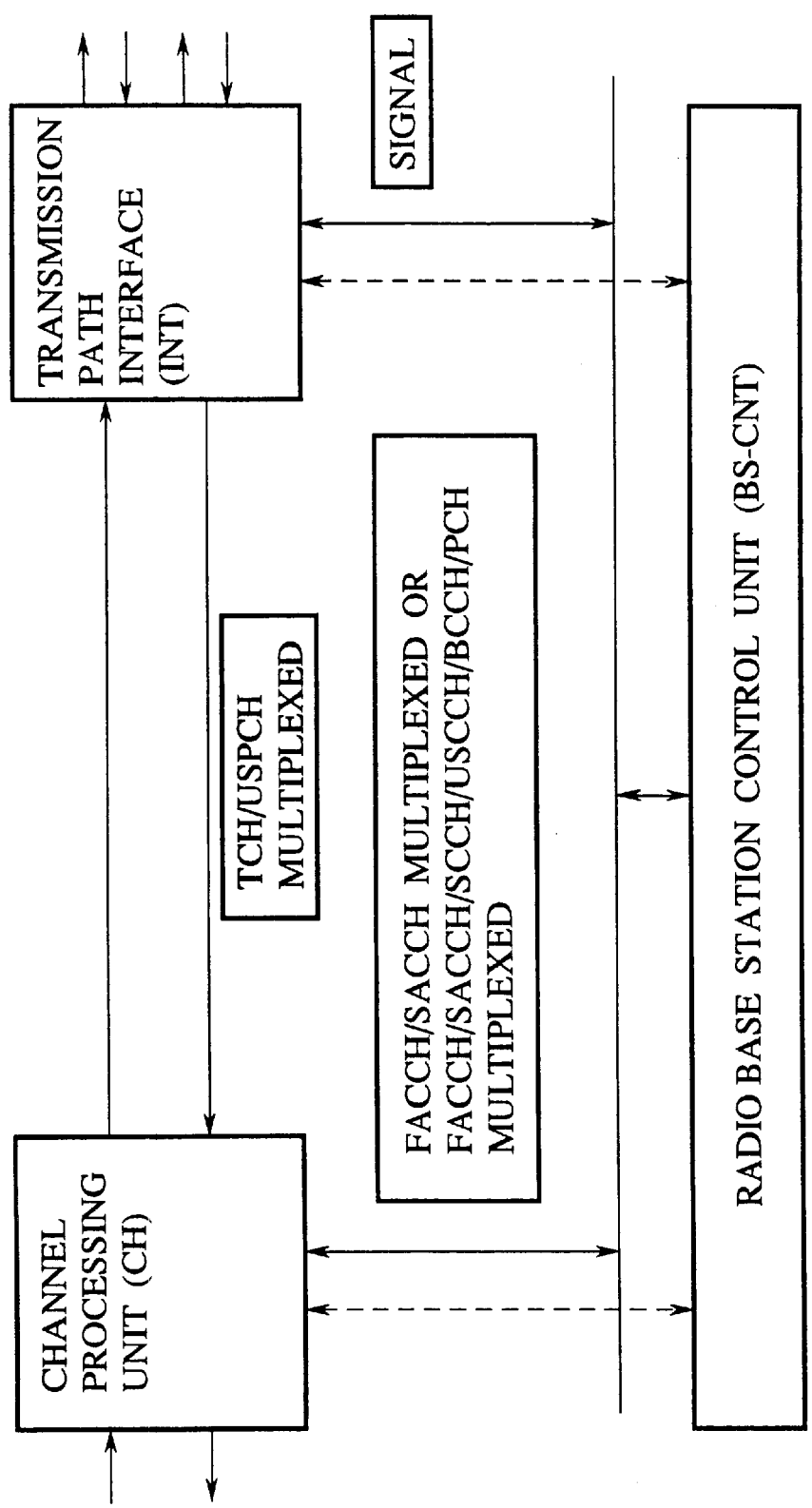
FIG. 45 is a block diagram showing an exemplary interface configuration among a channel processing unit, a transmission path interface, and a radio base station control unit in the radio base station of FIG. 41.

In addition, the interface among the radio base station control unit, the channel processing unit, and the transmission interface has a configuration as shown in FIG. 45. Namely, at the channel processing unit (CH), the logical channel information as defined in FIG. 6 is separated into the control channel information to be transferred to the radio base station control unit (BS-CNT) and the user information to be transferred to the transmission interface (INT), and the above described channel information is multiplexed according to the need in the case of receiving information from the network side.

Next, how the logical functions are mapped to physical structure elements of the communication system shown in FIG. 5 and the moving over the MSRs (moving over subnets in the case where the MSR constitutes a single subnet) will be described. Here, the mobility support in the case of moving over subnets and the system operation in the case of an access to the private IP network or an access to the global IP network will be mainly described for exemplary functional arrangements shown in FIG. 46 to FIG. 50.

Figure 46:
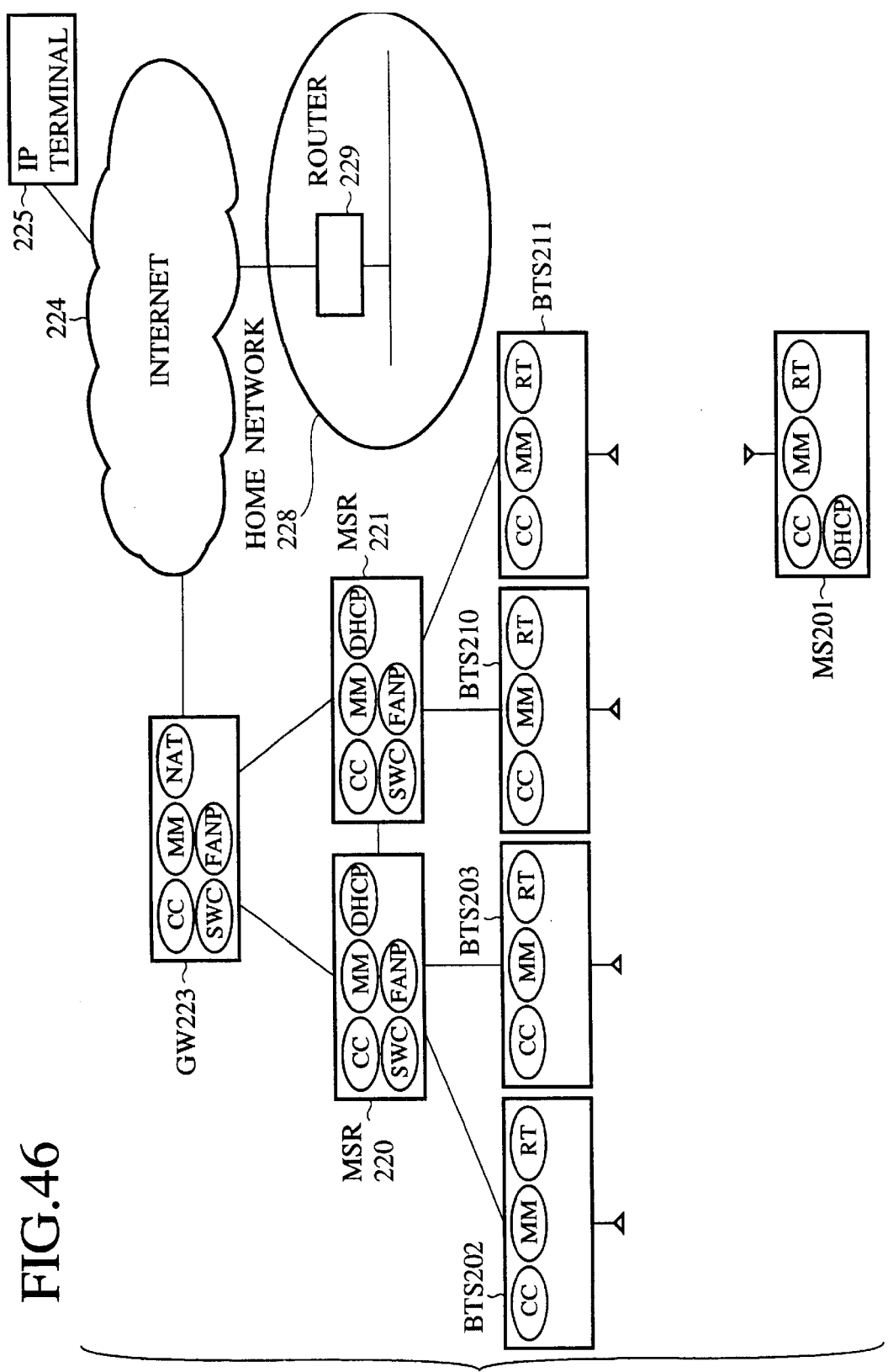
FIG. 46 is a diagram showing one exemplary functional arrangement that can be used in the mobile communication system of FIG. 5.

The functional arrangement of FIG. 46 comprises the mobile terminal 201, the radio base stations 202, 203, 210 and 211, the MSRs 220 and 221, the gateway 223, Internet 224, and a router 229 of the home network 228. The mobile terminal 201 has the location movement management (MM1 or MM2) function, the network layer address allocation/release (such as DHCP client) function, the call control (CC) function, and the radio management (RT) function, without having any function related to the Mobile IP. Each of the radio base stations 202, 203, 210 and 211 has the location movement management (MM) function, the call control (CC) function, and the radio management (RT) function at least. The MSR has the location movement management (MM) function, the network layer address allocation/release (such as DHCP server) function, the call control (CC) function, the switch control (SWC) function, and the cut-through path set up/release (such as FANP) function, without having any function related to the Mobile IP.

Here, the DHCP server described above carries out the message exchange with the DHCP client, so as to carry out the private IP address allocation.

Also, the gateway 223 has the address conversion (NAT) function, the location movement management (MM) function, the call control (CC) function, the switch control (SWC) function, and the cut-through path set up/release (such as FANP) function at least.

The private IP network is provided between the gateway 223 and the MSRs 220 and 221 described above, and the routing by the exchange at the datalink layer level is to be carried out between the MSR 220 and the radio base stations 202 and 203, between the MSR 221 and the radio base stations 210 and 211, and between the radio base stations 202, 203, 210 and 211 and the mobile terminal 201. Each of the MSRs 220 and 221 shown in FIG. 46 constitutes a single subnet, and has a configuration using the DHCP server function for the private network, while the gateway has the address conversion function (NAT) so that the DHCP function and the NAT function are provided at separate locations.

In the case of FIG. 46, when the mobile terminal 201 makes an access to the server and the like within the private IP network, the private IP address is temporarily allocated by the DHCP server function provided at the MSR 221, and the service is provided by making an access to the WWW server or the mail server within the private IP network by using this allocated private IP address. At this point, the IP addresses of the various servers such as the WWW server and the mail server and the default VC (PVC) value may be contained as a part of the broadcast channel information that is periodically transmitted from the radio base station, or may be obtained by the service resolution protocol for resolving the location of the server, etc.

Here, the service resolution protocol is a protocol for resolving the IP address of the server which can realize the service content, where the resolution can be realized by returning a service resolution response IP packet in response to the transmission of a service resolution request IP packet containing the service ID (server ID). (Here it is not absolutely necessary for the service resolution request and response messages to be IP packets).

At the time of service access, either one of the following two methods will be used.

(1) A method for transmitting IP packets by utilizing the default VC (PVC) network.

(2) A method for transmitting IP packets by setting up a dedicated VC (SVC) (carrying out the connection set up).

As a method for carrying out the connection set up, the connection set up may be carried out for either one or both of the connection between the mobile terminal and the MSR and the connection between the MSR and the server (or the other MSR).

Also, when the mobile terminal 201 moves over subnets during the access to the server within the private IP network, either one of the following two methods will be used.

(1) A method for carrying out the IP address re-allocation.

(2) A method for maintaining the initially allocated IP address.

The method (1) for carrying out the IP address re-allocation is a method in which the session to the WWW server is set up again automatically when the IP address is obtained again after the moving (a method in which the access is made again).

The method (2) for maintaining the initially allocated IP address has a merit in that the session is maintained even through it is disconnected once at the datalink layer level. This corresponds to a state in which the subnet is virtually extended, where a new call termination during the communication is handled in such a manner that the call termination to the subnet at which the IP address is initially obtained is made first, and then the call termination is subsequently made through the connection route which is connected at the datalink level. In the Mobile IP like expression, the place where the IP address is obtained initially becomes the home network, and thereafter the VPI/VCI connection is extended in conjunction with the moving as the connection set up between the MSRs of the originally located site and the visited site is carried out at the visited site in conjunction with the moving over the MSRs.

In this case, it is preferable to also count the number of moving hops between the MSRs, and to set up a connection with respect to the home MSR again so as to optimize the route when the counted hop number becomes greater than a certain value.

Namely, when the moving over subnets is made, the connection is set up from the visited site MSR with respect to the originally located site MSR by exchanging moving information between the MSRs, so as to realize the routing that appears to extend the subnet as described above. This is the operation to be carried out in order to secure the call termination route for the mobile terminal.

In this case, it suffices for the mobile terminal itself to carry out the operation to notify the ID of the originally located site MSR or the connection set up address such as ATM address to the visited site MSR.

Next, with reference to FIG. 48, the handoff control operation in the case of moving over MSRs will be described.

Figure 48:
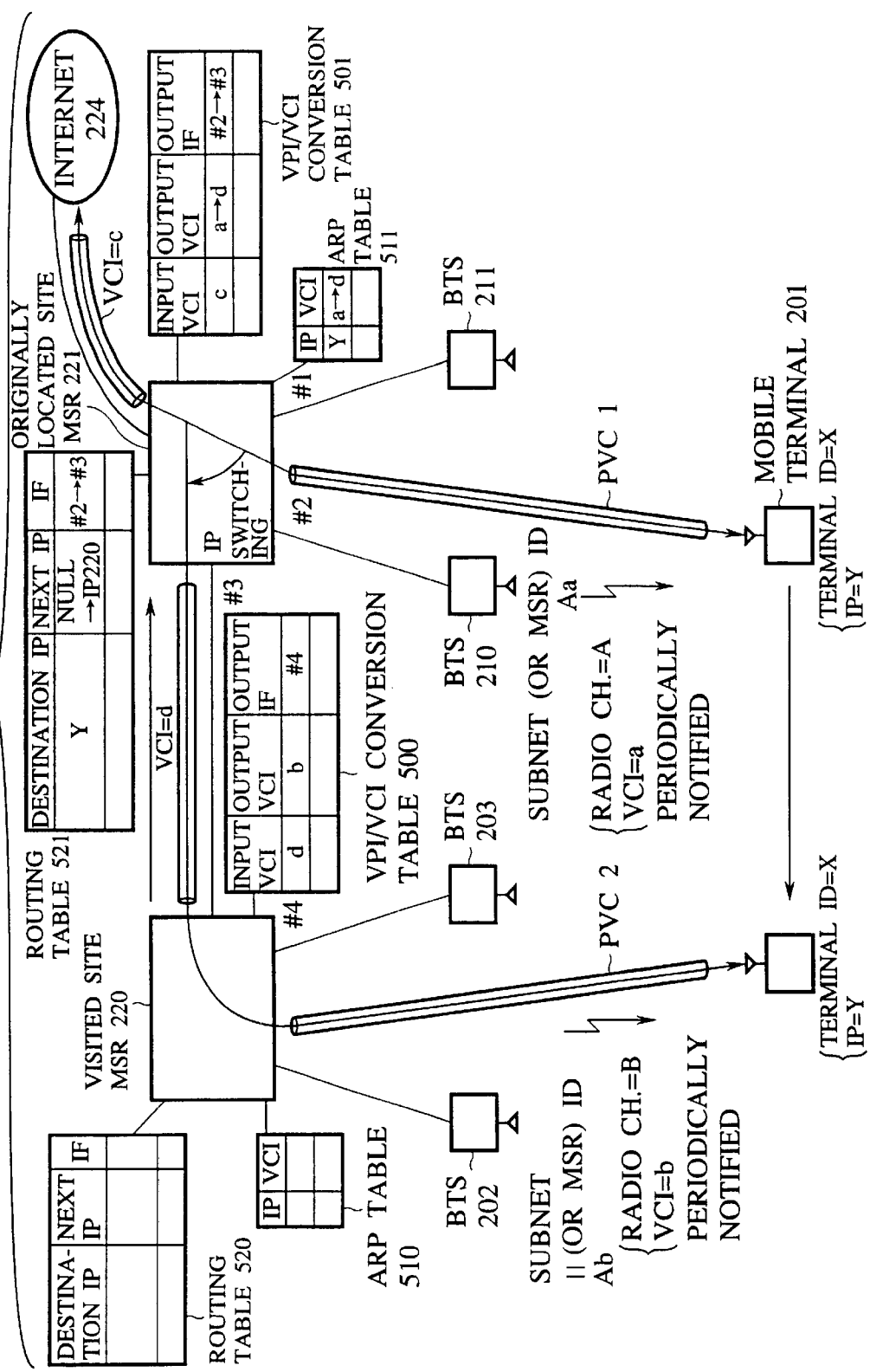
FIG. 48 is a diagram showing another exemplary handoff control operation in the case of moving over router devices in the mobile communication system of FIG. 5.

The radio communication system shown in FIG. 48 comprises the MSRs 220 and 221, the radio base stations 202, 203, 210 and 211, and the mobile terminal 201, where the MSR 221 has a routing table for managing a correspondence among destination IP, next IP and IF number, and an ARP table for managing a correspondence between IP address and VPI/VCI, as well as a VPI/VCI conversion table, and each of the radio base station 202, 203, 210 and 211 has a VPI/VCI-radio channel management table.

Also, in the radio communication system of FIG. 48, at least a default VC (PVC) which is a VC to be utilized as a shared channel that is set up in advance is defined between the MSR and the radio base station, and at least a pre-assigned radio channel (PVC) which is a radio channel that is set up in advance is defined between the radio base station and the mobile terminal. In addition, the control channel B as defined above and the communication channel are set up in advance in the manner of (configuration 4) of FIG. 7, and it is assumed that at least the base station ID (IF number), a PVC of the control channel B {a set of (radio CH, VPI/VCI)}, a PVC of the communication channel {a set of (radio CH, VPI/VCI)}, and a subnet (MSR) ID are notified from each radio base station.

Now, for the case in which the mobile terminal 201 moves from the radio base station 210 to the radio base station 203, the procedure for switching from a state in which the IP packet communication with Internet 224 is carried out by using PVC1 to a state in which the IP packet communication with Internet 224 is to be carried out by using PVC2 will be described.

First, the mobile terminal 201 detects the moving over subnets from the radio base station 210 to the radio base station 203 by the fact that the base station ID that is periodically notified from the radio base station has changed, and that the subnet ID (MSR ID) has changed. Then, the mobile terminal 201 notifies a handoff request message containing the IP address=Y of the mobile terminal 201, VPI/VCI-b of PVC2, the subnet ID=Aa of the originally located site MSR (and the base station ID=#4 if necessary) to the MSR 220, using the control channel B of the radio base station 203 which is the radio base station used after the moving.

Upon receiving this handoff request message, the MSR 220 updates the connection management table (ARP table) shown in FIG. 48 according to the IP address=Y and VPI/VCI=b contained within this handoff request message. Also, the MSR 220 sets up VCI=d by carrying out the connection set up of the PVC selection with respect to the originally located site MSR 221, and transmits a routing change request message containing at least the IP address=Y of the mobile terminal 201 and VPI/VCI=d to the MSR 221. In addition, the MSR 220 sets up VCI=b and the output IF number=#4 contained within the handoff request message into the entry of input VCI=d that is selected or set up above in the VPI/VCI conversion table.

Upon receiving the routing change request message, the MSR 221 updates the ARP table 511 by changing VPI/VCI=a d according to the IP address=Y of the mobile terminal 201 and VCI=d that is set up between the MSRs as contained within the routing change request message.

This completes the handoff control operation, so that the IP packet communication between Internet 224 and the mobile terminal 201 is switched from a communication using PVC1 to a communication using PVC2 and VCI=d.

In addition, it is also possible to transmit a routing change response message (which contains information contained in the routing change request message such as the IP address=Y of the mobile terminal 201 and VPI/VCI=d) as a response message to the routing change request message from the MSR 221 to the MSR 220, so as to indicate the completion of the routing change explicitly.

In addition, in the case where the MSR 220 explicitly notifies the handoff completion to the mobile terminal 201 and the mobile terminal 201 carries out the switching to the restart of the IP packet transmission from the mobile terminal 201 to Internet 224 by using this handoff completion (handoff request response) message as a trigger, the MSR 220 may transmit a handoff completion message (which contains information contained in the handoff request message such as the IP address=Y, the base station ID=#2, and VPI/VCI=b) to the mobile terminal 201, using the control channel B. Here, the MSR 220 may transmit the handoff completion (request response) message to the mobile terminal after receiving the routing change response message.

Also, when the handoff request message and the routing change request message contain the connection set up address of the visited site MSR 220 or the connection set up address (telephone number, ATM address, etc.) of the mobile terminal 201, it is also possible to carry out the updating of the VPI/VCI conversion table 501 and the updating of the ARP table 511 by the method for setting up a connection from the originally located site MSR to the mobile terminal 201. It is also possible to carry out the updating of the VPI/VCI conversion table 501 and the ARP table 511 by the method for setting up a connection from the mobile terminal 201 to the originally located site MSR and then notifying a handoff request containing the IP address=Y of the mobile terminal 201 to the originally located site MSR.

In the following, the scheme described above will be referred to as a virtual subnet scheme. This scheme is based on the fact that, by the exchange of the routing change messages between the MSRs, the datalink level connection is extended in the state of maintaining the IP address of the area at which the IP address is initially obtained even in the case of moving over subnets, so that it is possible to process as if the subnet is extended.

As described above, the access to the server within the private IP network can be realized by the following two methods.

(1) A method for transmitting IP packets by utilizing the default VC (PVC) network.

(2) A method for transmitting IP packets by setting up a dedicated VC (SVC) (carrying out the connection set up).

Also, the case in which the mobile terminal 201 moves over subnets during the access to the server within the private IP network can be realized by the following two methods.

(1) A method for carrying out the IP address re-allocation.

(2) A method for maintaining the initially allocated IP address.

By combining these methods, it becomes possible to make an access to the server even when the mobile terminal moves over subnets.

In the case of FIG. 46, when the mobile terminal 201 makes an access to the mobile terminal (not shown) within the other private IP network (not shown), if that mobile terminal (not shown) exists within the MSR 221, it is possible to carry out the communication by calling that mobile terminal and call terminating by the location movement management (MM) function of the MSR. In contrast, when the mobile terminal (not shown) exists at a location over subnets, the MSR 221 cannot call that mobile terminal. In such a case, there is a need to provide a function for resolving the location/address of the mobile terminal indicating in which MSR the mobile terminal is existing.

Next, the operation procedure in the case where the mobile terminal 201 carries out the communication with the mobile terminal within the same subnet will be described. As described below, the operation procedure can use a method for utilizing the default VC network and a method for utilizing the dedicated VC network, and it is preferable to change which one of these methods is to be selected according to the application. The former method can be applied to the UBR and ABR services of the ATM, while the latter method can be applied to the CBR, VBR and ABR services of the ATM.

As an example, the case of resolving address by a method in which the default VC (PVC) network is utilized and the conventional RARP framework is partially expanded will be described.

(1) The call originating side mobile terminal 201 checks whether the IP address corresponding to the call terminating side terminal ID exists in the own ARP table (cache).

(2) When the IP address corresponding to the call terminating side terminal ID exists in the ARP table of the call originating side mobile terminal 201 and it is not yet in a state of IP packet communication in progress (i.e., it is in a state of not communicating), a call origination request IP packet (containing the call terminating side terminal ID, the call originating side terminal ID, and the IP address of the call originating side terminal) is transmitted to the call terminating side mobile terminal. When the IP address corresponding to the call terminating side terminal ID exists in the ARP table of the call originating side mobile terminal 201 and it is already in a state of IP packet communication in progress, the IP packet is transmitted to the call terminating side mobile terminal. When the IP address corresponding to the call terminating side terminal ID does not exist in the ARP table of the call originating side mobile terminal 201, the transition to the RARP operation of (5) described below is made.

(3) Upon receiving this call origination request IP packet, the call terminating side mobile terminal checks whether the terminal ID contained in the call origination 20 request IP packet coincides with the own terminal ID or not, and if it is destined to this mobile terminal, an ACK response IP packet is returned (it is also possible to return a NACK response IP packet when it is not destined to this mobile terminal).

(4) When this ACK response IP packet is received by the call originating side mobile terminal, the IP packet communication starts. After the IP packet communication starts, the transition to the RARP operation of (5) is made by the call originating side mobile terminal when the NACK response IP packet is received or the timer set at a time of the call origination request IP packet transmission becomes timeout.

(5) The call originating side mobile terminal executes the RARP operation so as to resolve the call terminating side IP address corresponding to the call terminating side terminal ID.

(6) The call terminating side IP address corresponding to the call terminating side terminal ID is obtained by this RARP operation, registered into the entry of the ARP cache, and its state is set to be the communication in progress state or the not communicating state, and then the operation returns to (2) described above.

Here, when the state is set to be the not communicating state here, the operation to start the IP packet transmission will not be carried out immediately in (2) described above, but it serves as a function for checking again because there is a possibility for the IP address to be changed in conjunction with the moving, after the RARP operation. In view of these factors, it is preferable to realize the IP address allocation by the DHCP server in such a manner that the IP address is allocated sequentially from an IP address for which the time of being not allocated is longer.

Here, the RARP operation can be realized by a method for using the RARP server and a method for executing the RARP operation between terminals, and either method may be used. The method for directly executing the RARP operation between terminals may be limited for the use within the same subnet, or may be allowed for the use over subnets. However, when the broadcast is utilized similarly as the conventional RARP, the conventionally noted drawback due to the waste of bandwidth caused by the broadcast will occur so that it is preferable to use the RARP server.

The RARP server function is preferably provided within the same device as the DHCP server function at which the latest information is available. For example, it is possible to provide the RARP server function and the DHCP server function in the MSR.

Also, when it becomes unavoidable to change the IP address during the communication, it is also possible to use a method in which the exchange of the registration request IP packet (which contains at least the terminal ID and the new IP address) and the registration response IP packet (which contains at least the terminal ID and the new IP address as contained in the registration request IP packet) is carried out between the mobile terminals in communication so as to confirm the change of the IP address.

Also, when it becomes unavoidable to change the IP address during the communication, it is also possible to use a method in which the communication disconnection is detected by the timeout and the like and the procedure of (1) to (6) described above is executed again.

Also, it is also possible to use a configuration in which the registration request IP packet is exchanged between the MSRs when the IP address allocation/release occurs at the DHCP server, so that each MSR can always comprehend a set of (terminal ID, IP address) in an active state. It is also possible to use a method in which (2) to (4) described above are realized without using the RARP expanded operation.

Next, an exemplary case of a method for transmitting IP packets by setting up a dedicated VC (SVC) (carrying out the connection set up) will be described.

(1) The call originating side mobile terminal 201 checks whether the connection set up address (such as ATM address) and VPI/VCI corresponding to the call terminating side terminal ID exist in the own ARP table (cache).

(2) When the connection set up address corresponding to the call terminating side terminal ID exists in the ARP table of the call originating side mobile terminal 201 and its VPI/VCI also exists, the transition to the operation of the above described method in which the default VC (PVC) network is used and the framework of the conventional RARP is partially expanded, starting from the step (1), is made. When the connection set up address corresponding to the call terminating side terminal ID exists in the ARP table of the call originating side mobile terminal 201 and its VPI/VCI does not exist, the connection is set up according to that connection set up address and VPI/VCI is registered into an entry corresponding to the call terminating side terminal ID in the ARP table, and the transition to the operation of the above described method in which the default VC (PVC) network is used and the framework of the conventional RARP is partially expanded, starting from the step (1), is made.

The connection set up at this point may be realized by the existing connection set up procedure such as Q. 2931, for example.

(3) When the connection set up address corresponding to the call terminating side terminal ID does not exist in the ARP table of the call originating side mobile terminal 201, the connection set up address resolution operation is executed and the operation returns to the above (1).

Here, the connection set up address registration/resolution function can be provided in the MSR. In such a configuration, it is possible to play a role of the location address registration function in the conventional mobile communication. This connection set up address registration/resolution function is a function for registering and resolving the terminal ID and the connection set up address at least, and may be able to register and resolve the correspondence between the terminal ID and the IP address at the same time. Here, the connection set up address comprises Network Prefix in an upper portion and the terminal ID in a lower portion.

In the above, an exemplary case of resolving the connection set up address first and then carrying out the IP address resolution operation after the connection set up has been described, but it is also possible to use a method in which the connection set up address is resolved according to the need and the connection is set up after the IP address resolution operation is executed. Also, in the case of carrying out the connection set up address registration/resolution function and the IP address registration/resolution function simultaneously, there is no need to carry out the IP address resolution operation and the connection set up address resolution operation separately.

Next, the operation procedure in the case where the mobile terminal 201 carries out the communication with the mobile terminal within the different subnet will be described. As described below, the operation procedure can use a method for utilizing the default VC network and a method for utilizing the dedicated VC network, and it is preferable to change which one of these methods is to be selected according to the application. The former method can be applied to the UBR and ABR services of the ATM, while the latter method can be applied to the CBR, VBR and ABR services of the ATM.

When the mobile terminal exists at a location over subnets, the MSR 221 cannot call that mobile terminal or make the call termination to that mobile terminal because the location movement management for that mobile terminal is not carried out and therefore the location of that mobile terminal is not comprehended. In such a case, there is a need to carry out the location/address resolution of the mobile terminal indicating in which MSR the mobile terminal is existing. As a method for this location/address resolution, the following methods are available. (1) A method for carrying out the location registration message exchange (TRAP type):

This is a method in which the location registration information is exchanged between the MSR 221 and the other MSR when there is a moving over subnets. Here, it is possible to carry out this location registration information exchange regardless of whether the communication is carried out or not, but it is preferable to use a method in which the registration is carried out by selecting only the location registration information related to the other mobile terminal with which the mobile terminal under its own location movement management is communicating, because the table size becomes large and there is a possibility for the amount of messages between the MSRs to becomes enormous. Namely, when there is a moving over subnets, the MSR notifies this moving to the other MSR.

Upon receiving the location registration message from the other MSR, the MSR recognizes whether the terminal corresponding to that message is the terminal within its own subnet and the terminal which is carrying out the communication with the server and the like or not by referring to the table, and when it is the terminal in communication, its location information is updated. Here, in conjunction with the location registration updating, if the IP address change or the connection set up address change is also made, it is possible to notify this fact to the related mobile terminal, or it is possible to carry out the conversion from the old IP address to the new IP address at the MSR. It is also possible to carry out the location registration message exchange directly between the mobile terminal in communication and the MSR. In such a case, in the Mobile IP like expression, it implies that the call originating side mobile terminal becomes HA.

(2) A method using the location/address resolution protocol (GET-SET type):

The MSR 221 checks the current location of the mobile terminal using the location address resolution protocol with respect to the other MSR. Namely, the mobile terminal 201 transmits to the MSR 221 the location/address resolution request for obtaining the IP address and/or the ATM address corresponding to the call terminating side terminal ID in order to communicate with the mobile terminal located in the other subnet.

Upon receiving this location/address resolution request, the MSR 221 checks whether the mobile terminal recognized by the terminal ID contained in that location/address resolution request exists under its own location movement management, and when the call terminating side mobile terminal exists under its own location movement management, the call termination to that call terminating side mobile terminal is executed.

When the call terminating side mobile terminal does not exist under its own location movement management and under the location movement management of which MSR this mobile terminal exists is uncertain, the server function for managing the correspondence between the terminal ID of the mobile terminal in communication and the MSR under whose location movement management this mobile terminal exists is provided at the gateway and the like, and the location of the MSR corresponding to the call terminating side ID is comprehended by making an access to that server. Then, the following operation is carried out.

Even when the call terminating side mobile terminal does not exist under its own location movement management, if the location information (the IP address or the connection set up address of the MSR in which that call terminating side mobile terminal exists) corresponding to that call terminating side terminal ID is comprehended by the exchange of the location registration information between the MSRs or by the access to the above described server, that MSR is called and the call termination connection is requested, while the resolution of the IP address or the connection set up address corresponding to the call terminating side terminal ID is also requested.

Even when the call terminating side mobile terminal does not exist under its own location movement management, if the location information (the IP address or the connection set up address of that call terminating side mobile terminal) corresponding to that call terminating side terminal ID is comprehended by the exchange of the location registration information between the MSRs or by the access to the above described server, that call terminating side mobile terminal is directly called and the call termination connection operation is carried out.

Here, in the above described algorithm, the case of carrying out the call termination connection operation has been described, but it is also possible to use a method in which only the location check operation is carried out here, and the subsequently call termination connection is carried out by the address resolution method in which the default VC (PVC) network is used and the framework of the conventional RARP is partially expanded as described above.

Also, when it does not exists under the location movement management, it is possible to inquire the other MSR 221 to obtain the IP address or the connection set up address of the desired mobile terminal and register it into a correspondence table for the terminal ID and the IP address or the connection set up address of the call terminating side mobile terminal, with respect to the MSR 220 in which that terminal exists.

Similarly, when the mobile terminal 201 makes an access to the server and the like within Internet 224 (the global IP network), the private IP address is temporarily allocated by the DHCP server function provided at the MSR 221, and the service is provided by making an access to the gateway using this allocated private IP address, converting this private IP address into the global IP address by the address conversion (NAT) function of the gateway, and making an access to the WWW server and the like within the global IP network using this converted global IP address.

In this case, when a unit of the DHCP allocation/release and a unit of the address conversion by the NAT are different and the mobile terminal 201 moves from the area of the MSR 221 to the area of the MSR 220, there is a need to change the correspondence between the private IP address and the global IP address in the NAT table in conjunction with that moving.

Also, when the private IP address is released in conjunction with the moving of the mobile terminal 201, there is a need to cancel that private IP address in the NAT table by notifying either the timer or the fact that the IP address is released to the device that has the NAT function. In addition, when the private IP address is allocated in conjunction with the moving of the mobile terminal 201, there is a need to register that private IP address in the NAT table by notifying the fact that IP address is allocated to the device that has the NAT function.

Similarly, for the connection set up between the mobile terminal 201 and the MSR 220 or 221, in conjunction with the moving of the mobile terminal, there is also a need to release the connection set up between the mobile terminal 201 and the MSR 220 at which the mobile terminal 201 is located before the moving and set up a connection to the MSR 221 at which the mobile terminal 201 is located after the moving.

When the area in which the NAT function is provided and the area in which the DHCP function is provided coincides, the above described operation to update the NAT table in conjunction with the moving becomes unnecessary within the area in which the NAT function is provided, it is only necessary to carry out the registration/cancallation operation in conjunction with the moving into/out of the NAT provided area.

If the DHCP server provided in the MSR 221 has a function for temporarily allocating the global IP address, it is also possible to make an access to the server within Internet 224 without carrying out the NAT conversion at the gateway 223.

Besides that, if the DHCP server function for carrying out the IP address allocation/release is provided in the gateway 223, it is possible for the mobile terminal 201 to carry out the connection set up with respect to the gateway 223 so that the private IP address is temporarily issued and converted into the global IP address by the address conversion (NAT, etc.) function of the gateway 223 and an access to the server within Internet 224 can be made by using this converted global IP address. In this case, the NAT table carries out the registration/cancellation in conjunction with the moving into/out of the NAT provided area.

Also, in the configuration in which the DHCP server function for carrying out the IP address allocation/release is provided in the gateway 223, when the mobile terminal obtains the global IP address as the IP address to be allocated temporarily after carrying out the connection set up with respect to the gateway 223, it is possible to make an access to the server within Internet 224 directly without carrying out the conversion by the address conversion (NAT, etc.) function at the gateway 223.

Note that the method of connection set up described above may be carried out by using the fixed dial number, the mobile dial number, or the different number system such as ATM address. In addition, the connection can be made by using things like a name address or the Personal ID number. It is also possible to allocate the connection that is set up in advance by making selection. In the above described example, the datalink layer level exchange is carried out by the ATM but the present invention is not limited to the case of using the ATM alone.

Here, when the access to the global IP network is made and the mobile terminal within the private IP network moves over subnets, it is possible to carry out the communication without influencing the server and the like within the global IP network at all by carrying out the location registration of the mobile terminal at the gateway.

Figure 52A:
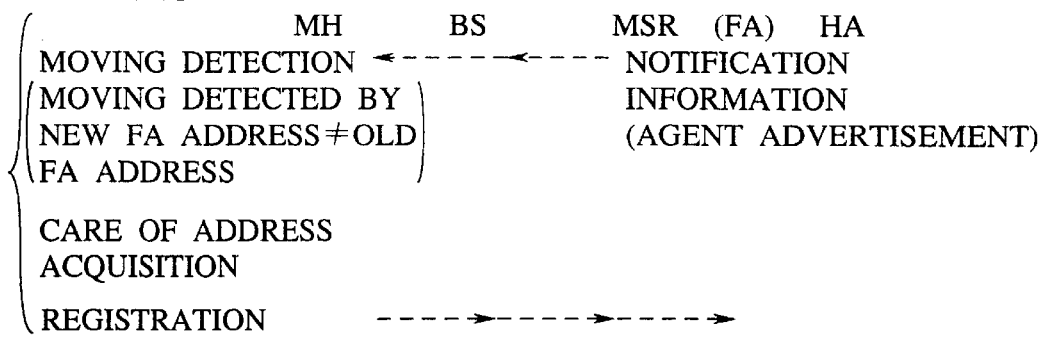
FIGS. 52A to 52H are sequence charts showing exemplary procedures for moving detection and Mobile IP information exchange that can be used in the mobile communication system of FIG. 5.
Figure 52B:
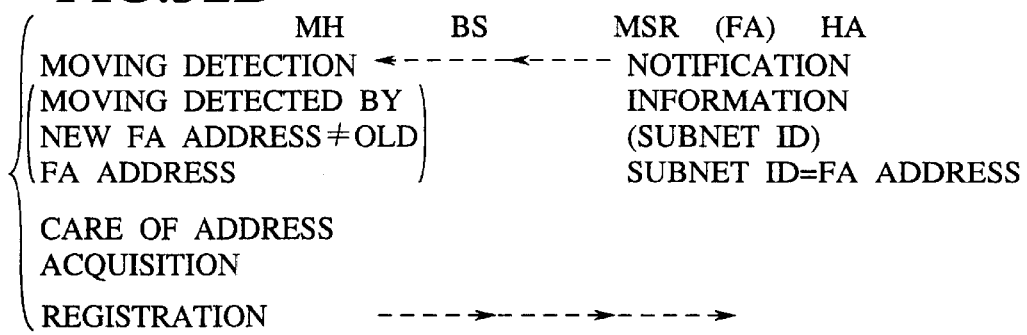
Figure 52C:
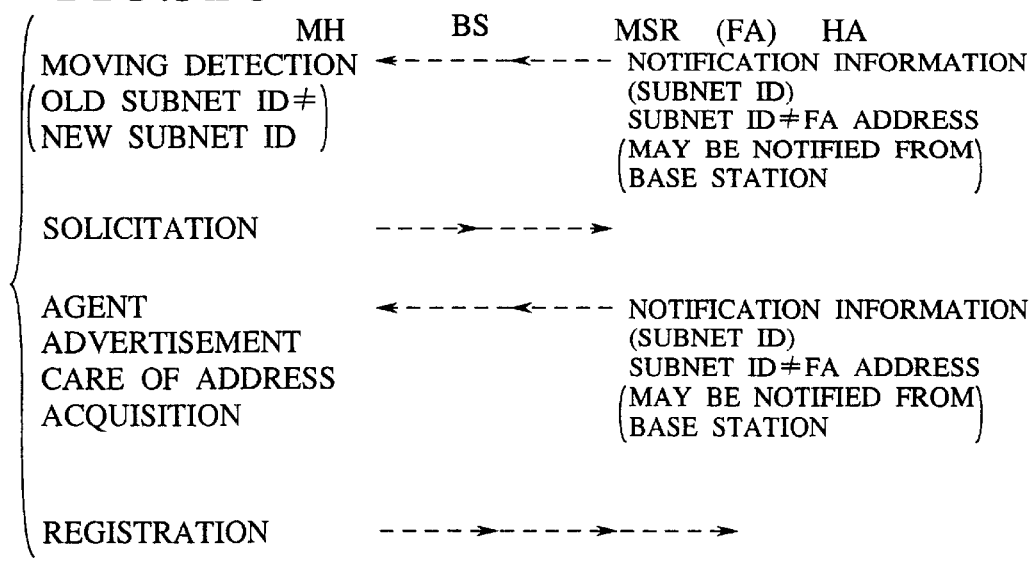
Figure 52D:
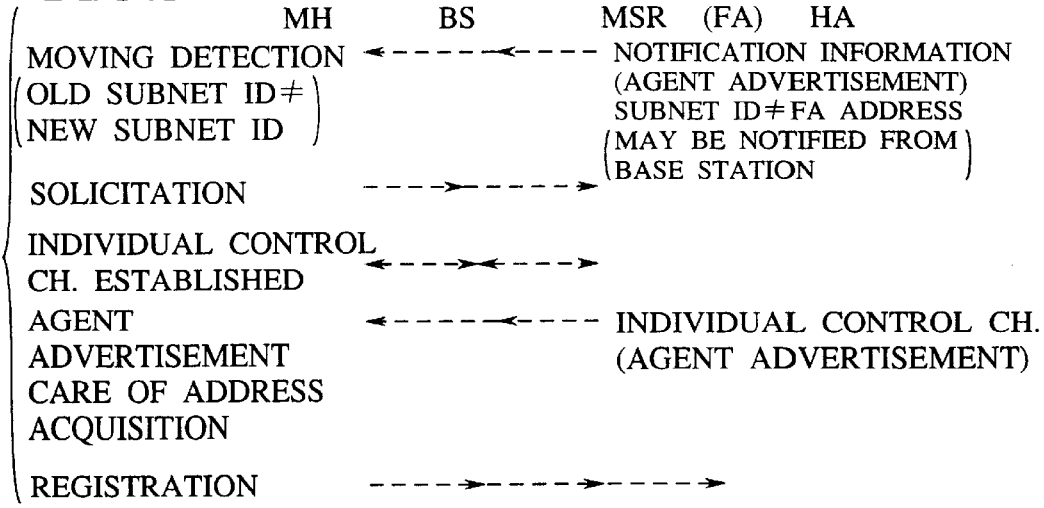
Figure 52E:
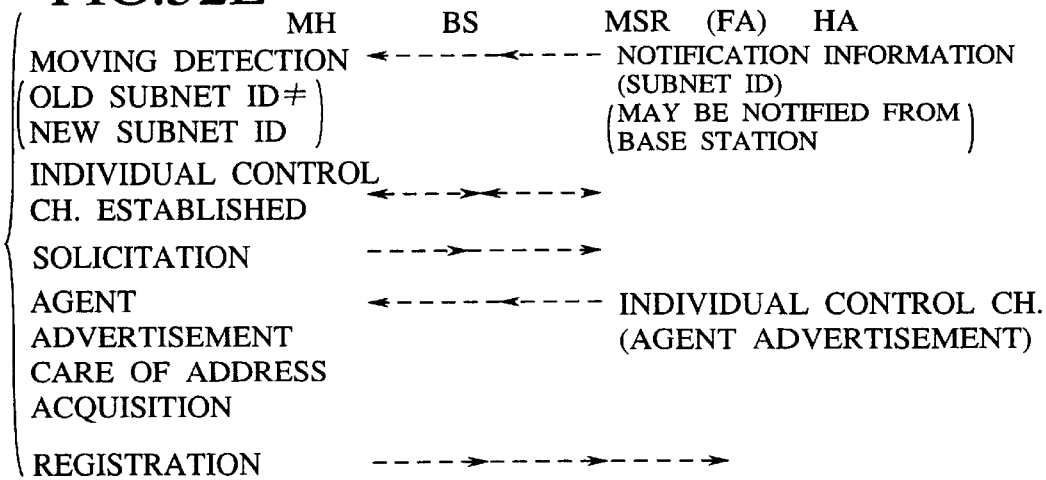
Figure 52F:
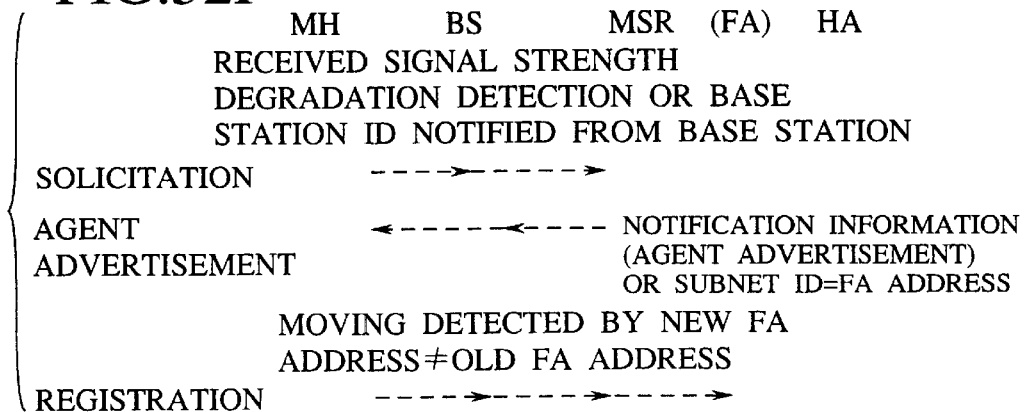
Figure 52G:
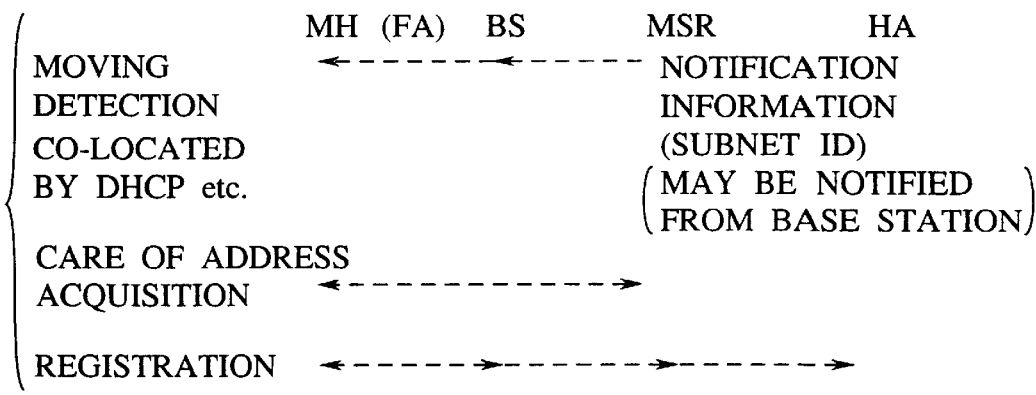
Figure 52H:
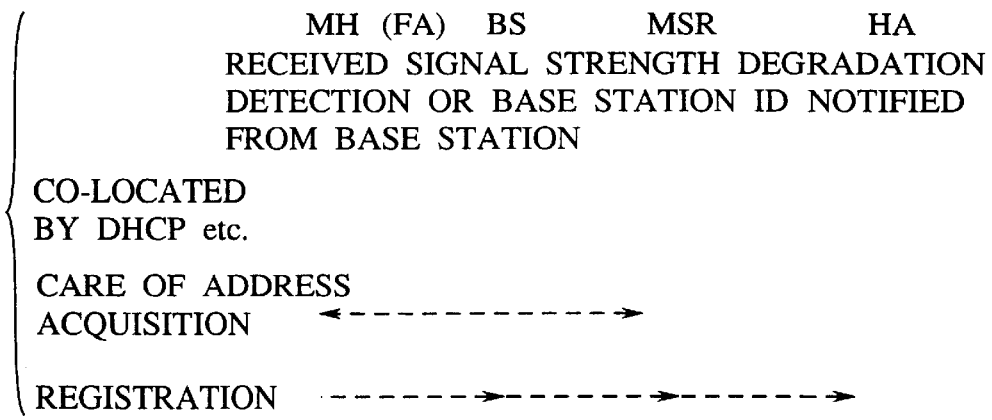
Figure 53:
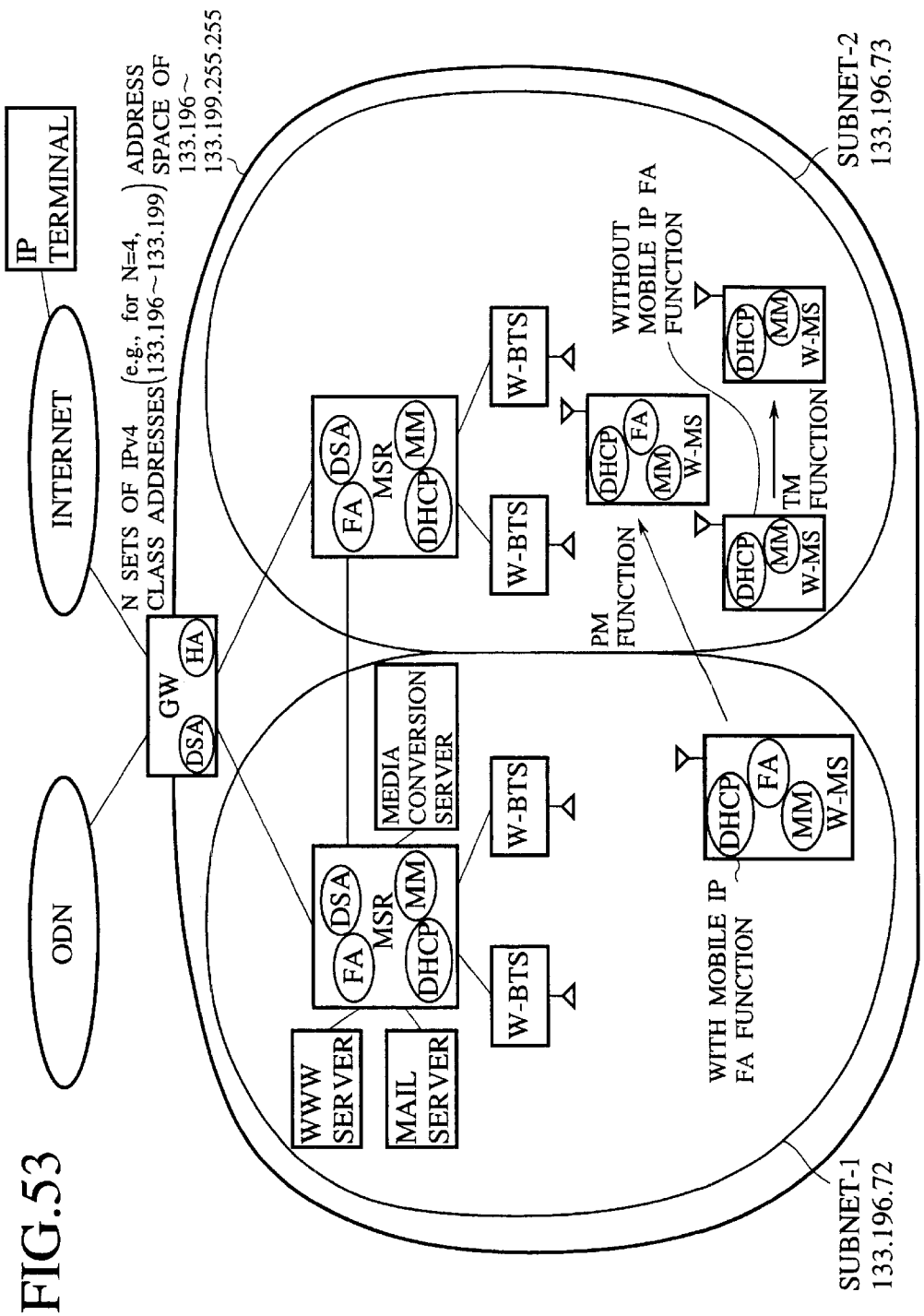
FIG. 53 is diagram showing one exemplary configuration of an Internet access sub-system in the mobile communication system of FIG. 5.

Next, with reference to FIGS. 52G and 52H, the concrete exemplary operation for the moving detection and the Mobile IP information exchange in the case where the FA function is provided at the mobile terminal as shown in FIG. 53 will be described.

FIG. 52G shows a method in which the subnet ID is notified from the radio base station or the MSR, and FIG. 52H shows a method in which the radio base station constitutes a single subnet and the moving is detected by detecting that the base station ID is different or that the received signal strength degraded.

In such a case, when the radio base station does not constitute a single subnet, as is the case when the MSR constitutes a single subnet, the wasteful registration and IP address allocation request will be carried out. Consequently, in the case where the FA function is provided in the mobile terminal, it is preferable to notify the subnet ID (subnet mask) information.

As described above, the mobile terminal 201 can realize the handoff by using various handoff methods, and it is possible to change the handoff control scheme to be used according to the protocol and application operating on the upper level layer. For example, when the protocol and application operating on the upper level layer are such protocol and application for which the moving while maintaining the session is preferable, the mobile terminal 201 carries out the handoff by using the virtual subnet scheme or the Mobile IP so as to continue the IP communication, whereas when the protocol and application operating on the upper level layer are such protocol and application for which the disconnection of the session is not a problem, the mobile terminal 201 operates to resume the IP communication by having a new IP address allocated at the DHCP server at the visited site.

Figure 49:
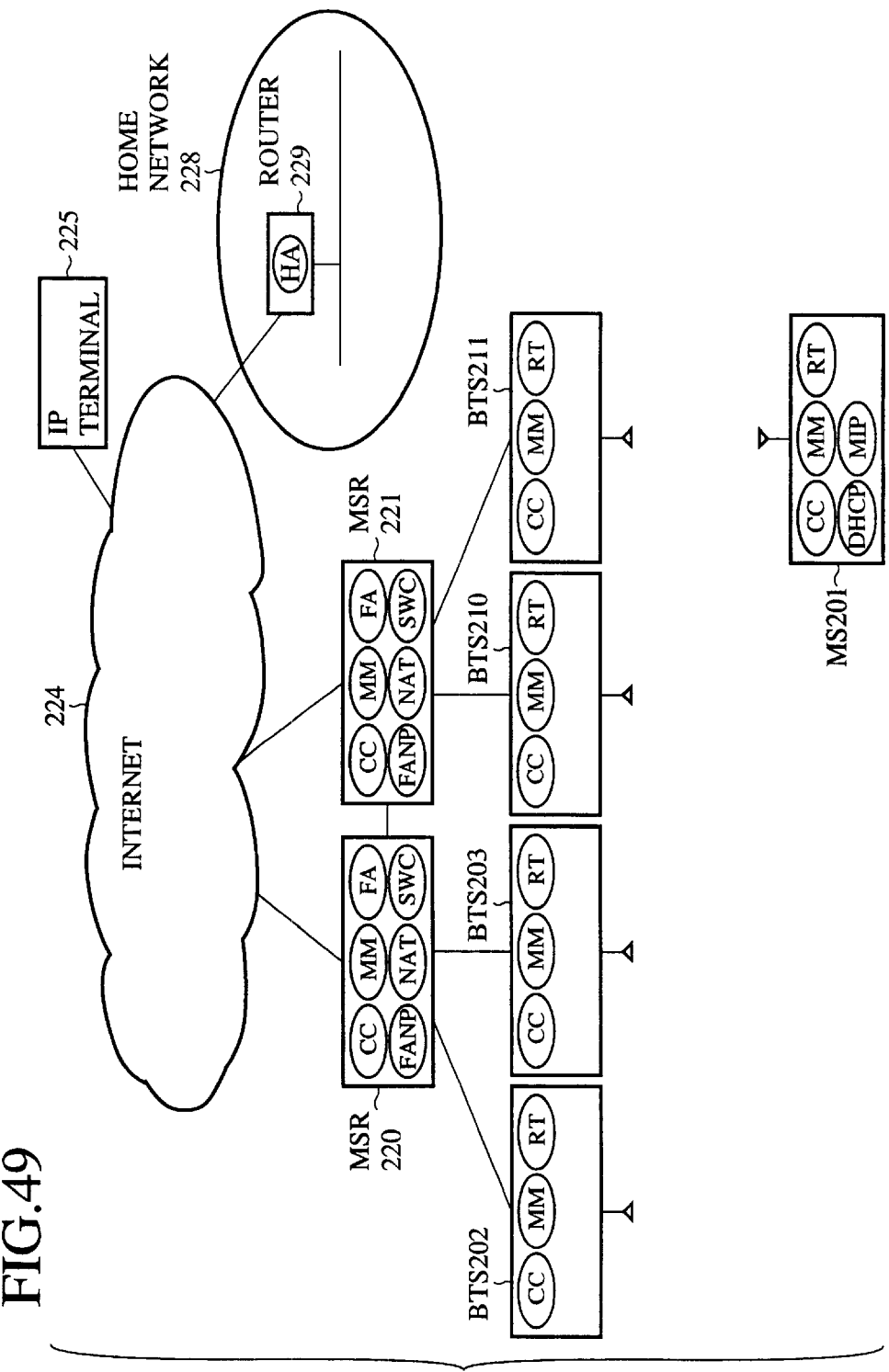
FIG. 49 is a diagram showing another exemplary functional arrangement that can be used in the mobile communication system of FIG. 5.

The functional arrangement of FIG. 49 comprises the mobile terminal 201, the radio base stations 202, 203, 210 and 211, the MSRs 220 and 221, the gateway 223, Internet 224, the home network 228 and a router 229 of the home network 228, similarly as FIG. 47. The mobile terminal 201 has the location movement management (MM1 or MM2) function for the MSR, the network layer address allocation/release (such as DHCP client) function, the call control (CC) function, the radio management (RT) function, and a Mobile IP function required for the terminal when the FA is located at the network side. Each of the radio base stations 202, 203, 210 and 211 has the location movement management (MM) function, the call control (CC) function, and the radio management (RT) function at least. The MSR has the location movement management (MM) function, the network layer address allocation/release (such as DHCP server) function, the call control (CC) function, the switch control (SWC) function, and the cut-through path set up/release (such as FANP) function, without having any function related to the Mobile IP. Here, the DHCP server described above carries out the message exchange with the DHCP client, so as to carry out the private IP address allocation.

Also, the gateway 223 has the address conversion (NAT) function, the foreign agent (FA) function for global network, the location movement management (MM) function, the call control (CC) function, the switch control (SWC) function, and the cut-through path set up/release (such as FANP) function. The MSR has the network layer address allocation/release (such as DHCP server) function in addition to the functions provided in the gateway 223, so that the MSRs 220 and 221 can be directly connected to Internet 224. This network layer address allocation/release (such as DHCP server) function provided in the MSR 220 and 221 carries out the allocation/release of the private IP address, while the foreign agent (FA) function is the FA for global network which has the global IP address.

In the case of FIG. 49, when the mobile terminal 201 makes an access to the server and the like within the private IP network, the private IP network is provided between the MSRs 220 and 221, and the routing by the exchange at the datalink layer level is to be carried out between the MSR 220 and the radio base stations 202 and 203, between the MSR 221 and the radio base stations 210 and 211, and between the radio base stations 202, 203, 210 and 211 and the mobile terminal 201 (where the MSR has the gateway function). Also, when there is a call termination at the mobile terminal 201 from the IP terminal 225 within the global IP network, the routing by the exchange at the datalink layer level is carried out from the MSRs 220 and 221 (where the MSR has the gateway function).

Also, when the mobile terminal 201 makes an access to the server within the global IP network, the access can be made by using the routing method of either the form 1 or the form 2 described above.

Each of the MSRs 220 and 221 shown in FIG. 49 constitutes a single subnet, and has a configuration using the DHCP server function for the private network, the foreign agent (FA) function for the global network, and the address conversion (NAT) function, so that the FA function, the DHCP function, and the NAT function are provided at the same location. In the above described example, the datalink layer level exchange is carried out by the ATM but the present invention is not limited to the case of using the ATM alone.

Next, the method of access to the private IP network will be described. Basically, it is possible to use the same mechanism as in FIG. 46.

Figure 51:
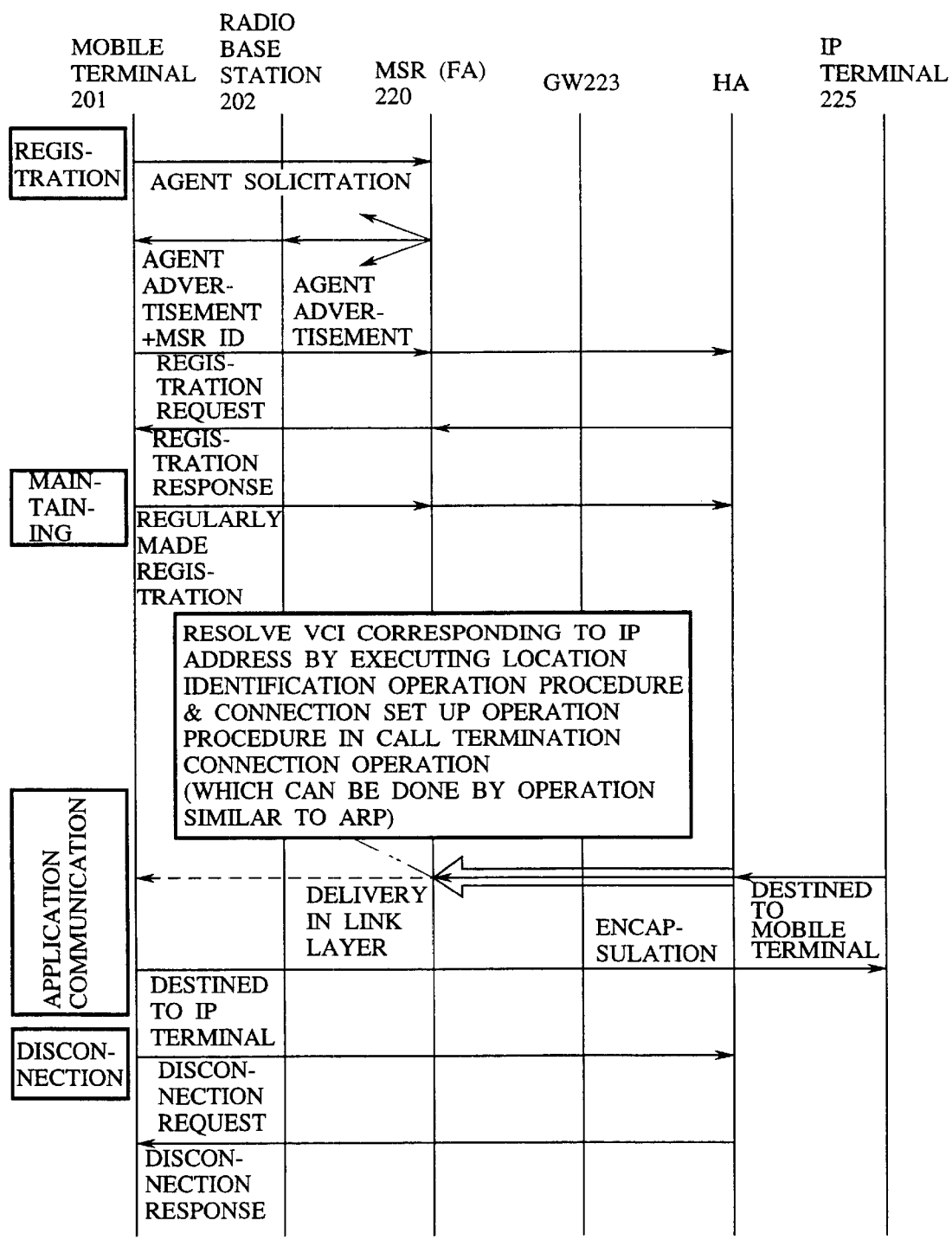
FIG. 51 is a sequence chart showing one exemplary call termination operation by Mobile IP in the mobile communication system of FIG. 5.

The FA address is obtained from the MSR, and when it is desired to make a global access, the communication is carried out by using this FA address. The call termination connection to the mobile terminal 201 can be realized by the cooperative operation of the conventional Mobile IP and the location movement management function. The concrete operation is as shown in FIG. 51. As shown in FIG. 51, it is necessary to provide a function for detecting the IP packet reception, calling the mobile terminal, resolving its location address, and carrying out the connection set up according to its QOS requirement. Although not specific to FIG. 49, the mobile terminal 201 has a configuration capable of changing the operation as to whether or not to set the Mobile IP operation active according to the need or according to the application, in such a manner that, when it is desired to make a global access, the mobile terminal 201 functions to carry out the Mobile IP operation by using the FA address, and in the case of making a private access, the private IP address is obtained from the DHCP server and the access is made without carrying out the Mobile IP operation.

Next, with reference to FIGS. 52A to 52F, the concrete exemplary operations for the moving detection and the Mobile IP information exchange in the case where the FA function is provided at the network side as shown in FIG. 49 will be described.

FIG. 52A shows a method in which the downlink message of the Mobile IP is received by utilizing the broadcast channel (BCCH), the call termination control channel (PCH), and the downlink common control channel such as SCCH, and the uplink message of the Mobile IP is transmitted by utilizing the random access channel (RACH), the uplink common control channel such as SCCH and USCCH or the individual control channel (FACCH, SACCH, USACCH, UFACCH). This is a method in which the registration is carried out in such an order that the Mobile IP message is transmitted in a form of inserting it into the above described radio link control channel, the Agent Advertisement is received at the ICMP level by taking the Mobile IP message out, and the Registration message is immediately transmitted according to the fact that the FA address is different. The subsequent operation is as shown in FIG. 51.

FIG. 52B shows a method in which the subnet ID is periodically transmitted by containing it in the notification information of the radio link, where the subnet ID coincides with the FA address. FIG. 52C shows a method in which the subnet ID is periodically transmitted by containing it in the notification information of the radio link, where the Registration is carried out in such an order that the moving is detected by the fact that the subnet ID is different, the notification is urged by the Care-of-address solicitation, and the Care-of-address is obtained by looking at the notification information (Agent Advertisement or FA address) within the BCCH for that packet communication.

The advantage of this method is that there is no need to refer to the BCCH for packet communication unless it is necessary, and when it is necessary, there is no need to assemble the Agent advertisement message.

Also, FIG. 52D and FIG. 52E show methods in which the subnet ID is periodically transmitted by containing it in the notification information of the radio link level. The methods of FIG. 52A to FIG. 52C are basically for the cases where BCCH for packet (IP) communication is to be newly defined and operated or the existing BCCH has sufficient reservation bits, but the methods of FIGS. 52D and 52E can be used for the cases where it is difficult to newly define BCCH for packet (IP) communication as the notification information (and there is not much reservation bit in the existing BCCH).

Also, FIG. 52F shows a method in which the solicitation is made by detecting the fact that the received signal strength degraded. Here, after the solicitation, the operation in the procedure of the methods of FIGS. 52A and 52B is shown, but it is also possible to use the operation in the procedure after the solicitation of the method of FIG. 52E.

Next, the configuration of the Internet access sub-system is shown in FIG. 53.

In FIG. 53, N pieces of the class B addresses of IPv4 are allocated as the IP addresses to the gateway (in the following, it is assumed that N=4 for the sake of definiteness). As shown in FIG. 53, the connections with the other networks such as Internet and ODN (Open Digital Network) are made through this gateway.

FIG. 53 shows an exemplary case in which the addresses 133.196 to 133.199 (for the case of N=4) in upper 16 bits are allocated as the network address for representing this Internet access sub-system as a whole. In this case, for the hosts within this system, the addresses 133.169.0.0 to 133.169.255.255 can be set up. In practice, the addresses with all 0 or all 1 host section are utilized for the special purposes and cannot be utilized as the host address, so that up to $(2^{16}-2) \times 4 = 65534 \times 4 = 262136$ terminals can be set up. This implies that the number of connectable hosts is at most 262136, so that it lacks the expandability. For this reason, in the Internet access sub-system shown in FIG. 53, it is important to make it possible for those hosts whose utilization times do not overlap with each other to be able to use the same address by using the DHCP for allocating the IP addresses temporarily whenever necessary. In this manner, it is possible to increase the number of hosts that can be accommodated, and to deal with the moving of the hosts.

Also, the configuration of FIG. 53 uses the DSA (Dynamic Subnet Assignment) server function in order to improve the flexibility of the system configuration and the performance of the IP address allocation/release processing. In addition, by carrying out the IP address allocation/release hierarchically by using the DSA server function and the DHCP server function together in such a manner that the subnet address is allocated to the MSR by providing the DSA server function in the gateway while the IP address is allocated to the host by providing the DHCP server function in the MSR, it becomes possible to utilize the IP addresses more effectively.

The DSA carries out the allocation/release of the subnet address dynamically according to the need, and by using the DSA, there is an advantage in that it is possible to change the subnet address allocation flexibly according to the traffic state of the system after the system is introduced, in such a manner that many subnet addresses are allocated to the service area with heavy traffic such as business quarters while only a small number of subnet addresses are allocated to the service area at which Internet accesses occur less frequently.

Also, unlike the case in which the gateway allocates the IP addresses to all the hosts, by realizing the IP address allocation/release processing hierarchically, it is possible to distribute the processing and therefore there is a merit in that it can lead to the lowering of the load on the DHCP server.

Figure 54:
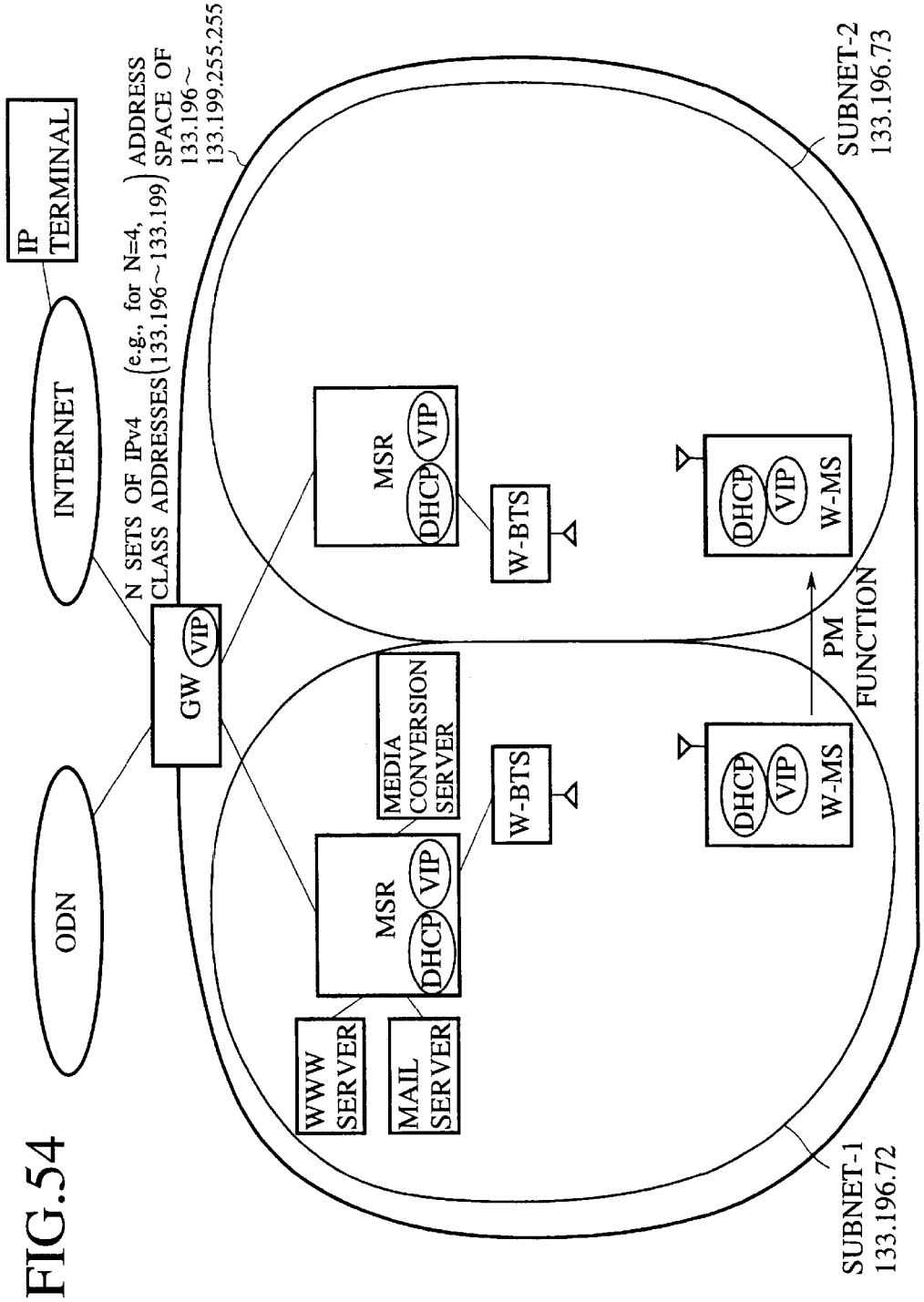
FIG. 54 is diagram showing another exemplary configuration of an Internet access sub-system in the mobile communication system of FIG. 5.

Note that the system of FIG. 53 is in a configuration in which the functional arrangements of FIG. 47 and FIG. 50 as described above are merged together, which includes the case in which the mobile terminal has the FA function and the case in which the MSR has the FA function. In addition, it is also possible to use a configuration as shown in FIG. 54 in which the VIP function rather than the Mobile IP function is provided in the MSR so that the VIP addresses are allocated by the DHCP server provided in the MSR.

Figure 55:
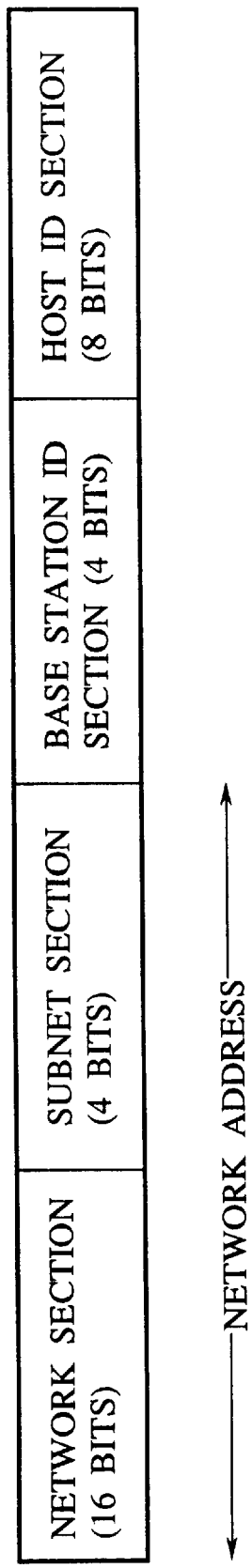
FIG. 55 is a diagram showing an exemplary configuration of a routing header to be used for the purpose of routing in the mobile communication system of FIG. 5.

On the other hand, in Internet, the routing is carried out according to the IP address. Thus a plurality of subnets are defined within one network, and the hop-by-hop routing is carried out up to that subnet, while the routing according to the datalink address (MAC address) is carried out within the subnet. For this reason, even for the routing in the radio Internet system as shown in FIG. 53 and FIG. 54, it is also possible to use a method as shown in FIG. 55 in which the upper 4 bits of the host section are allocated as the network address (subnet masks are 225.225.240.0 (FF.FF.F0.00)) to the MSR, the next 4 bits subsequent to the network section containing the subnet section are utilized as the radio base station ID, and the subsequent 8 bits are utilized as the host ID of a host to be connected to each radio base station.

With this configuration, it is possible to carry out the routing within the mobile communication system in the framework of the IP routing rather than the frame work of the routing in the conventional mobile communication network. In this example, it is possible to accommodate at most 16 sets of the radio base stations for one MSR, so that it is possible to accommodate at most 256 sets of the hosts at each radio base station.

Next, in the system shown in FIG. 53 and FIG. 54, (1) the operation at a time of making an access from the mobile terminal to the mail server, (2) the operation at a time of making an access from the mobile terminal to the WWW server, and (3) the operation at a time of making an access from the mobile terminal to a remote host which is located beyond the global Internet network, will be described.

Figure 56:
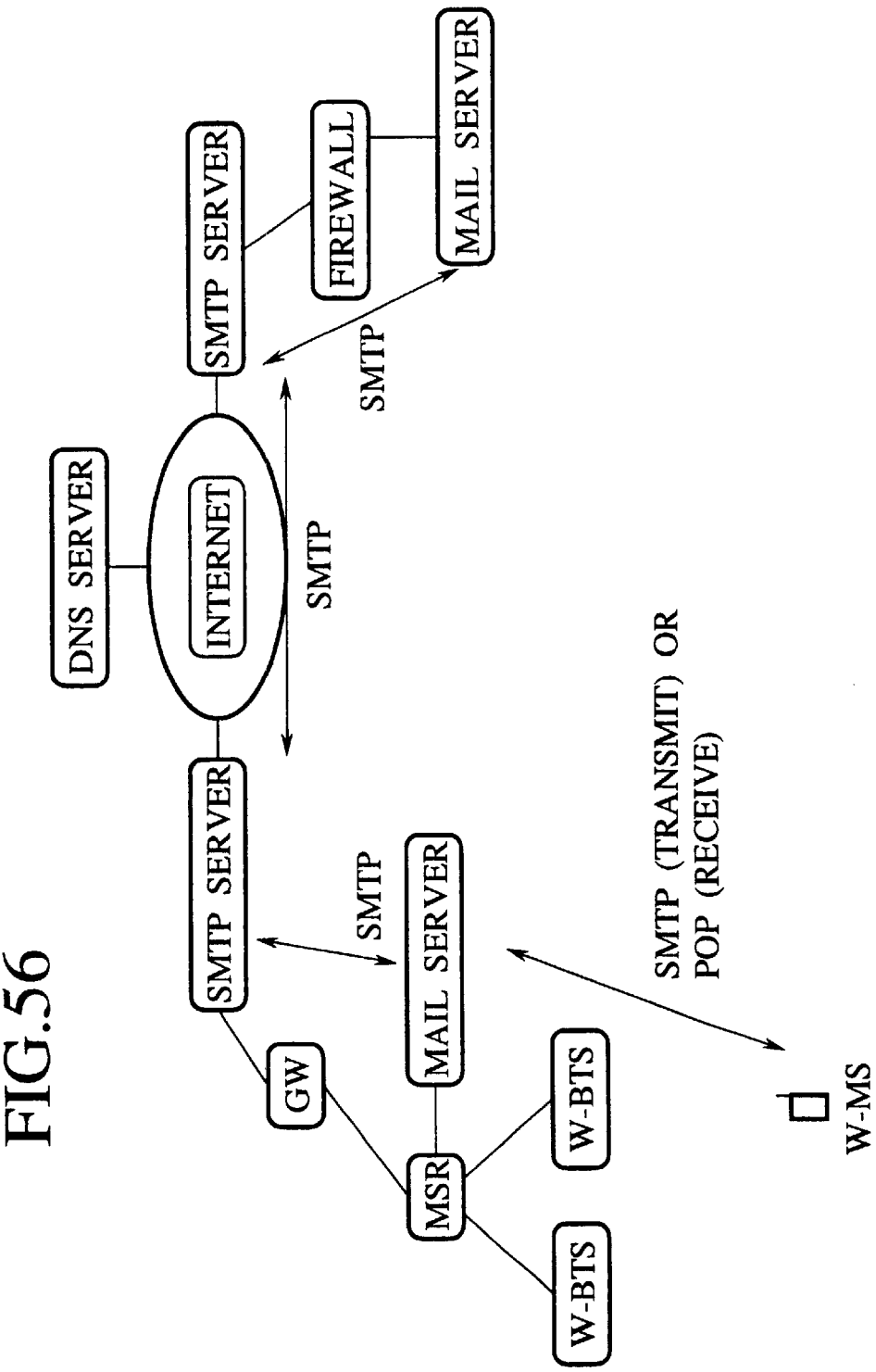
FIG. 56 is a diagram showing an exemplary mail transfer configuration in the mobile communication system of FIG. 5.

(1) Mail access operation procedure:

FIG. 56 shows the case of the mail transfer operation, which will now be described according to this FIG. 56. First, when the user transmits a mail, the mail reaches to the nearest mail server. Then, it is transferred to the correspondent through many servers. The SMTP (Simple Mail Transfer Protocol) is a protocol in which the mail message is exchanged between the transmitting terminal and the server and between the servers. Using this SMTP, the mail message is transferred through Internet, but the destination mobile terminal is usually not implemented with the SMTP server function so that it takes out the message from the nearest server by utilizing a protocol called POP (Post Office Protocol). In other words, the mobile terminal receives the mail service by using the SMTP at a time of transmitting mail, and using the POP at a time of receiving mail.

Figure 57:
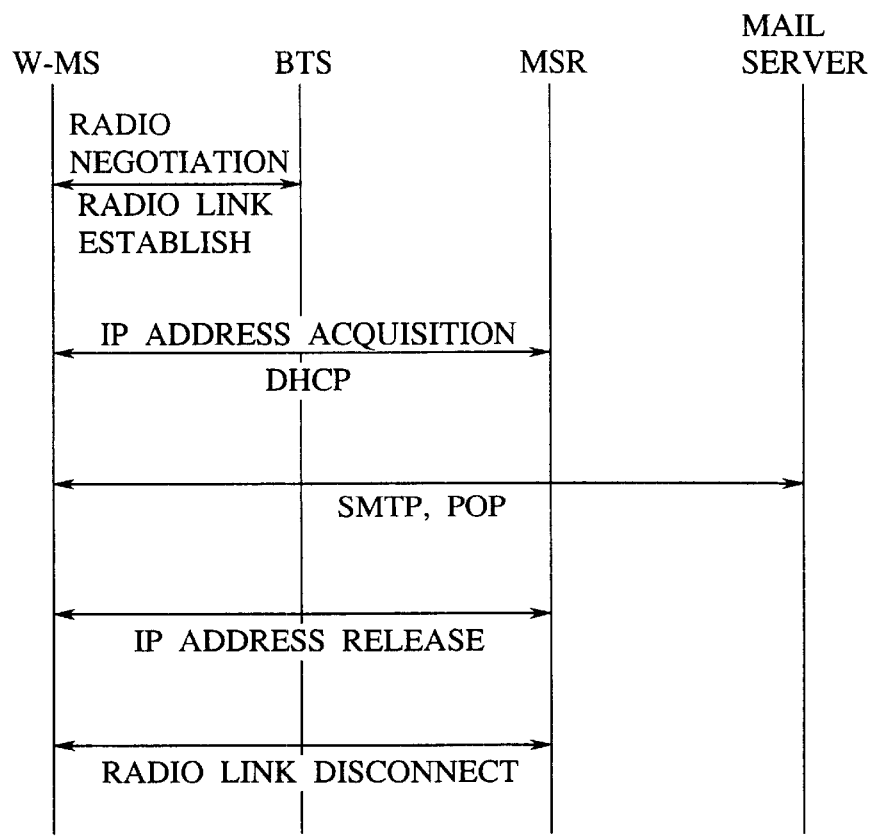
FIG. 57 is a sequence chart showing an exemplary mail transfer operation procedure in the mobile communication system of FIG. 5.

As shown in FIG. 56, even when the mobile terminal moves between the radio base stations, the handoff control function is supported by the MSR so that it is possible to realize the mail access in the same form as the usual mail access in the fixed network. Also, FIG. 57 shows the mail transfer operation procedure. The operation in the case where a user transmits or receives mail will now be described according to this FIG. 57. First the radio link negotiation is made between the radio base station and the mobile terminal so as to establish the radio link. Then, the mobile terminal is allocated with the IP address by the DHCP provided in the MSR. Then, when the IP address is obtained, the mobile terminal makes an access to the mail server by using the SMTP in the case of mail transmission or by using the POP in the case of mail reception. Then, when. the mail transmission or reception is finished, the IP address release operation of the DHCP is carried out between the mobile terminal and the MSr, and the disconnection of the radio link is carried out between the mobile terminal and the radio base station.

(2) WWW server access operation procedure:

The WWW (World Wide Web) is a mechanism in which the information data within servers which are distributed over Internet are related in a form of spider's web and made to be retrievable. In the WWW, the information of anonymous FTP, Net News and Gopher can be utilized directly. Also, the WWW is basically realized by communications between servers and clients and highly reliable communications are realized by using the protocol called HTTP (Hyper Text Transfer Protocol) on the TCP protocol (TELNET).

Figure 58:
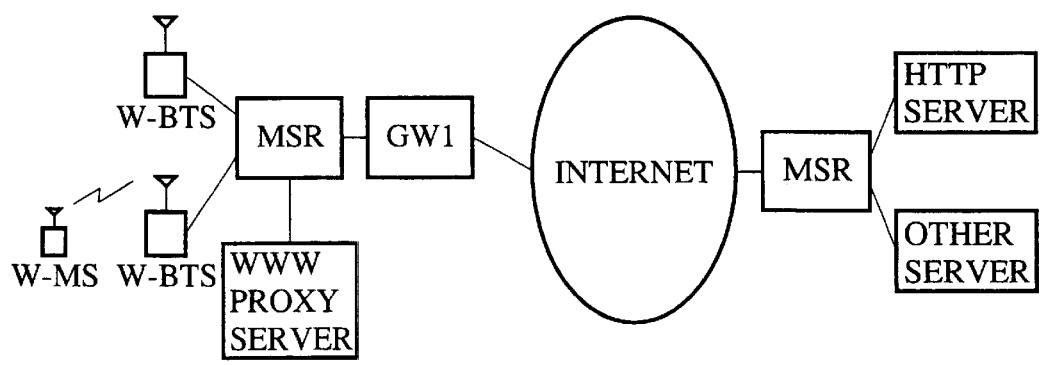
FIG. 58 is a diagram showing an exemplary WWW server access configuration in the mobile communication system of FIG. 5.
Figure 59:
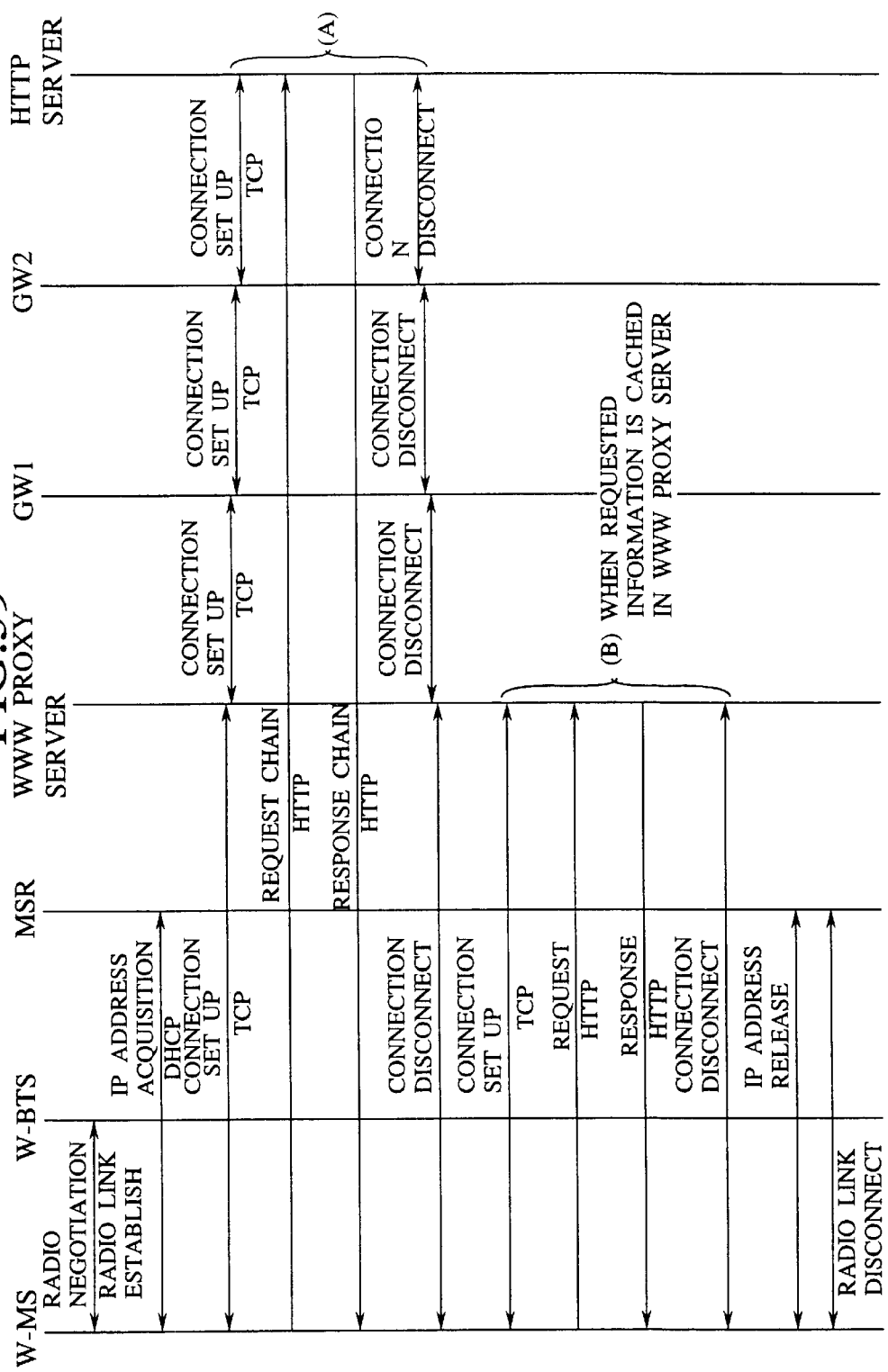
FIG. 59 is a sequence chart showing an exemplary WWW server access operation procedure in the mobile communication system of FIG. 5.

FIG. 58 shows a communication system configuration and the FIG. 59 shows the WWW server access operation procedure. The mobile terminal of the communication system of FIG. 58 has a WWW browser mounted thereon. The WWW proxy server is a server which makes request on behalf of the other clients, which plays both the roles of the server and the client. This WWW proxy server has a cache function, a firewall function, a code conversion function, and a multi-protocol function. Also, the gateway is a server for relaying the other servers.

In the following, the operation in the case where the mobile terminal obtains information from the HTTP server using the WWW browser will be described.

First, the mobile terminal makes a negotiation of the radio link with the radio base station, so as to establish the radio link. Then, the IP address is obtained by using the DHCP protocol between the mobile terminal and the MSR. Then, when the IP address is obtained, the TCP connections are set up in an order of: mobile terminal→WWW proxy server, gateway GW1→gateway GW2→HTTP server, so that the TCP connection up to the WWW server at which the URL (Uniform Resource Locator) of interest exists is established. Then, when the user tries to acquire the information on the WWW browser, a Request message in the HTTP protocol is transmitted through the four connections as indicated in FIG. 59, from the mobile terminal toward the HTTP server. Upon receiving this, the HTTP server transmits the information requested from the user using a Response message in the HTTP protocol. Then, the WWW server disconnects the TCP connection with the mobile terminal (the case of (A) shown in FIG. 59).

In the WWW system, the server and the client are connected only while the data request using URL is issued and the requested data are acquired, While the user reads the acquired data on the WWW browser, the TCP connection is disconnected.

Now, when the data to be requested by the user next are already cached in the WWW proxy server, the connection set up is carried out only up to the WWW proxy server and the Request and Response messages in the HTTP protocol are exchanged between the mobile terminal and the WWW proxy server, as shown in the case (b) of FIG. 59. Namely, the information (resource) once transferred from Internet is stored in a cache at the WWW proxy server and when the same resource in the cache is requested, the resource stored in the cache is given to the client rather than going up to Internet to obtain the same thing. When the browsing at the mobile terminal is finished, the IP address release is carried out between the mobile terminal and the MSR, and the disconnection of the radio link is carried out between the mobile terminal and the radio base station.

Figure 60:
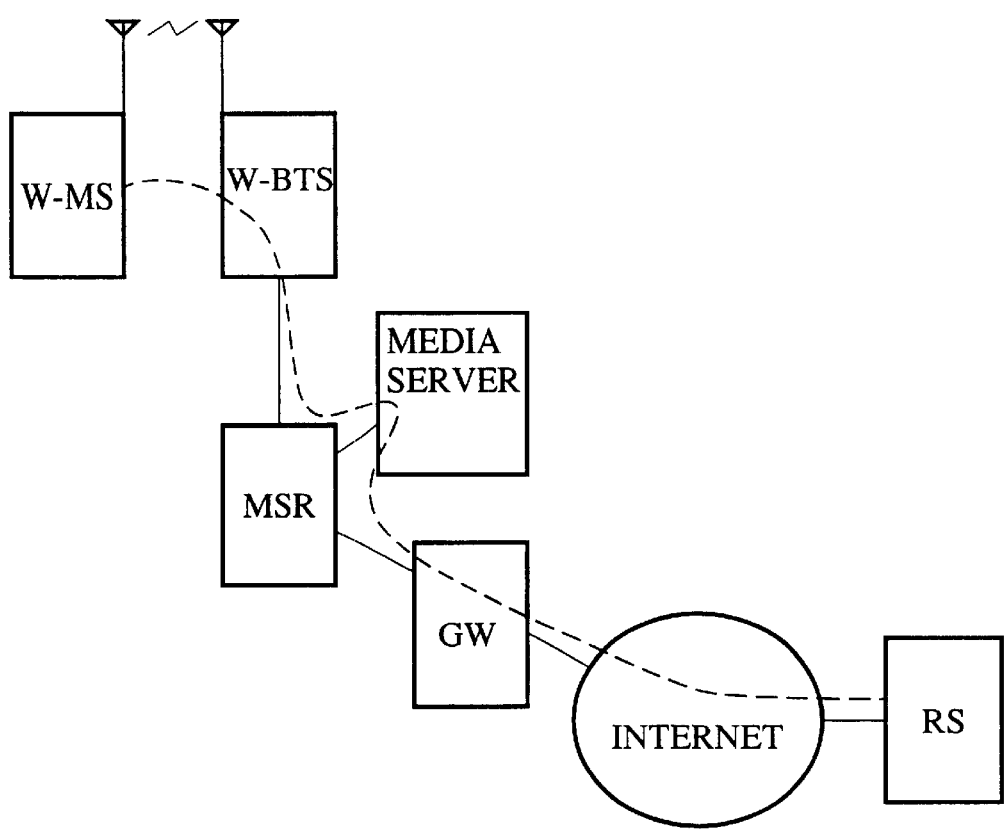
FIG. 60 is a diagram showing an exemplary Internet connection operation in the mobile communication system of FIG. 5.
Figure 61:
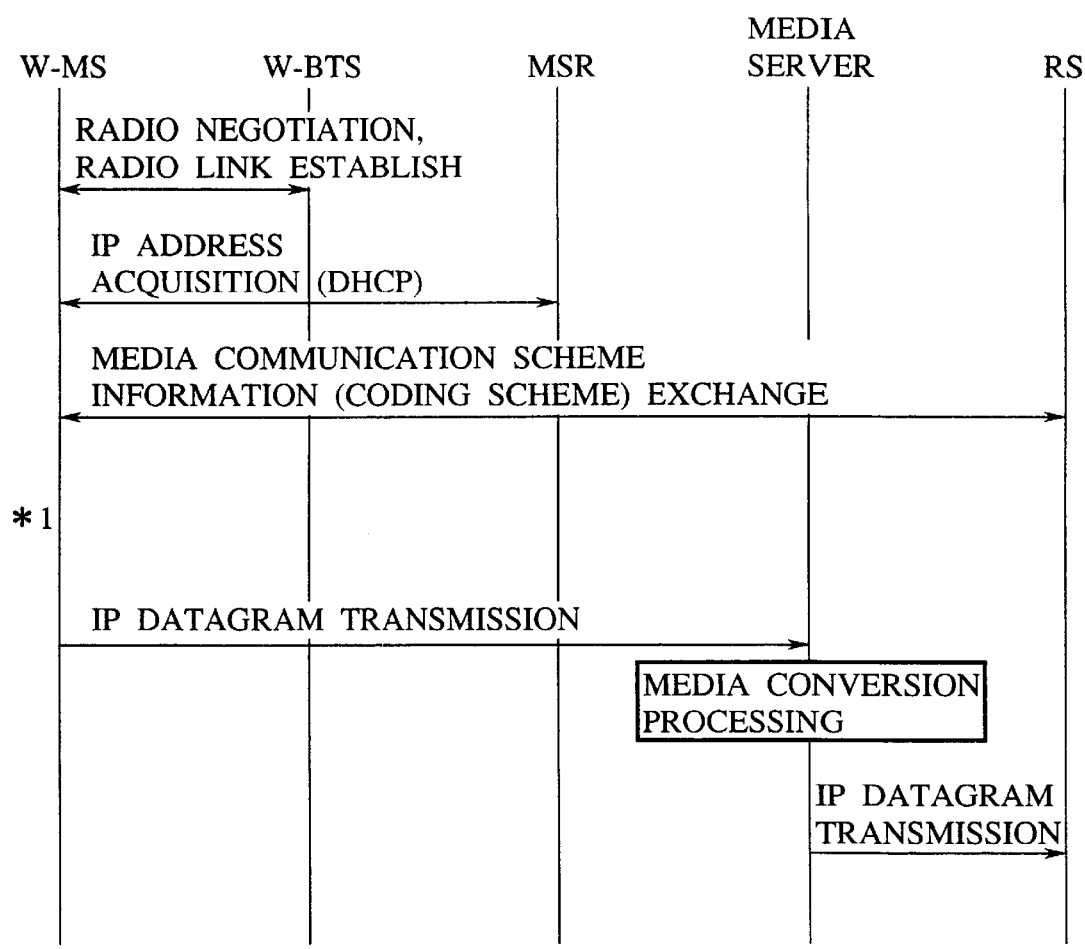
FIG. 61 is a sequence chant showing a data transmission procedure in the case of setting up a connection to a media conversion server in the mobile communication system of FIG. 5.

(3) Internet connection operation procedure:

Next, the procedure for transmitting data from the mobile terminal to a remote host (RS) through Internet will be described. FIG. 60 shows a connection configuration in this case. The mobile terminal transmits the IP datagram with respect to the remote host on Internet through the radio base station, the MSR, and the gateway. At this point, the conversion such as that of the media coding scheme is carried out by the media conversion server (media server) connected to the MSR according to the need. The data transmission procedure in this case will now be described with reference to FIG. 61.

First, the establishing of the radio link between the mobile terminal and the radio base station, and the acquisition of the IP address of the mobile terminal are carried out.

Then, the information related to the media communication scheme, that is the information on the coding scheme of the media, the transport protocol to be used, etc., is exchanged between the mobile terminal and the connection target remote host, so as to recognize the media communication scheme to be used on both sides. When the media communication scheme to be used is different at the mobile terminal and the remote host as a result of the exchange of this information related to the media communication scheme, the mobile terminal transmits the media data through the media conversion server. Namely, the mobile terminal transmits the IP datagram with the destination address information of the remote host attached thereto to the media conversion server. At the media conversion server, the IP datagram is assembled once and the media conversion processing is applied, and then it is transmitted to the remote host as the IP datagram again. At this point, the transport protocol conversion processing is also carried out if necessary. On the other hand, when the media communication scheme is the same at the mobile terminal and the remote host, the mobile terminal transmits the IP datagram directly to the remote host without using the media conversion server.

In the above described procedure, the media conversion server has been described as a specific server connected to the MSR, but it is also possible to use a method in which the media conversion server that has the necessary conversion capability is searched out and then utilized at each occasion. This method can be realized by obtaining the information on the available media conversion servers using the inquiry procedure such as SLP (Service Location Protocol), for example, at a timing indicated by *1 in FIG. 61. It is also possible to use a method in which addresses of various servers are notified from the radio base station instead of using such an inquiry procedure.

As described, the Internet type mobile access technique has been associated with the problem of redundancy of the route and the problem that the handoff control associated with the moving is very time consuming so that it has been difficult to realize the real time communication such as Internet telephone under the mobile Internet environment, but by using the mobile supporting router device of the present invention, it becomes possible to carry out the handoff control much faster than the handoff in the conventional Internet type system.

Also, by providing the router local location movement management function in this high speed router device, it becomes possible to provide the mobile supporting router device which is capable of reducing the delay time and the route redundancy compared with the conventional mobile access technique such as Mobile IP.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A router device, comprising:
   at least one first interface connected with a plurality of radio base stations, each radio base station being capable of accommodating at least one mobile terminal;
   at least one second interface connected with a network;
   an information exchanging unit configured to exchange a routing protocol on a network layer, through the second interface;
   a memory unit configured to store information regarding a routing on the network layer based on the routing protocol exchanged by the information exchanging unit;
   a transfer unit configured to transfer datagram through the first interface according to the information regarding the routing on the network layer stored in the memory unit;
   a moving detection unit configured to detect a moving of the mobile terminal among the radio base stations;
   an information updating unit configured to update the information regarding the routing on the network layer stored in the memory unit when the moving of the mobile terminal is detected by the moving detection unit; and
   a switching unit configured to switch transmission of the datagram by the transfer unit between datagram transmission to a radio base station of a visited site of the mobile terminal and datagram transmission to both a radio base station of an originally located site of the mobile terminal and a radio base station of a visited site of the mobile terminal;
   wherein when the datagram transmission to both a radio base station of an originally located site of the mobile terminal and a radio base station of a visited site of the mobile terminal is to be used, the information updating unit updates the information regarding the routing on the network layer such that the datagram destined to the mobile terminal is transmitted to both a radio base station of an originally located site of the mobile terminal and a radio base station of a visited site of the mobile terminal.

2. A router device, comprising:
   at least one first interface connected with a plurality of radio base stations each radio base station being capable of accommodating at least one mobile terminal;
   at least one second interface connected with a network;
   an information exchanging unit configured to exchange a routing protocol on a network layer, through the second interface;
   a memory unit configured to store information regarding a routing on the network layer based on the routing protocol exchanged by the information exchanging unit;
   a transfer unit configured to transfer datagram through the first interface according to the information regarding the routing on the network layer stored in the memory unit;
   a moving detection unit configured to detect a moving of the mobile terminal among the radio base stations;
   an information updating unit configured to update the information regarding the routing on the network layer stored in the memory unit when the moving of the mobile terminal is detected by the moving detection unit; and
   a switching unit configured to switch transmission of the datagram by the transfer unit during an updating processing by the information updating unit between a mode for continuing datagram transmission to a radio base station of an originally located site of the mobile terminal and a mode for stopping datagram transmission to a radio base station of an originally located site of the mobile terminal, according to a communication quality required for transfer of the datagram.

3. A router device, comprising;
   at least one first interface connected with a plurality of radio base stations, each radio base station being capable of accommodating at least one mobile terminal;
   at least one second interface connected with a network;
   an information exchanging unit configured to exchange a routing protocol on a network layer, through the second interface;
   a memory unit configured to store information regarding a routing on the network layer based on the routing protocol exchanged by the information exchanging unit;
   a transfer unit configured to transfer datagram through the first interface according to the information regarding the routing on the network layer stored in the memory unit;
   a moving detection unit configured to detect a moving of the mobile terminal among the radio base stations;
   an information updating unit configured to update the information regarding the routing on the network layer stored in the memory unit when the moving of the mobile terminal is detected by the moving detection unit; and
   a move over detection unit configured to detect a move over of mobile terminal to a radio base station connected with another router device; and
   a control unit configured to update the information regarding the routing on the network layer such that datagram destined to the mobile terminal is transferred to said another router device, and transmit a message for updating the information regarding the routing on the network layer to said another router device such that said another router device transfers the datagram to the mobile terminal, when the move over detection unit detects the move over of the mobile terminal.

4. A router device, comprising:
   at least one first interface connected with a plurality of radio base stations, each radio base station being capable of accommodating at least one mobile terminal;
   at least one second interface connected with a network;
   an information exchanging unit configured to exchange a routing protocol on a network layer through the second, interface;
   a memory unit configured to store information regarding a routing on the network layer based on the routing protocol exchanged by the information exchanging unit;
   a transfer unit configured to transfer datagram through the first interface according to the information regarding the routing on the network layer stored in the memory unit;

a moving detection unit configured to detect a moving of the mobile terminal among the radio base stations;

an information updating unit configured to update the information regarding the routing on the network layer stored in the memory unit when the moving of the mobile terminal is detected by the moving detection unit; and a move over detection unit configured to detect a move over of mobile terminal to a radio base station connected with another router device; and a control unit configured to update the information regarding the routing on the network layer such that datagram destined to the mobile terminal is transferred to a first virtual connection to said another router device which is dedicated for the mobile terminal, and exchange messages with said another router device such that said another router device can carry out a switching on a lower layer of the network layer between the first virtual connection and a second virtual connection from said another router to a radio base station of a visited site of the mobile terminal which is dedicated to the mobile terminal, when the move over detection unit detects the move over of the mobile terminal.

* * * * *